(12) United States Patent
Hiraide et al.

(10) Patent No.: US 10,836,037 B2
(45) Date of Patent: Nov. 17, 2020

(54) CONTROL DEVICE AND ROBOT SYSTEM

(71) Applicant: Seiko Epson Corporation, Tokyo (JP)

(72) Inventors: Toshinori Hiraide, Fujimi (JP); Norio Yokoshima, Torrance, CA (US)

(73) Assignee: Seiko Epson Corporation (JP)

( * ) Notice: Subject to any disclaimer, the term of this patent is extended or adjusted under 35 U.S.C. 154(b) by 315 days.

(21) Appl. No.: 15/941,608

(22) Filed: Mar. 30, 2018

(65) Prior Publication Data

US 2018/0281183 A1 Oct. 4, 2018

(30) Foreign Application Priority Data

Mar. 31, 2017 (JP) ................................ 2017-069890

(51) Int. Cl.
*B25J 9/16* (2006.01)

(52) U.S. Cl.
CPC .......... *B25J 9/1628* (2013.01); *B25J 9/1633* (2013.01); *B25J 9/1697* (2013.01); *G05B 2219/37351* (2013.01); *G05B 2219/37534* (2013.01); *G05B 2219/41145* (2013.01); *G05B 2219/41166* (2013.01); *G05B 2219/41232* (2013.01); *Y10S 901/09* (2013.01); *Y10S 901/46* (2013.01)

(58) Field of Classification Search
CPC ...... B25J 9/1656; B25J 9/1697; B25J 9/1641; B25J 9/1628; B25J 9/1633; B25J 13/085; B25J 13/088; B25J 9/102; G05B 2219/37351; G05B 2219/37534; G05B 2219/41145; G05B 2219/41166; G05B 2219/41232; G05B 2219/41359; G05B 19/234; G05B 2219/37434; G05B 2219/39001; G05B 2219/39195; G05B 2219/39241; Y10S 901/09
See application file for complete search history.

(56) References Cited

U.S. PATENT DOCUMENTS 6,507,165 B2 1/2003 Kato et al.
2016/0031078 A1* 2/2016 Kapoor ................ G05B 19/427
700/258

(Continued)

FOREIGN PATENT DOCUMENTS

JP 06-278080 A 10/1994
JP 2001-293638 A 10/2001

OTHER PUBLICATIONS

Chen et al., Using UWB sensor for delta robot vibration detection, 2013, IEEE, p. (Year: 2013).*

(Continued)

*Primary Examiner* — McDieunel Marc
(74) *Attorney, Agent, or Firm* — Harness, Dickey & Pierce, P.L.C.

(57) ABSTRACT

A control device includes: a processor that is configured to execute computer-executable instructions so as to control a robot, and the processor is configured to receive an instruction to execute a specific operation which is an operation determined in advance; and an amplifier that causes a motor of a robot to execute the specific operation when the processor receives the instruction to execute the specific operation; wherein the processor is configured to receive a measurement result of vibration measured by a measurement device installed in the robot from the measurement device in the execution of the specific operation.

13 Claims, 35 Drawing Sheets

(56) References Cited

U.S. PATENT DOCUMENTS

| | | | | |
|---|---|---|---|---|
| 2018/0281182 A1* | 10/2018 | Yokota | ................... | B25J 9/1628 |
| 2018/0281184 A1* | 10/2018 | Kudo | ..................... | B25J 9/1641 |
| 2018/0281185 A1* | 10/2018 | Toshimitsu | ............ | B25J 9/1697 |
| 2019/0270201 A1* | 9/2019 | Ding | ..................... | B25J 9/1656 |

OTHER PUBLICATIONS

Huang et al., Motion control strategy of industrial direct drive robot for vibration suppression, 2010, IEEE, p. (Year: 2010).*

Wang et al., On-Line Vibration Source Detection of Running Trains Based on Acceleration Measurement, 2006, IEEE, (Year: 2006).*

Vagas et al., Methodology for the vibration measurement and evaluation on the industrial robot Kuka, 2014, IEEE, p. 1-6 (Year: 2014).*

* cited by examiner

| TIME | EARLIER CONTROL SIGNAL | LATER CONTROL SIGNAL | THIRD CONTROL SIGNAL | EARLIER CONTROL SIGNAL (%) | LATER CONTROL SIGNAL (%) |
|---|---|---|---|---|---|
| 1 | 113000 | 13000 | 113000 | 100 | 0 |
| 2 | 113000 | 13000 | 113000 | 100 | 0 |
| 3 | 113000 | 13000 | 103000 | 90 | 10 |
| 4 | 113000 | 13000 | 93000 | 80 | 20 |
| 5 | 113000 | 13000 | 83000 | 70 | 30 |
| 6 | 113000 | 13000 | 73000 | 60 | 40 |
| 7 | 113000 | 13000 | 63000 | 50 | 50 |
| 8 | 113000 | 13000 | 53000 | 40 | 60 |
| 9 | 113000 | 13000 | 43000 | 30 | 70 |
| 10 | 113000 | 13000 | 33000 | 20 | 80 |
| 11 | 113000 | 13000 | 23000 | 10 | 90 |
| 12 | 113000 | 13000 | 13000 | 0 | 100 |
| 13 | 113000 | 13000 | 13000 | 0 | 100 |

FIG. 6

| TIME | EARLIER CONTROL SIGNAL | LATER CONTROL SIGNAL | THIRD CONTROL SIGNAL | EARLIER CONTROL SIGNAL (%) | LATER CONTROL SIGNAL (%) |
|---|---|---|---|---|---|
| 1 | 113000 | 13000 | 113000 | 100 | 0 |
| 2 | 113000 | 13000 | 113000 | 100 | 0 |
| 3 | 113000 | 13000 | 10553 | 97.553 | 2.447 |
| 4 | 113000 | 13000 | 103451 | 90.451 | 9.549 |
| 5 | 113000 | 13000 | 92389 | 79.389 | 20.611 |
| 6 | 113000 | 13000 | 78451 | 65.451 | 34.549 |
| 7 | 113000 | 13000 | 63000 | 50 | 50 |
| 8 | 113000 | 13000 | 47549 | 34.549 | 65.451 |
| 9 | 113000 | 13000 | 33611 | 20.611 | 79.389 |
| 10 | 113000 | 13000 | 22549 | 9.549 | 90.451 |
| 11 | 113000 | 13000 | 15447 | 2.447 | 97.553 |
| 12 | 113000 | 13000 | 13000 | 0 | 100 |
| 13 | 113000 | 13000 | 13000 | 0 | 100 |

| CONDITION IN WHICH VIBRATION REDUCTION PROCESS BECOMES AUTOMATICALLY INVALID | TIMING AT WHICH VIBRATION REDUCTION PROCESS BECOMES AUTOMATICALLY VALID |
|---|---|
| EXECUTE Motor On | TIME OF EXECUTING Power High |
| EXECUTE Motor Off | |
| EXECUTE Power Low | |
| EXECUTE CONVEYER TRACKING OPERATION COMMAND | TIME OF EXECUTING OPERATION COMMAND OTHER THAN OPERATION COMMAND FOR AUTOMATIC INVALIDATION or TIME OF EXECUTING Power High |
| EXECUTE FORCE CONTROL | |
| EXECUTE Jog OPERATION | |
| EXECUTE CP CONTROL | |

FIG.11

```
Function main

Motor On
    Power High

Speed 100
    Accel 100,100
    SpeedS 50
    AccelS 200,200

ABCSet 1,30
    ABCSet 2,15,30

ABC 1
    Weight 2

Go P1

On 1
    Weight 4

ABC 2
    Go P2
    Move P3
    Move P2

ABC 1
    Go P0

Fend
```

FIG.12

| MODE | EMERGENCY STOP | SAFETY DOOR | ERROR | VIBRATION REDUCTION | WARNING | OFFLINE | DURING STOP OF PROGRAM | ROW 1 POSITION 1 | INSERTION |

Dvr

FIG. 13

CONTROL DEVICE AND ROBOT SYSTEM

BACKGROUND

1. Technical Field

The present invention relates to a technology for reducing vibration in a robot.

2. Related Art

In the related art, in the fields of robot technologies, there are technologies for reducing vibration of work pieces held by end effectors. In the technology of JP-A-2001-293638, a vibration frequency at which a robot resonates in a state in which a work piece is held in advance by an end effector is specified. Then, a band-elimination filter is applied to a torque control signal (which can be ascertained as a time function) which is provided to a current control unit controlling driving of a servo motor of a robot to eliminate a component of the vibration frequency from the torque control signal. As a result, the torque control signal which does not include the component of the vibration frequency is provided to the current control unit. A servo motor of which the driving is controlled by the current control unit based on the torque control signal does not cause the work piece held by the end effector to resonate at the vibration frequency.

In the technology of JP-A-2001-293638, when eigenfrequency of the end effector is obtained, residual vibration is measured by applying an impact to the end effector of the robot with a hammer. In the obtained residual vibration, a frequency with larger power than other frequencies is an eigenfrequency of a target.

Here, the eigenfrequency varies depending on an attitude of a robot or the mass of a target held by the robot. Therefore, to understand of an eigenfrequency of a certain robot in all the situations, it is theoretically necessary to individually measure eigenfrequencies in combinations of all the attitudes and the masses of all the work pieces in the robot.

According to a technology of JP-A-6-278080, the robot is caused to hold work pieces that have a plurality of types of masses and eigenfrequencies in a plurality of representative points of a robot (representative positions of an arm of the robot) are measured. Then, based on measurement results, the eigenfrequency is expressed as a function of a position of the arm of the robot and the mass of a work piece. As a result, eigenfrequencies in combinations of all the attitudes and the masses of all the work pieces in which vibration is a problematic may not be measured.

Here, even in the technology of JP-A-6-278080, it is necessary to cause the robot to first hold work pieces that have a plurality of types of masses and measure eigenfrequencies at a plurality of positions of the arm of the robot. At that time, residual vibration is considered to be measured by applying an impact with a hammer.

Since the robot assumed in JP-A-6-278080 is a robot (3-axis orthogonal robot) of a simple XY stage mechanism, the foregoing modeling is also possible. However, in the case of 6-axis robots that are currently used in many factories, the number of parameters is greater than in 3-axis orthogonal robots. Therefore, in the method of JP-A-6-278080, an eigenfrequency in each attitude of the arm of the robot and the mass of each work piece may not be estimated with high precision. For this reason, in the technology of JP-A-6-278080, an eigenfrequency in a combination of a specific attitude and a specific mass of a work piece in which vibration is a problem may not be known with high precision.

Even in the technology of JP-A-6-278080, it is still necessary to cause the robot to hold a plurality of types of masses of work pieces and measure eigenfrequencies at a plurality of positions of the arm of the robot. An eigenfrequency of the robot varies depending on an environment in which the robot is installed. For this reason, it is necessary to measure an eigenfrequency of the robot after the robot is installed in an environment in which the robot is used. However, depending on an environment in which the robot is installed, a space in the periphery of the robot is small and an impact may not be applied to the robot with a hammer. Even when there is a space in which an impact is applied to the robot with a hammer, the impact may not be said to be applied to the robot manually in an accurate direction. That is, there is a possibility of an impact not being applied accurately depending on a problematic vibration direction. In this case, there is a possibility that an eigenfrequency which is not an eigenfrequency corresponding to problematic vibration is detected. Further, when delivery and setting of a robot are executed, a client which is a delivery destination of the robot may not want a deliverer of the robot to apply an impact to the robot with a hammer.

SUMMARY

An advantage of some aspect of the invention is to solve at least a part of the problems described above, and the invention can be implemented as the following forms or application examples.

(1) According to an aspect of the present disclosure, a control device is provided. The control device includes: a reception unit that is able to receive an instruction to execute a specific operation which is an operation determined in advance; an execution unit that causes a driving unit of a robot to execute the specific operation when the reception unit receives the instruction to execute the specific operation; and a measurement result reception unit that receives a measurement result of vibration measured by a measurement unit installed in the robot from the measurement unit in the execution of the specific operation.

According to the aspect, it is possible to understand an eigenfrequency of the robot based on the measurement result of the vibration obtained from the measurement unit in the execution of the operation of the robot without applying an impact on the robot from the outside.

(2) In the control device according to the aspect, the reception unit may be able to receive an instruction to execute a plurality of different types of the specific operations. The execution unit may be able to cause the driving unit of the robot to execute the specific operation designated by the instruction input to the reception unit.

According to the aspect with this configuration, for example, it is possible to execute the specific operation of detecting the eigenfrequency of target vibration accurately and easily by preparing the plurality of specific operations in advance according to a frequency or a direction of expected natural vibration and/or an attitude of the robot at which vibration is desired to be reduced.

(3) In the control device according to the aspect, the execution unit may be able to cause the driving unit of the robot to execute, as the specific operations, a plurality of specific operations in which attitudes of the robot are different at the time of ending of the specific operations.

According to the aspect with this configuration, it is possible to detect the eigenfrequency of target vibration accurately and easily by preparing the plurality of specific operations in advance according to an attitude of the robot at which it is preferable to reduce the vibration at the attitude.

(4) In the control device according to the aspect, the robot may include a plurality of the driving units and a plurality of joints respectively driven by the plurality of driving units. The reception unit may be able to receive the instruction to execute the specific operation including designation of one or more joints among the plurality of joints. The execution unit may cause the driving unit corresponding to the designated joint to execute an operation of driving the designated joint in the specific operation.

According to the aspect with this configuration, it is possible to detect the eigenfrequency of target vibration accurately and easily by preparing the specific operation in advance according to the joint of the robot in which it is preferable to reduce the vibration in the joint.

(5) According to another aspect of the present disclosure, a robot controlled by any of the control devices according to the aspects is provided.

(6) According to still another aspect of the present disclosure, a robot system including: any of the control devices according to the aspects; and a robot controlled by the control device is provided.

All the plurality of constituent elements according to each aspect of the above-described present disclosure are not essential. To resolve some or all of the above-described problems or achieve some or all of the advantages described in the present specification, some of the plurality of constituent elements can appropriately be changed, deleted, or substituted with other new constituent elements and restricted content can also be partially deleted. To resolve some or all of the above-described problems or achieve some or all of the advantages described in the present specification, some or all of the technical features included in the aspects of the above-described present disclosure can be combined with some or all of the technical features included in other aspects of the above-described present disclosure and can also be realized in independent aspects of the present disclosure.

BRIEF DESCRIPTION OF THE DRAWINGS

The invention will be described with reference to the accompanying drawings, wherein like numbers reference like elements.

FIG. 6 is a table illustrating examples of values of an earlier torque control signal, values of a later torque control signal, a third torque control signal generated using the earlier and later torque control signals, and weights of the values of the earlier torque control signal and the values of the later torque control signal generated in the time section illustrated in FIG. 5 by the filter processing unit.

FIG. 11 is a table illustrating examples of conditions in which the vibration reduction process is not executed and timings at which the vibration reduction process is valid after the vibration reduction process is invalid under each condition when an instruction to execute the vibration reduction process is received by a control signal generation unit from a user.

FIG. 12 is a diagram illustrating an example of a program list operating the robot.

FIG. 13 is a diagram illustrating an indication of a display when a computer system including the display is connected to a robot control device.

DESCRIPTION OF EXEMPLARY EMBODIMENTS

A. Configuration of Robot System

Figure 1:
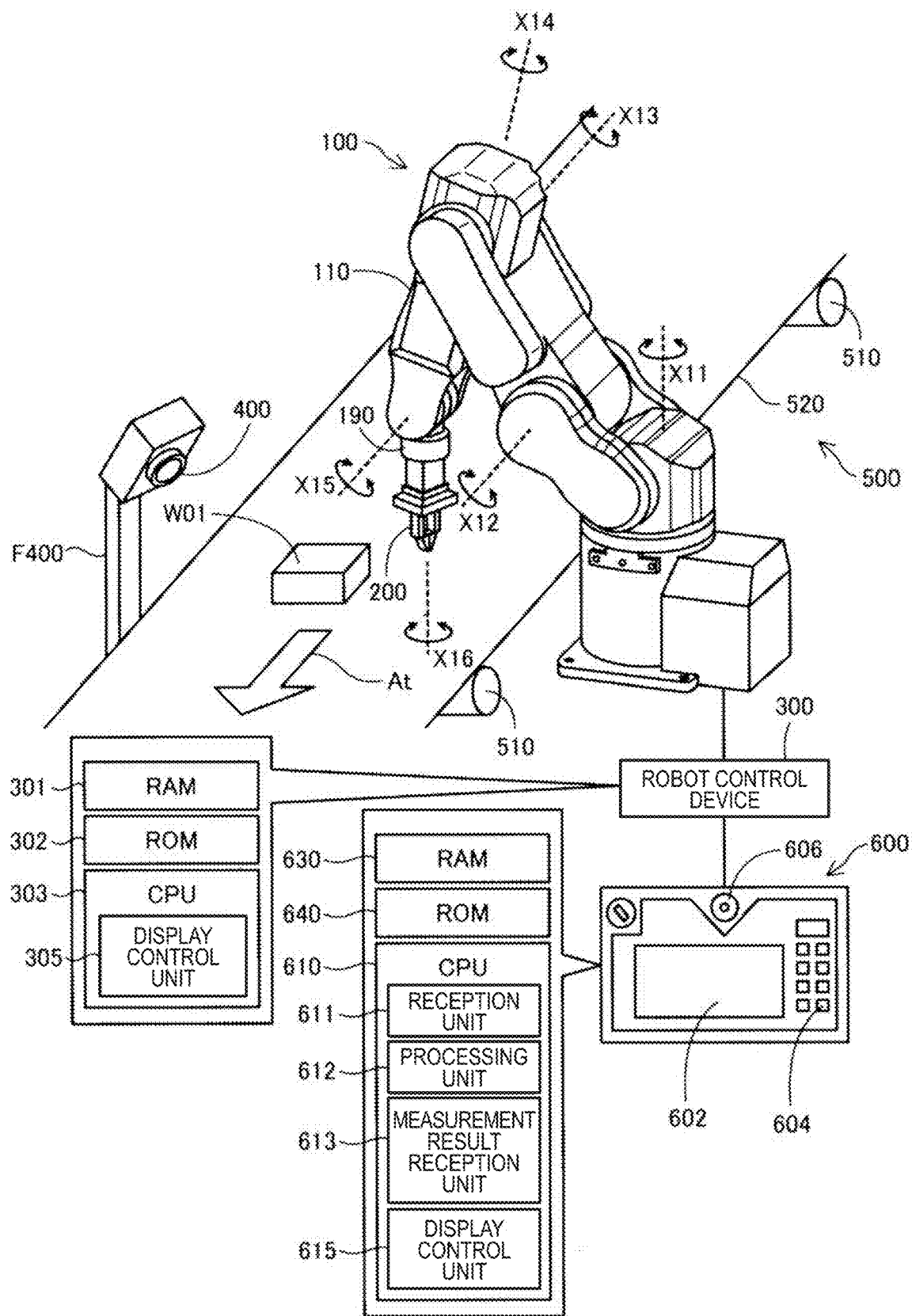
FIG. 1 is a diagram illustrating a robot system according to an embodiment.

FIG. 1 is a diagram illustrating a robot system according to an embodiment. The robot system according to the embodiment includes a robot 100, an end effector 200, a robot control device 300, a camera 400, and a transport device 500.

The robot 100 is a 6-axis robot including an arm 110 that has six rotary joints X11 to X16. The joints X11, X14, and X16 are torsion joints. The joints X12, X13, and X15 are flexural joints. The robot 100 can dispose the end effector 200 installed at a distal end of the arm 110 at an attitude designated at a position designated in a 3-dimensional space by rotating each of the six joints X11 to X16 using each servo motor. A spot representing the position of the end effector 200 in the 3-dimensional space is referred to as a tool center point (TCP).

The robot 100 includes a force sensor 190 at the distal end of the arm 110. The end effector 200 is installed in the arm 110 of the robot 100 via the force sensor 190. The force sensor 190 can measure forces in triaxial directions of the X, Y, and Z axes acted on the end effector 200 and torque around the X, Y, and Z axes. An output of the force sensor 190 is transmitted to the robot control device 300 to be used for control of the robot 100.

The robot control device 300 is connected to the robot 100 and controls an operation of the robot 100. More specifically, the robot control device 300 drives the servo motor moving the joints X11 to X16 of the robot 100.

The robot control device 300 is instructed to execute an operation of designating the robot 100 by a robot instruction device 600. The robot instruction device 600 is a so-called "teaching pendant". When the robot 100 is actually managed, the robot instruction device 600 first gives an instruction to the robot before the management of the robot 100. The robot control device 300 stores an instruction result as data. The robot control device 300 controls the robot 100 based on data indicating the stored instruction result in a stage of the management of the robot 100.

The transport device 500 is a belt conveyer including rollers 510 and a belt 520. The transport device 500 moves the belt 520 in a direction indicated by an arrow At in FIG. 1 by driving the rollers 510. The transport device 500 loads a work piece W01 on the belt 520 and transports the work piece W01 in the direction indicated by the arrow At. The work piece W01 is a target which is worked by the robot 100.

The end effector 200 is installed at the distal end of the arm 110. The end effector 200 is controlled by the robot control device 300 such that the end effector 200 can grasp the work piece W01 and can let go of the grasped work piece W01. As a result, for example, the robot 100 and the end effector 200 are controlled by the robot control device 300 such that the robot 100 and the end effector 200 can grasp and move the work piece W01 on the transport device 500.

The camera 400 can capture a photo image containing the work piece W01 located at a predetermined position on the transport device 500 and the periphery of the work piece W01. The image generated by the camera 400 is transmitted to the robot control device 300 to be used for control of the robot 100. The camera 400 is supported by a post F400. The camera 400 supported by the post F400 is shaken due to an operation of the robot 100 in some cases.

Figure 2:
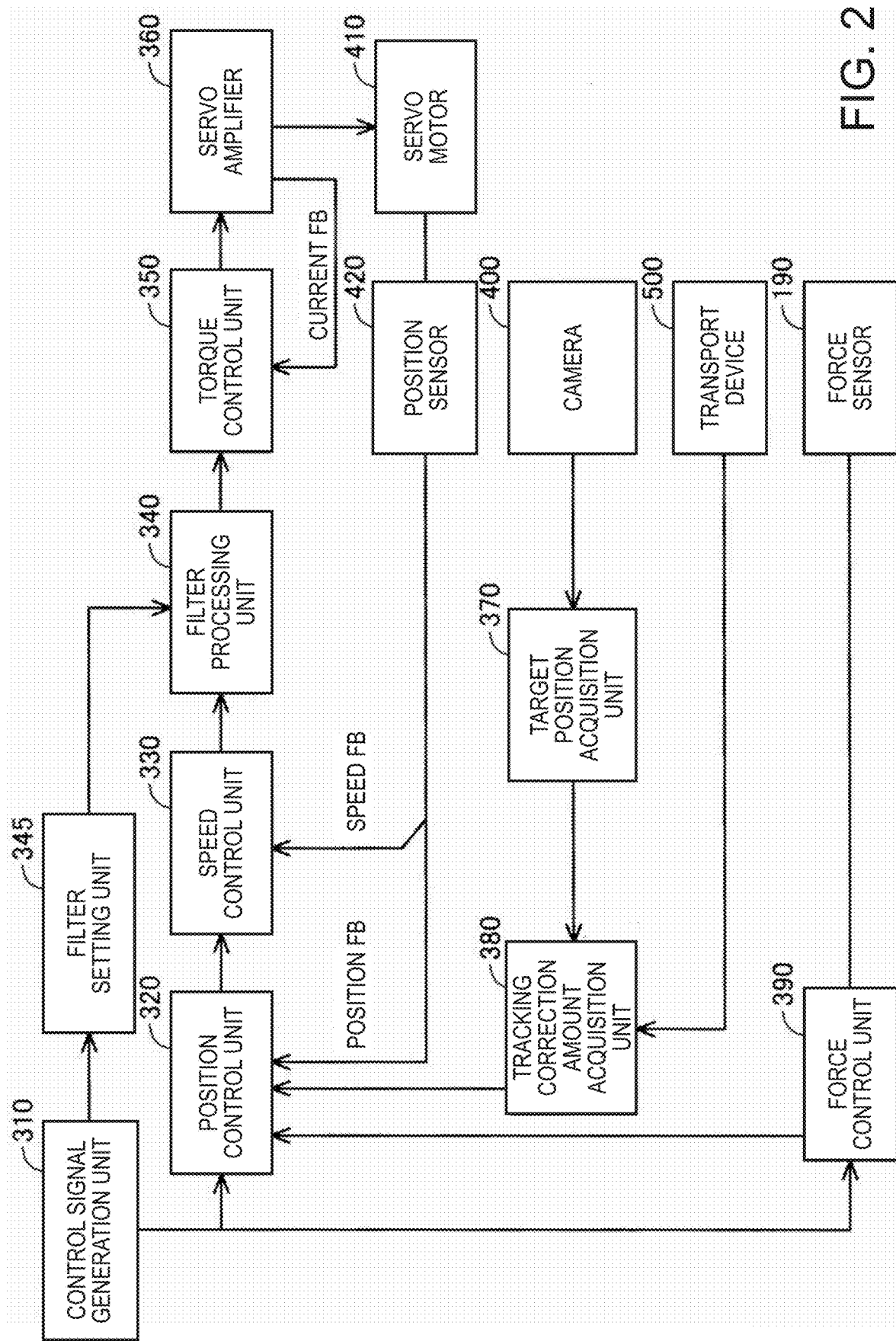
FIG. 2 is a block diagram illustrating a relation between constituent elements of a robot control device, and a robot, a camera, and a transport device.

FIG. 2 is a block diagram illustrating a relation between constituent elements of the robot control device 300, and the servo motor 410 and the position sensor 420 included in the robot 100, the camera 400, and the transport device 500. The robot control device 300 includes a control signal generation unit 310, a position control unit 320, a speed control unit 330, a filter processing unit 340, a torque control unit 350, a servo amplifier 360, a filter setting unit 345, a target position acquisition unit 370, a tracking correction amount acquisition unit 380, and a force control unit 390.

The control signal generation unit 310 generates a position control signal indicating a target position at which the end effector 200 is to be located and outputs the position control signal to the position control unit 320. When an instruction to execute tracking control is received from a user, the control signal generation unit 310 outputs a control signal for executing the tracking control to the position control unit 320. When an instruction to execute force control is received from the user, the control signal generation unit 310 outputs a control signal for executing the force control to the position control unit 320.

When an instruction to execute the force control is received from the user, the control signal generation unit 310 generates a force control signal indicating a force and a direction of the force to be generated by the end effector 200 and torque and a direction of the torque and outputs the force control signal to the force control unit 390. The control signal generation unit 310 outputs a control signal indicating whether a vibration reduction process is executed in response to an instruction input in advance from the user to the filter setting unit 345. The control signal generation unit 310 outputs a command indicating an operation which is executed by the robot 100 (for example, a command for executing CP control or a "Power Low" command) to the filter setting unit 345.

The target position acquisition unit 370 specifies a position of the work piece W01 transported by the transport device 500 based on the photo image of the periphery of the work piece W01 received from the camera 400 and outputs the position of the work piece W01.

The transport device 500 outputs a signal indicating rotational positions of the rollers 510. The belt 520 is driven by the rollers 510 and the work piece W01 on the belt 520 is loaded. Therefore, based on the rotational positions of the rollers 510, a current position of the work piece W01 transported on the belt 520 can be estimated.

The tracking correction amount acquisition unit 380 receives a signal indicating the rotational positions of the rollers 510 from the transport device 500. The tracking correction amount acquisition unit 380 receives the position of the work piece W01 from the target position acquisition unit 370. The tracking correction amount acquisition unit 380 determines the current position of the work piece W01 transported by the transport device 500 based on such information. Then, the tracking correction amount acquisition unit 380 determines a tracking correction amount suitable for the current position of the work piece W01 based on the current position of the work piece W01 and outputs the tracking correction amount.

The force control unit 390 receives the force control signal indicating the force and the direction of the force to be generated by the end effector 200 and the torque and the direction of the torque from the control signal generation unit 310. The force control unit 390 receives forces in the triaxial directions of the X, Y, and Z axes acted on the end effector 200 and torque around the X, Y, and Z axes from the force sensor 190. Then, the force control unit 390 determines a position correction amount based on these parameters and outputs the position correction amount.

Each position sensor 420 is installed in the servo motor 410 driving each joint of the robot 100. The position sensor 420 detects a rotational position and a rotational speed of the servo motor 410 and transmits the rotational position and the rotational speed of the servo motor 410 to the robot control device 300.

The position control unit 320 receives the position control signal from the control signal generation unit 310. The position control unit 320 receives the position correction amount from the force control unit 390. The position control unit 320 receives the rotational position of each servo motor 410 as position feedback from the position sensor 420 of the robot 100. Further, the position control unit 320 receives the current position of the work piece W01 from the tracking correction amount acquisition unit 380. The position control unit 320 generates a speed control signal of each servo motor 410 of the robot 100 based on the information and outputs the speed control signal.

When the instruction to execute the tracking control is not received from the control signal generation unit 310, the position control unit 320 does not consider the information received from the tracking correction amount acquisition unit 380 at the time of generating the speed control signal. When the instruction to execute the force control is not received from the control signal generation unit 310, the position control unit 320 does not consider the information received from the force control unit 390 at the time of generating the speed control signal.

The speed control unit 330 receives the speed control signal from the position control unit 320. The speed control unit 330 receives the rotational speed of each servomotor 410 from the position sensor 420 of the robot 100 as a speed feedback. The speed control unit 330 generates a torque control signal based on the speed control signal and the rotational speed of each servo motor 410 and outputs the torque control signal.

The filter setting unit 345 receives a command indicating an operation which is being executed from the control signal generation unit 310. The filter setting unit 345 generates a control signal instructing one or more frequencies which are to be eliminated from the torque control signal in response to the received command and outputs the control signal. The filter setting unit 345 can also output a control signal indicating that there is no frequency which is to be eliminated from the torque control signal.

The filter processing unit 340 receives the torque control signal from the speed control unit 330. The filter processing unit 340 receives the control signal for one or more frequencies which are to be eliminated from the filter setting unit 345. The filter processing unit 340 executes a process of eliminating one or more frequency components according to the control signal on the torque control signal output by the speed control unit 330 to generate a new torque control signal and outputs the new torque control signal. The filter processing unit 340 executes this process using a band-elimination filter.

The frequency which is to be eliminated in the filter processing unit 340 is a frequency determined in advance in response to a command indicating an operation which is being executed. When the robot 100 holds the work piece W01 (i) at an attitude of the robot 100 at an end time point of the operation or (ii) at the end time point of the operation, the frequency determined in advance in response to the command indicating the operation which is being executed is a vibration frequency of vibration of the robot 100 at the attitude of the robot 100 at the end time point of the operation in a state in which the work piece W01 is held. By performing such a process, it is possible to prevent a situation in which the robot 100 resonates at the vibration frequency at the end time point of the operation. Hereinafter, in the present specification, a process of reducing the resonance of a control target at the frequency by reducing a predetermined frequency component of a control signal such as a torque control signal is referred to as a "vibration reduction process". In addition, a function of reducing resonance of a control target at the frequency by reducing the predetermined frequency component of the control signal is referred to as a "vibration reduction function".

When the control signal indicating that there is no frequency which is to be eliminated is received from the filter setting unit 345, the filter processing unit 340 outputs the torque control signal received from the speed control unit 330 without change. By executing the process, it is possible to drive the robot faithfully for the original control signal based on the torque control signal received from the speed control unit 330.

The torque control unit 350 receives the torque control signal from the filter processing unit 340. The feedback signal indicating a current amount of a current supplied to each servo motor 410 is received from the servo amplifier 360. The torque control unit 350 determines the current amount to be supplied to each servo motor 410 based on the torque control signal and the current feedback signal of each servo motor 410 and drives each servo motor 410 via the servo amplifier 360.

B. Control of Robot System (1) Switching of Vibration Reduction Process

Figure 3:
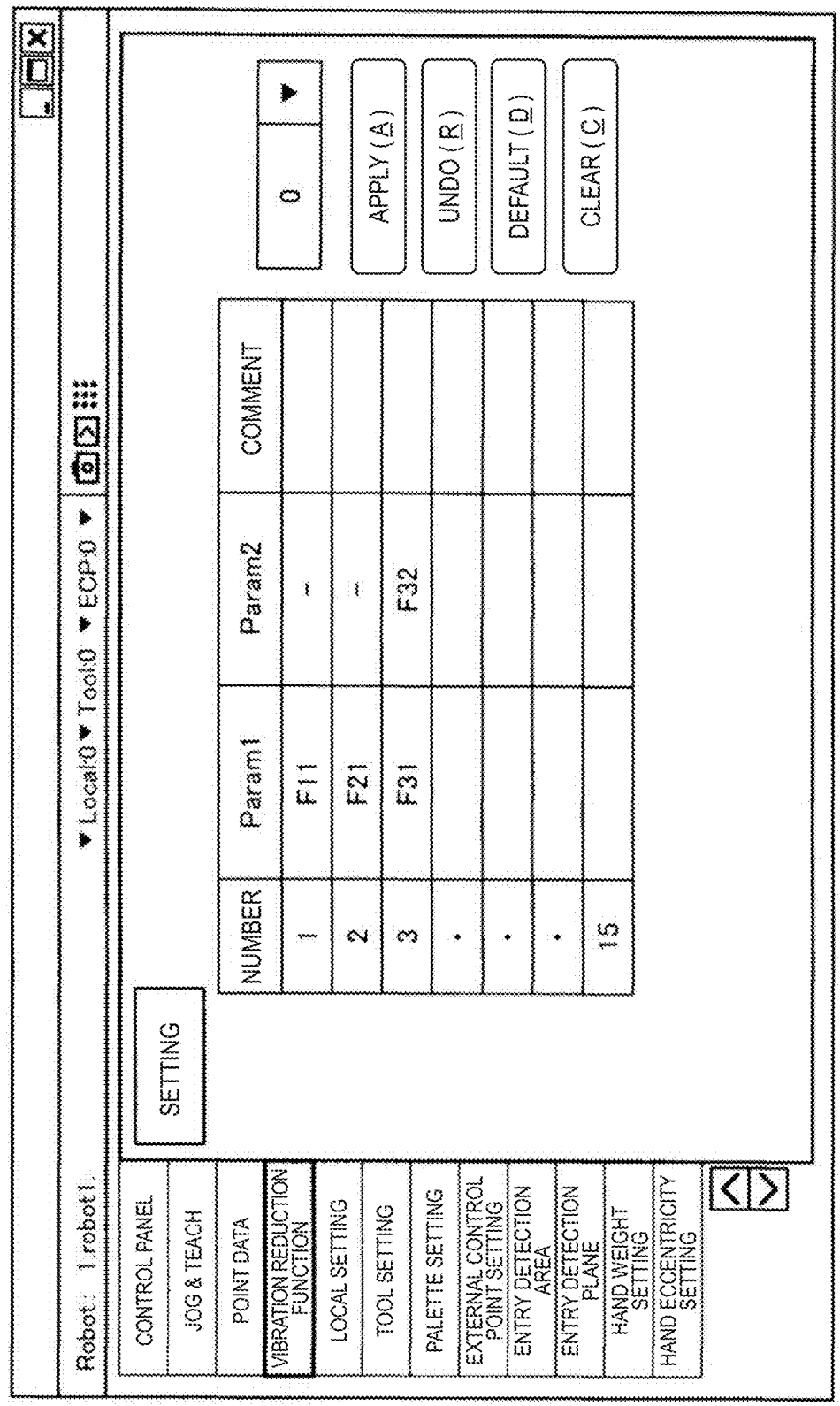
FIG. 3 is a diagram illustrating an indication indicating a target vibration frequency which is to be eliminated from a torque control signal set in a vibration reduction process according to the embodiment.

FIG. 3 is a diagram illustrating an indication indicating a frequency which is to be eliminated from a torque control (in the present specification, referred to as a "target vibration frequency") signal set in a vibration reduction function according to the embodiment. The indication of FIG. 3 is displayed on a display 602 when the robot instruction device 600 functioning as a setting device with a vibration reduction function including the display 602 is connected to the robot control device 300 and the vibration reduction function is set. A left end column of a table is a number for discriminating setting. The user can set a maximum of two target vibration frequencies for the vibration reduction function corresponding to each number. The "target vibration frequency" may be an eigenfrequency of the system or may be a vibration frequency near the eigenfrequency of the system.

In the example of FIG. 3, in the column of number 1, F11 indicating one target vibration frequency is stored as a first parameter Param1. In the column of number 2, F21 indicating one target vibration frequency is stored as the first parameter Param1. In the column of number 3, F31 and F32 indicating two target vibration frequencies are stored as parameters Param1 and Param2. That is, in setting of number 3, two frequency components are eliminated from the original torque control signal (see reference numeral 340 in FIG. 2). Numerical values stored as Param1 and Param2 may be frequencies or may be any numerical values or signs for uniquely determining the frequencies.

In the embodiment, processing content of the vibration reduction function is switched in a plurality of operations included one work. That is, in the plurality of operations included in one work, the frequency component which is to be eliminated from the torque control signal is converted. For example, after the frequency component of F11 is eliminated according to the setting of number 1 in FIG. 3 in a certain operation, the frequency component of F21 is eliminated according to setting of number 2 in FIG. 3 in a subsequent operation.

By executing such a process, it is possible to reduce resonance at the attitude at the end time point of each operation when the plurality of operations are included in one work. In the embodiment, the frequency component which is to be eliminated is converted on all the motors driving the joints of the robot 100 at the same timing.

Figure 4:
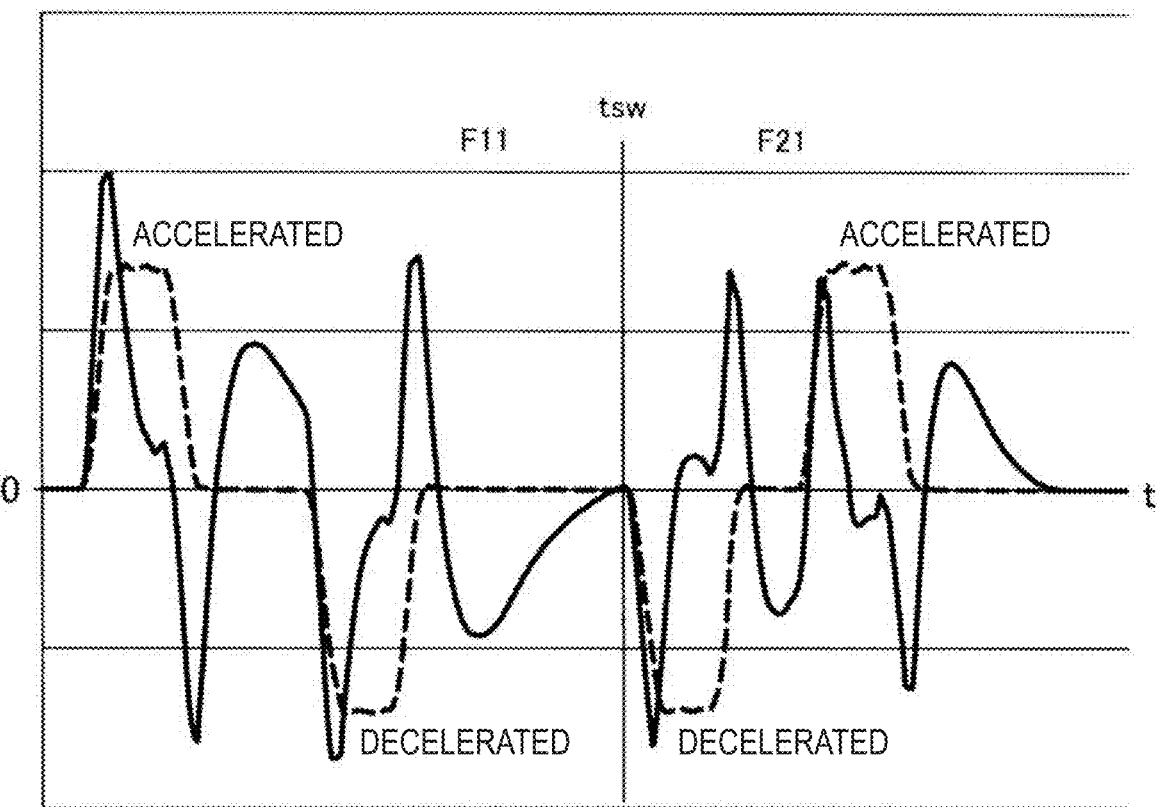
FIG. 4 is a graph illustrating a change in a torque control signal value in two continuous operations.

FIG. 4 is a graph illustrating a change in a torque control signal value in two continuous operations. In FIG. 4, the horizontal axis represents a time and the vertical axis represents a value of the torque control signal. In the graph of FIG. 4, a dotted graph represents a value of the torque control signal output by the speed control unit 330 (see FIG. 2). A solid graph represents a value of the torque control signal output by the filter processing unit 340. The filter processing unit 340 switches the frequency which is to be eliminated from the torque control signal at time tsw from the frequency of F11 to the frequency of F21. As a result, the value of the torque control signal output by the filter processing unit 340 is indicated by the solid line in FIG. 4.

Although not illustrated in FIG. 4, the filter processing unit 340 outputs an intermediate torque control signal when the torque control signal from which the frequency of F11 is eliminated is switched to the torque control signal from which the frequency of F21 is eliminated.

More specifically, when the torque control signal from which the frequency of F11 is eliminated (hereinafter referred to as an "earlier torque control signal") is switched to the torque control signal from which the frequency of F21 is eliminated (hereinafter referred to as a "later torque control signal"), the filter processing unit 340 calculates both a value of the earlier torque control signal and a value of the later torque control signal in a predetermined time section. Then, a value of a third torque control signal is generated according to a weighted mean of values of the two torque control signals. The filter processing unit 340 can selectively output the earlier torque control signal, the later torque control signal, and the third torque control signal.

When the earlier torque control signal and the later torque control signal are switched, switching for reducing disorder of the torque and allophone can be executed by executing an output of the intermediate third torque control signal between an output of the earlier torque control signal and an output of the later torque control signal. Then, compared to an aspect in which vibration caused due to an operation according to the earlier torque control signal is converged without using the third torque control signal and the later torque control signal is output, it is possible to shorten a time in which an operation according to the later torque control signal starts after an operation according to the earlier torque control signal.

In FIG. 4, the example in which two torque control signals from which the predetermined frequency components indicated by the parameters F11 and F21 are eliminated are switched has been described. However, the same advantage can be obtained by outputting the intermediate third torque control signal even when the torque control signal from which the predetermined frequency component is eliminated and the torque control signal from which the frequency component is not eliminated (the torque control signal output by the speed control unit 330) are switched.

Figure 5:
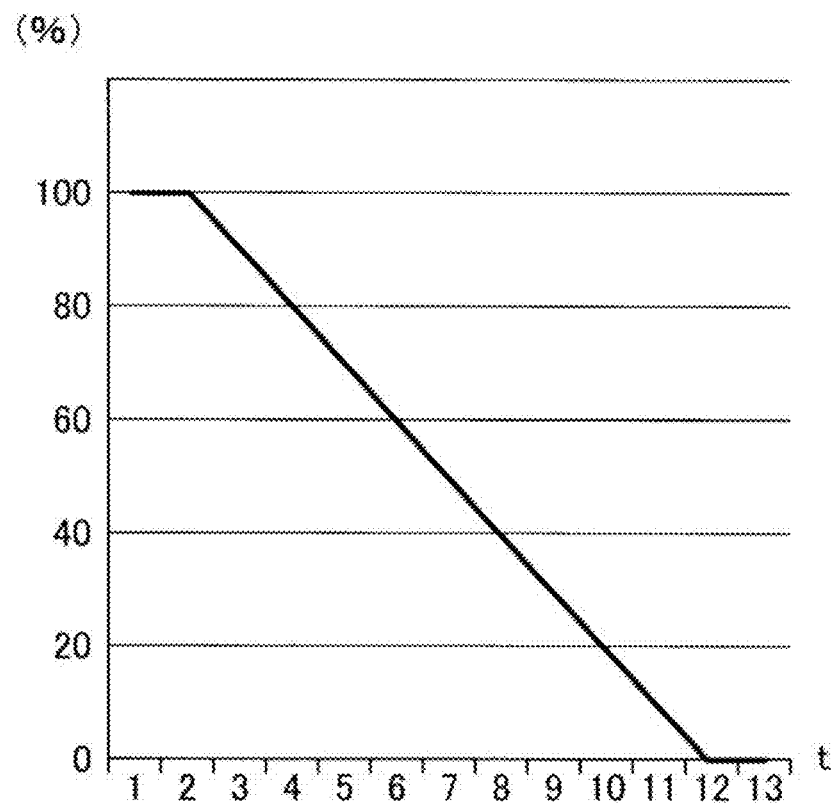
FIG. 5 is a graph illustrating an example of a ratio [%] of a weight added to a value of an earlier torque control signal when a filter processing unit generates a third torque control signal.

FIG. 5 is a graph illustrating an example of a ratio [%] of a weight (mixture ratio) added to the value of the earlier torque control signal when the filter processing unit 340 generates the third torque control signal. In FIG. 5, the horizontal axis represents a time. Here, a time section illustrated in FIG. 5 corresponds to, for example, a very short time near the time tsw illustrated in FIG. 4.

FIG. 6 is a table illustrating examples of values of the earlier torque control signal, values of the later torque control signal, values of the third torque control signal generated using the earlier and later torque control signals, and weights of the values of the earlier torque control signal and the values of the later torque control signal generated in the time section illustrated in FIG. 5 by the filter processing unit 340. The graph of FIG. 5 is a graph of the weight (mixture ratio) of the earlier torque control signal shown in the second column from the right side of FIG. 6 in a time axis direction. The values of the earlier torque control signal and the values of the later torque control signal illustrated in FIG. 6 are examples and do not correspond to the graph of FIG. 4.

The filter processing unit 340 outputs the plurality of third torque control signals between first and second torque control signals. At this time, as illustrated in the graph of FIG. 5 and the table of FIG. 6, the filter processing unit 340 generates the plurality of third torque control signals in the descending order of the weights of the values of the earlier torque control signal and outputs the third torque control signals. In the present specification, "output of X in a descending order of A" includes an aspect in which a plurality of X with the same value of A are continuously output. For example, in FIG. 5, the weight of the value of the earlier torque control signal is constant in a time section 1 to 2 and time sections 12 to 13 (see FIGS. 5 and 6).

By executing such a process, the frequency component to be eliminated is changed at the time of transition from a certain operation to a subsequent operation, the value of the torque control signal is considerably changed for an elapse time of 0, and thus a situation of the disorder of torque or occurrence of allophone can be prevented. By gradually changing the weight and switching the value of the control signal, a subsequent operation can be started in a short time compared to an aspect in which a change in the value of the control signal or vibration of the robot caused due to a previous operation is converted to a predetermined value or less and a subsequent operation is then executed.

Figure 7:
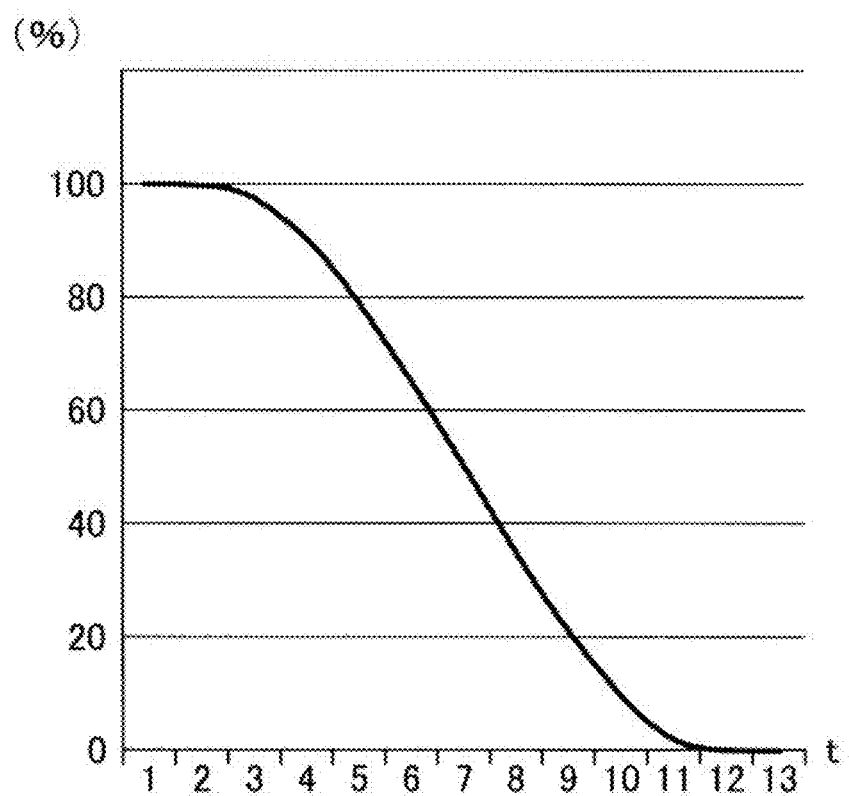
FIG. 7 is a graph illustrating an example of a ratio [%] of a weight added to a value of an earlier torque control signal when a filter processing unit generates a third torque control signal.

FIG. 7 is a graph illustrating another example of a ratio [%] of a weight (mixture ratio) added to the value of the earlier torque control signal when the filter processing unit 340 generates the third torque control signal. In FIG. 7, the horizontal axis represents a time. Here, a time section illustrated in FIG. 7 corresponds to the very short time near the time tsw illustrated in FIG. 4.

Figures 8, 9:
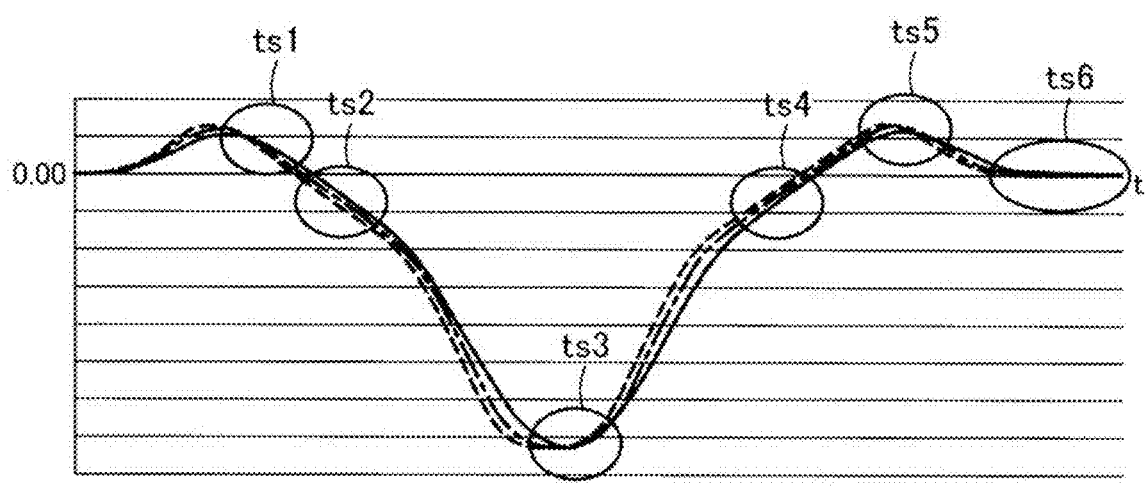
FIG. 8 is a table illustrating examples of values of an earlier torque control signal, values of a later torque control signal, a third torque control signal generated using the earlier and later torque control signals, and weights of the values of the earlier torque control signal and the values of the later torque control signal generated in the time section illustrated in FIG. 7 by the filter processing unit.
FIG. 9 is a graph illustrating a position of a distal end of an arm of the robot in a certain direction.

FIG. 8 is a table illustrating examples of weights of values of the earlier torque control signal, values of the later torque control signal, values of the third torque control signal generated using the earlier and later torque control signals, and weights of the values of the earlier torque control signal and the values of the later torque control signal generated in the time section illustrated in FIG. 7 by the filter processing unit 340. The graph of FIG. 7 is a graph of the weight (mixture ratio) of the earlier torque control signal shown in the second column from the right side of FIG. 8 in a time axis direction. The values of the earlier torque control signal and the values of the later torque control signal illustrated in FIG. 8 are examples and do not correspond to the graph of FIG. 4.

In the examples of FIGS. 5 and 6, the weight (the mixture ratio) added to the value of the earlier torque control signal linearly decreases during the predetermined time section. In the example of FIG. 7, however, a change ratio of the weight (mixture ratio) added to the value of the earlier torque control signal near the time of starting a conversion process from the earlier torque control signal to the later torque control signal (see time sections 1 to 4 in FIG. 7) and near the time of ending the conversion process from the earlier torque control signal to the later torque control signal (see time sections 10 to 13 in FIG. 7) is less than in the section (see time sections 5 to 9 in FIG. 7) between the time sections 1 to 4 and 10 to 13. In such an aspect, the transition in which change in torque or occurrence of allophone is smaller can be realized compared to the examples of FIGS. 5 and 6.

The filter processing unit 340 executes the conversion process described above with reference to FIGS. 5 to 8 in the predetermined time section including the time tsw in FIG. 4. A timing at which the conversion of the frequency component to be eliminated by the filter processing unit 340 starts is a timing at which both the following conditions 1 and 2 are satisfied.

In the present specification, "outputting a ~ control signal when a certain condition is satisfied" in a certain configuration is not limited to a case in which "whether the certain condition is satisfied" is determined in the configuration and a predetermined control signal is output. That is, in a case in which a situation in which "a certain condition is satisfied" objectively occurs, "a ~ control signal is output when the certain condition is satisfied in the configuration" is satisfied when a predetermined control signal is output in the configuration.

[Condition 1] A deviation between the position of the distal end of the arm 110 of the robot 100 in the case of conformation to an earlier output torque control signal (earlier torque control signal) and the position of the distal end of the arm 110 of the robot 100 in the case of conformation to a later output torque control signal (later torque control signal) is less than a position threshold determined in advance.

[Condition 2] A deviation between a speed of the distal end of the arm 110 of the robot 100 in the case of conformation to an earlier output torque control signal and a speed of the distal end of the arm 110 of the robot 100 in the case of conformation to a later output torque control signal is less than a speed threshold determined in advance.

FIG. 9 is a graph illustrating the position of the distal end of the arm 110 of the robot 100 in a certain direction. In FIG. 9, the horizontal axis represents a time. A dotted graph is a graph that shows the position of the distal end of the arm 110 of the robot 100 in a case in which a specific frequency component is not eliminated in the filter processing unit 340. A solid graph is a graph that shows the position of the distal end of the arm 110 of the robot 100 in a case in which the frequency component F11 is eliminated, that is, the earlier torque control signal is output, in the filter processing unit 340. A one-dot chain graph is a graph that shows the position of the distal end of the arm 110 of the robot 100 in a case in which the frequency component F21 is eliminated, that is, the later torque control signal is output, in the filter processing unit 340.

For example, the solid graph in the case in which the frequency component F11 is eliminated and the one-dot chain graph in the case in which the frequency component F21 is eliminated intersect each other at times ts1 and ts5. Therefore, at the intersections of the graphs, a deviation in the position of the distal end of the arm 110 in both the cases is 0 (see Condition 1). However, a slope of the solid graph in the case in which the frequency component F11 is eliminated and a slope of the one-dot chain graph in the case in which the frequency component F21 is eliminated are different in both the intersections. That is, there is a deviation in a speed of the distal end of the arm 110 between both the cases. The magnitude of the deviation in the speed is greater than a speed threshold in the embodiment (see Condition 2). For this reason, the times ts1 and ts5 are timings unsuitable for the conversion of the frequency.

For example, the solid graph in the case in which the frequency component F11 is eliminated and the one-dot chain graph in the case in which the frequency component F21 is eliminated are almost parallel at times ts2 and ts4. Therefore, the deviation in the speed at the distal end of the arm 110 between both the cases is close to 0 (see Condition 2). However, the one-dot chain graph in the case in which the frequency component F21 is eliminated and the solid graph in the case in which the frequency component F11 is eliminated are apart. That is, there is the deviation in the position of the distal end of the arm 110 between the both cases. In addition, the magnitude of the deviation in the position is greater than the position threshold in the embodiment (see Condition 1). For this reason, the times ts2 and ts4 are timings unsuitable for the conversion of the frequency either.

At a time ts3, on the other hand, the solid graph in the case in which the frequency component F11 is eliminated and the one-dot chain graph in the case in which the frequency component F21 is eliminated interest each other. Therefore, the deviation in the position of the distal end of the arm 110 in both the cases is 0 (see Condition 1). In addition, the slope of the solid graph in the case in which the frequency component F11 is eliminated and the slope of the one-dot chain graph in the case in which the frequency component F21 is eliminated are closely parallel to each other. That is, the deviation in the speed of the distal end of the arm 110 in both the cases is less than the speed threshold in the embodiment (see Condition 2). For this reason, the time ts3 is a timing suitable for the conversion of the frequency. The same applies to ts6.

By converting the frequency which is to be eliminated under such conditions, it is possible to execute the conversion in which disorder of the torque or allophone is small, compared to an aspect in which the switching is executed regardless of the conditions.

In the present specification, the filter processing unit 340 is also referred to as a "reception unit", a "second control signal generation unit", a "third control signal generation unit", and a "control signal switching unit". A torque control signal generated by the speed control unit 330 is also referred to as a "first control signal". A torque control signal generated by executing the filter processing unit 340 by executing a process of eliminating one or more frequency components from the torque control signal received from the speed control unit 330 is also referred to as a "second control signal". A torque control signal generated from the earlier torque control signal and the later torque control signal by the filter processing unit 340 is also referred to as a "third control signal". The torque control unit 350 and the servo amplifier 360 are also referred to as a "driving signal generation unit".

A torque control signal generated by the filter processing unit 340 through the vibration reduction function of number 1 in FIG. 3 (see the left side of FIG. 4) is also referred to as the "second control signal of a first type" in the present specification. A frequency component indicated by F11 in FIG. 3 to be eliminated at that time is also referred to as a "first frequency component". A torque control signal generated by the filter processing unit 340 through the vibration reduction function of number 2 in FIG. 3 (see the right side of FIG. 4) is also referred to as a "second type second control signal". A frequency component indicated by F21 in FIG. 3 to be eliminated at that time is also referred to as a "second frequency component".

(2) Automatic ON/OFF of Vibration Reduction Process

In the embodiment, the filter setting unit 345 (see FIG. 2) generates and outputs (i) a control signal for giving an instruction for one or more frequencies which is to be eliminated from a torque control signal or (ii) a control signal indicating that there is no frequency which is to be eliminated from a torque control signal in response to a command received from the control signal generation unit 310. Hereinafter, a case in which the filter setting unit 345 generates a control signal indicating that there is no frequency which is to be eliminated from a torque control signal will be described in more detail.

Figure 10:
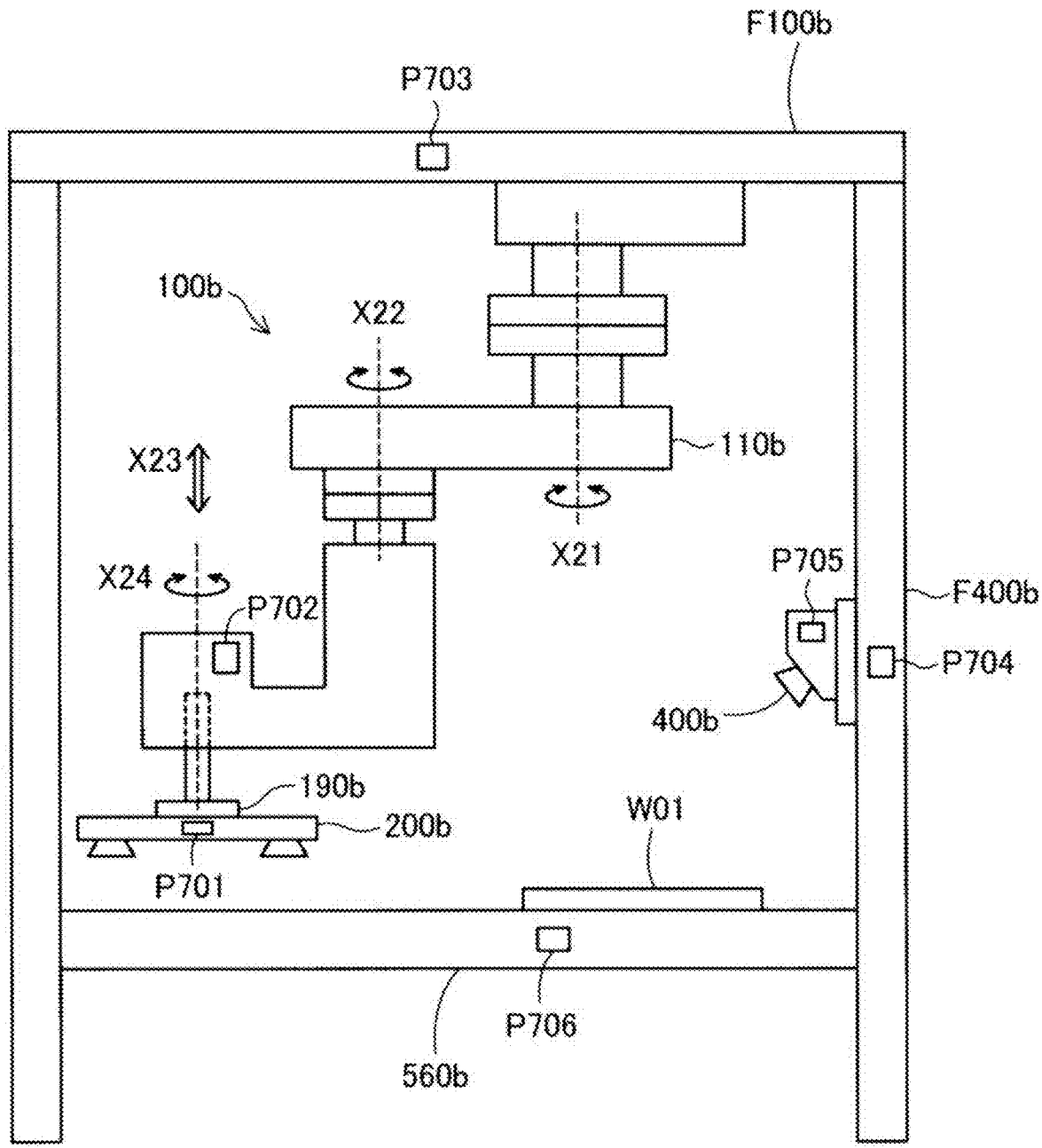
FIG. 10 is a diagram illustrating a robot referred to when automatic ON/OFF of setting of a vibration reduction process is described.

FIG. 10 is a diagram illustrating a robot 100b referred to when automatic ON/OFF of setting of the vibration reduction function is described. The robot system mentioned herein does not include the transport device 500. A hardware configuration of the robot 100b is different from the robot 100.

The robot 100b is mounted on a frame F100b. The frame F100b includes a substantially rectangular top plate and a substantially rectangular support 560b. The frame F100b is supported by four supports binding four corners of the top plate and four corners of the support 560b. The robot 100b is fixed to the top plate of the frame F100b and extends from the top plate downwards.

A camera 400b is installed in one post F400b of the four supports of the frame F100b. A configuration and a function of the camera 400b are the same as the camera 400. The work piece W01 is loaded on the support 560b of the frame F100b.

The robot 100b is a 4-axis robot that includes an arm 110b having four joints X21 to X24. The joints X21, X22, and X24 are torsion joints. The joint X23 is a translation joint. The robot 100 can dispose an end effector 200b installed at a distal end of an arm 110b at an attitude designated at a position designated in a 3-dimensional space by driving the four joints X21 to X24 using each servo motor.

The robot 100b includes a force sensor 190b at the distal end of the arm 110b. The function of the force sensor 190b is the same as the force sensor 190 of the robot 100 in FIG. 1.

The end effector 200b is installed at the distal end of the arm 110b of the robot 100b. The end effector 200b can be controlled by a robot control device (not illustrated) to hold the work piece W01 and can let go of the held work piece W01. As a result, for example, the robot 100b and the end effector 200b can be controlled by the robot control device to lift and move the work piece W01 on the support 560b and execute a work.

The robot control device controlling the robot 100b does not receive a signal indicating rotational positions of the rollers 510 from the transport device 500 (see reference numeral 500 in FIG. 2). Differences from the robot control device controlling the robot 100b are the same as the robot control device 300 in FIG. 2. To facilitate the technical understanding, the robot control device is omitted in FIG. 10.

FIG. 11 is a table illustrating examples of conditions in which the vibration reduction process is not executed and timings at which the vibration reduction function is valid after the vibration reduction function is invalid under each condition when an instruction to execute the vibration reduction process is received by the control signal generation unit 310 from a user. Hereinafter, conditions in which the vibration reduction process is not executed will be described.

(i) Executing "Motor On" Command

The servo motor of the robot 100b is excited according to "Motor On". In a state before "Motor On", the user can manually move the arm 110b of the robot 100b freely. "Motor On" does not designate a rotational position of the servo motor. Therefore, when the arm 110b of the robot 100b has already been moved by the user, the servo motor of the robot 100b maintains the attitude of the arm 110b and is excited even when the attitude of the arm 110b is different from a basic attitude originally taken by the arm 110b at the time of power ON. That is, when the "Motor On" command is executed, the control signal generation unit 310 (see FIG. 2) outputs a position control signal indicating an actual attitude of the arm 110b based on an output of the position sensor 420 rather than the basic attitude which is taken at the time of power ON.

In this case, the position control signal is changed for an elapse time of 0 from the basic attitude which is taken at the time of power ON, that is, the attitude assumed by the system, to the attitude manually moved by the user. At this time, when the filter processing unit 340 (see FIG. 2) executes the vibration reduction process of eliminating a predetermined frequency, the torque control signal which has to be 0 is changed from an original value of 0 (for example, see FIG. 4). As a result, the arm 110b which has to be moved may be moved. For this reason, when the "Motor On" command is executed, the vibration reduction process is not executed (see the left column and the first row of FIG. 11).

(ii) Executing "Motor Off" Command

The servo motor of the robot 100b is not excited according to "Motor Off". After the "Motor Off" command is executed, the servo motor of the robot 100b is not driven until the "Motor On" command is executed. Therefore, the vibration reduction process is not executed (see the left column and the second row of FIG. 11).

(iii) Executing "Power Low" Command

"Power Low" is a command for designating a first operation mode in which an operation is executed so that torque of a motor driving the robot does not exceed a predetermined first threshold. In the first operation mode, the torque generated by the servo motor is small. Therefore, acceleration of the arm 110b of the robot 100b is small. Accordingly, when one operation ends and the arm 110b is stopped, there is a low possibility of the robot also resonating. For this reason, when the "Power Low" command is executed, a request for executing the vibration reduction process is not high.

Conversely, when the vibration reduction process is executed, the value of the torque control signal is changed from the original value (for example, see FIG. 4). As a result, acceleration applied to the arm 110b and the end effector 200b of the robot is also deviated from the original value. Then, the position feedback is controlled (see FIG. 2), but the end effector 200b is located at a position subtly deviating from a position designated by the original position control signal. It is not preferable that the position deviation occurs during executing a command in which the request for executing the vibration reduction process is not high. Accordingly, while the "Power Low" command is executed and the robot is operating in the first operation mode, the vibration reduction process is not executed (see the left column and the third row of FIG. 11).

(iv) Executing "Power High" Command

"Power High" is a command for designating a second operation mode in which torque greater than the first threshold is permitted to be generated. In the second operation mode, the torque generated by the servo motor is large. Therefore, acceleration of the arm 110b of the robot is also large. Accordingly, when one operation ends, there is a high possibility that the robot which has to be stopped at an attitude at the time of ending an operation resonates. Accordingly, when the "Power High" command is executed, a request for executing the vibration reduction process is high. Accordingly, the vibration reduction function which is not executed at the time of executing the "Motor On" command and the "Motor Off" command and the time of executing "Power Low" command is executed again at the time of executing the "Power High" command (see the right column and the first row of FIG. 11). By executing such a process, the robot can be driven without resonating in the second operation mode in which acceleration of each unit of the robot is greater than in the first operation mode.

(v) Executing Tracking Control

When tracking control for causing the work piece W01 on the transport device 500 to track the end effector 200 (also referred to as a "tracking process") is executed (see reference numerals 380 and 500 in FIGS. 1 and 2), it is preferable that the end effector 200 accurately tracks the work piece W01 on the transport device 500. Accordingly, it is preferable that the vibration reduction function in which position deviation of the end effector 200b from the position of the original position control signal can occur is not executed during conveyer tracking. Accordingly, while the tracking control is executed, the vibration reduction process is not executed (see the left column and the fourth row of FIG. 11). Then, when the tracking control ends or the "Power High" command is executed, the vibration reduction process is executed (see the right column and the second row of FIG. 11). By executing such a process, it is possible to generate a driving signal for operating the robot while accurately tracking a moving target while the tracking control is executed.

(vi) Executing Force Control

When control is executing using force feedback (see reference numerals 190 and 390 in FIG. 2), the end effector 200b is preferably disposed at an accurate position according to the original position control signal. The position deviation of the end effector 200b occurs because a force or torque to be generated by the end effector 200b decreases or increases from the original value. Accordingly, while the force control is executing, the vibration reduction process is not executed (see the left column and the fifth row of FIG. 11). Then, when the force control ends or the "Power High" command is executed, the vibration reduction process is executed (see the right column and the second row of FIG. 11). By executing such a process, it is possible to generate a driving signal to operate the robot while accurately considering an external force or a reaction force added to the robot during executing the force control.

(vii) Executing Jog Operation

A jog operation is an operation of operating the servo motor of the robot without designating a movement distance. The jog operation is executed when the robot is instructed to execute an operation. The jog operation is executed at a relatively slow speed. Therefore, when the jog operation is being executed or the jog operation ends and the arm 110b is stopped, there is a low possibility of the robot resonating. Accordingly, when the jog operation is executed, a request for executing the vibration reduction process is not high. On the other hand, when the vibration reduction process is executed, as described above, there is a possibility that the end effector 200b is located at a subtly deviated position from a position designated by the original position control signal. Accordingly, while the jog operation is being executed, the vibration reduction process is not executed (see the left column and the sixth row of FIG. 11). Then, when the jog operation ends or the "Power High" command is executed, the vibration reduction process is executed (see the right column and the second row of FIG. 11).

(viii) Executing CP Control

Continuous path control is control in which the robot is operated along a movement path determined in advance. The continuous path control is also referred to as continuous path control (CP control). During the continuous path control, the end effector 200b is preferably disposed at the accurate position according to the original position control signal at each time. Accordingly, during executing the continuous path control, the vibration reduction process is not executed (see the left column and the seventh row of FIG. 11). Then, when the continuous path control ends or the "Power High" command is executed, the vibration reduction process is executed (see the right column and the second row of FIG. 11).

By executing such a process, it is possible to generate a driving signal to operate the robot accurately along the movement path determined in advance while the continuous path control is executed. When an instruction to execute frequency component reduction is input to the control signal generation unit 310, the robot can be driven so that the robot does not resonate at a predetermined frequency under another control.

FIG. 12 is a diagram illustrating an example of a program list operating the robot 100*b*. The automatic ON/OFF of the vibration reduction function and execution of the vibration reduction function will be described in the example of FIG. 12. In FIG. 12, commands to be mentioned below are underlined.

By executing the "Motor On" command, the vibration reduction function is not executed. Hereinafter, non-execution of the vibration reduction process is referred to as "turning Off the vibration reduction function". Thereafter, by executing the "Power High" command, the vibration reduction process is executed. Hereinafter, execution of the vibration reduction process is also referred to as "turning On the vibration reduction function".

"ABCSet 1, 30" is a command for setting a frequency of the vibration reduction function of number 1 to a predetermined frequency indicated by parameter "30" (see FIG. 3).

"ABCSet 2, 15, 30" is a command for setting a frequency of the vibration reduction function of number 2 to a predetermined frequency indicated by parameter "15" and the predetermined frequency indicated by parameter "30" (see FIG. 3).

"ABC 1" is a command indicating that the vibration reduction process of number 1 is executed (see FIG. 3).

"ABC 2" is a command indicating that the vibration reduction process of number 2 is executed (see FIG. 3).

When an instruction to execute reducing a frequency component is input from the filter setting unit 345 and a predetermined subordinate condition regarding a command or the like to be executed is satisfied by executing such a process, the filter processing unit 340 executes the vibration reduction process. As a result, the robot 100*b* can be driven so that the robot 100*b* does not resonate at the predetermined frequency. When the instruction to execute a reduction in a frequency component is not input from the filter setting unit 345, that is, a control signal indicating there is no frequency to be reduced is input, the filter processing unit 340 can drive the robot 100*b* faithfully for the original control signal.

In the embodiment, a case in which it is not preferable to execute the reduction in the frequency component is set as the subordinate condition (see FIG. 11). Therefore, even when the instruction to execute the reduction in the frequency component is input to the control signal generation unit 310, the frequency component is not automatically reduced in a case in which it is not preferable to execute the reduction in the frequency component. Accordingly, it is not necessary for the user to input the instruction to execute the reduction in the frequency component and an instruction not to execute the reduction in the frequency component in each scene. For this reason, a load of the instruction on the user is reduced.

FIG. 13 is a diagram illustrating indication of a display 602 when the robot instruction device 600 including the display 602 is connected to the robot control device. The indication of FIG. 13 is shown on a lower stage of the display 602. For example, while the vibration reduction process is executed during a series of works illustrated in FIG. 12, an indication Dvr such as "vibration reduction" is displayed with dark color. Conversely, while the vibration reduction process is not executed, the indication Dvr such as "vibration reduction" is displayed with lighter color than while the vibration reduction process is executed.

By executing such a process, the user can easily understand that the vibration reduction process is executed, a torque control signal indicating that there is a low possibility of the robot resonating is generated, and the robot is driven while the robot is operating (see FIGS. 12 and 13). Functional units of the robot control device 300 and the robot instruction device 600 executing such a process are illustrated as display control units 305 and 615 in FIG. 1. The display control unit 305 is realized by a CPU 303 of the robot control device 300. The display control unit 615 is realized by a CPU 610 of the robot instruction device 600.

In the present specification, the filter processing unit 340 is also referred to as a "second control signal generation unit" and a "control signal switching unit" (see FIG. 2). The control signal generation unit 310 is also referred to as a "reception unit". The torque control unit 350 and the servo amplifier 360 are also referred to as a "driving signal generation unit".

The fact that the control signal generation unit 310 (see FIG. 2) does not receive an instruction to execute the vibration reduction process from the user functions as "non-input of the instruction to execute the reduction in the frequency component" included in a "first condition". The fact that the control signal generation unit 310 (see FIG. 2) receives the instruction to execute the vibration reduction process from the user functions as "input of the instruction to execute the reduction in the frequency component" included in a "second condition".

The display 602 of the robot instruction device 600 connected to the robot control device is also referred to as a "display unit".

In the foregoing embodiment, the position control unit 320 receives an instruction to execute the tracking control from the control signal generation unit 310 and generates the speed control signal considering information received from the tracking correction amount acquisition unit 380 (see FIG. 2). As a result, the speed control unit 330 generates a torque control signal according to the speed control signal. The execution of such a process functions as "generation of the first control signal so that the tracking process of operating the robot while tracking a moving target" under the "subordinate condition" of a "third condition".

The force sensors 190 and 190*b* (see FIGS. 1, 2, and 10) are also referred to as a "force detection unit". The position control unit 320 receives an instruction to execute force control from the control signal generation unit 310 and generates a speed control signal considering information received from the force control unit 390 (see FIG. 2). As a result, the fact that the speed control unit 330 generates the torque control signal according to the speed control signal functions as "generation of the first control signal based on an output of the force detection unit installed in the robot" under the "subordinate condition".

In the foregoing embodiment, the control signal generation unit 310 generates a position control signal indicating a target position according to a command to execute CP control, the position control unit 320 generates a speed control signal according to the position control signal, and the speed control unit 330 generates the torque control signal according to the speed control signal. The execution of such a process functions as "generation of the first control signal under the continuous path control in which the robot is operated along the movement path determined in advance" under the "subordinate condition."

That fact that the speed control unit 330 generates the torque control signal in a state in which the "Power Low" command is executed functions as "generation of the first control signal according to the second operation mode" included in a "second condition".

C. Setting of Vibration Reduction Process

Figure 14:
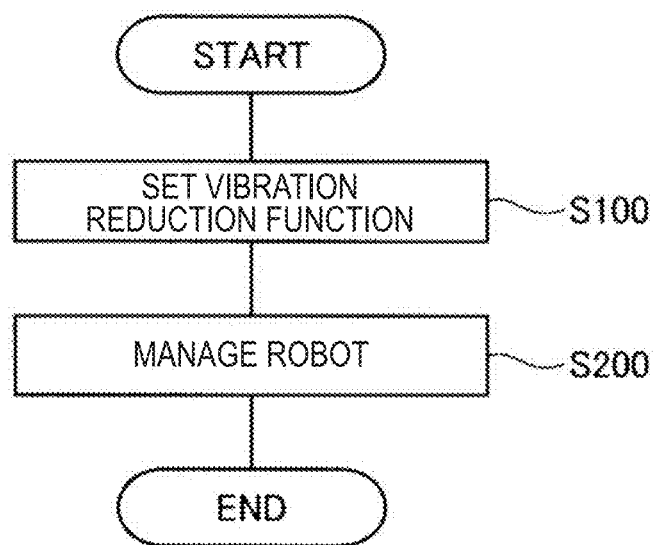
FIG. 14 is a flowchart illustrating a flow of management of the robot system according to the embodiment.

FIG. 14 is a flowchart illustrating a flow of management of the robot system according to the embodiment. In the management of the robot system according to the embodiment, first, a robot is installed in a factory or the like and the vibration reduction function is set in step S100. For example, specific parameters are set in Param1 and Param2 illustrated in FIG. 3. Thereafter, in step S200, the robot is management in the factory or the like and is used to manufacture a product or the like. The content described in the foregoing B. is control content of the robot in the management stage of the robot (S200 of FIG. 14). Hereinafter, setting of the vibration reduction function equivalent to S100 of FIG. 14 will be described.

(1) Installing Vibration Measurement Device

Figure 15:
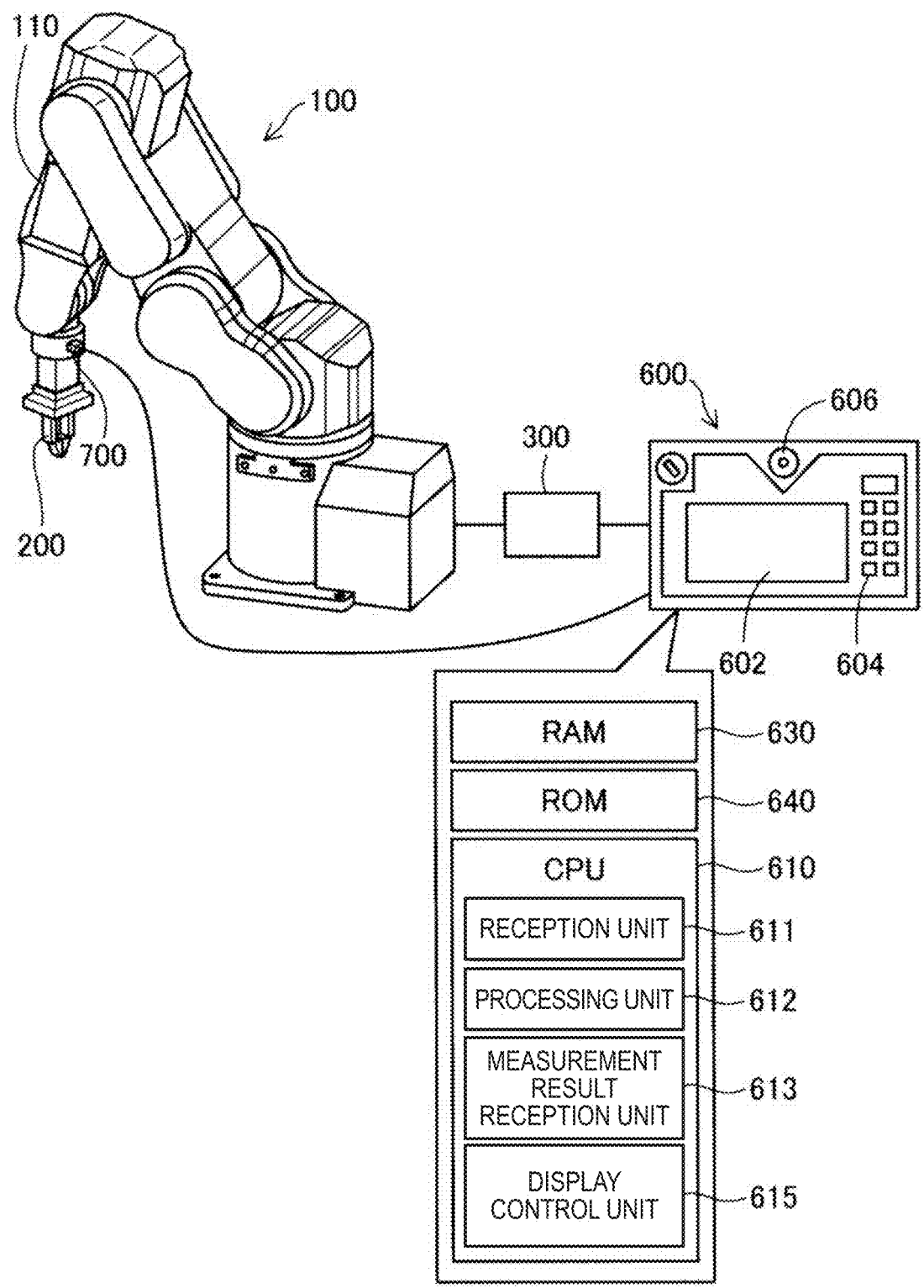
FIG. 15 is a diagram illustrating a configuration of a system when the vibration reduction process is set.

FIG. 15 is a diagram illustrating a configuration of a system when the vibration reduction function is set. The configurations and functions of the robot 100, the end effector 200, and the robot control device 300 have been described with reference to FIGS. 1 and 2. A vibration measurement device capable of measuring acceleration in directions of three axis perpendicular to each other is installed in the robot 100 and another portion. In the example of FIG. 15, a vibration measurement device 700 mounted on the robot 100 is an inertial measurement unit (IMU). The robot instruction device 600 functioning as a setting device with the vibration reduction function is connected to the robot control device 300. Hereinafter, the robot instruction device 600 is also referred to as a setting device 600.

The setting device 600 is a computer that includes the display 602 with a touch sensor that functions as an output device and an input device and a key 604 and a track point 606 that function as input devices. The setting device 600 is connected to the vibration measurement device 700 and the robot control device 300. The setting device 600 can specify a target vibration frequency of a target in which the vibration measurement device 700 is installed based on an output from the vibration measurement device 700. The setting device 600 can store the target vibration frequency in the RAM 301 or the ROM 302 (see FIG. 2) of the robot control device 300. As a result, the filter setting unit 345 of the robot control device 300 (see FIG. 2) outputs a control signal to the filter processing unit 340 with reference to the target vibration frequency and the filter processing unit 340 generates a torque control signal from which a component of the target vibration frequency is eliminated based on the control signal from the filter setting unit 345.

Figure 16:
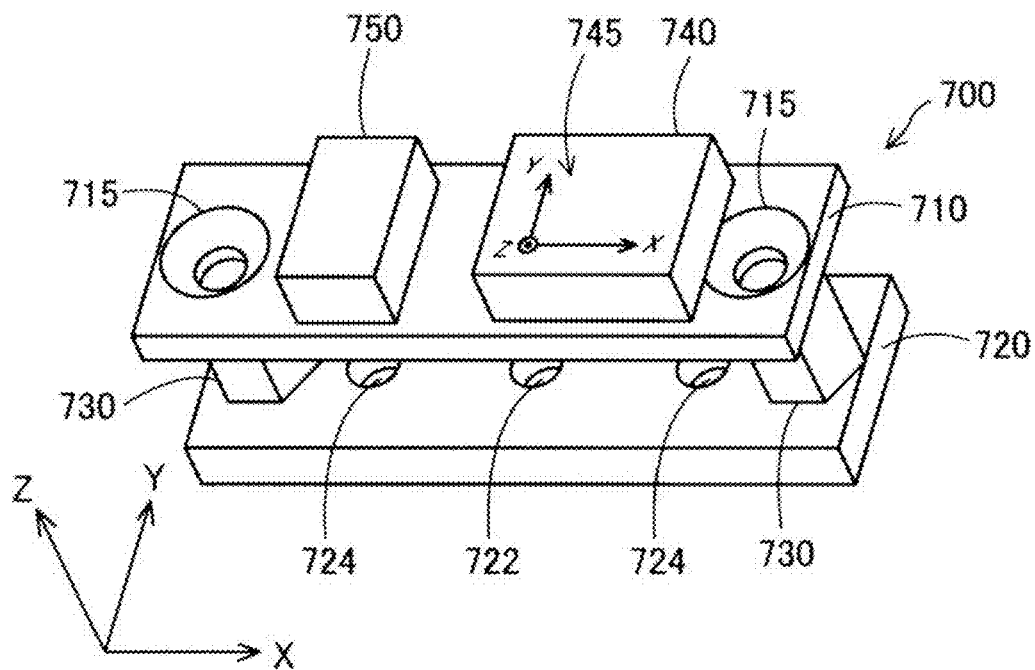
FIG. 16 is a perspective view illustrating a vibration measurement device adopted according to the embodiment.

FIG. 16 is a perspective view illustrating the vibration measurement device 700 adopted according to the embodiment. The vibration measurement device 700 adopted according to the embodiment is an inertial measurement unit (IMU). The vibration measurement device 700 includes a first support unit 710, a second support unit 720, connection units 730, a measurement unit 740, an output unit 750, and amounting unit. In FIG. 16, the mounting unit is not illustrated.

The measurement unit 740 includes an acceleration sensor that can measure acceleration in the X, Y, and Z axis directions and a gyro sensor that can measure an angular velocity about the X, Y, and Z axis directions in each rotation. The measurement unit 740 can output acceleration in the X, Y, and Z axis directions of the measurement unit 740 and an angular velocity measured about the X, Y, and Z axis directions in each rotation. The measurement unit 740 is fixed to the first support unit 710 which is a plate-shaped member.

The X, Y, and Z axis directions which are perpendicular to each other and are directions of acceleration and angular velocity which can be measurable by the measurement unit 740 are illustrated on the upper surface of the measurement unit 740. By providing such notation 745, the user can install the vibration measurement device 700 in the robot 100 without error in a direction oriented in a process of the setting device 600 when the user can install the vibration measurement device 700 in the robot 100.

The output unit 750 includes an output terminal. The output unit 750 is connected to the measurement unit 740 and can output a measurement result of the measurement unit 740 as a signal from the output terminal to the outside. The output terminal is wire-connected to the setting device 600. The output unit 750 is also fixed to the first support unit 710.

The first support unit 710 is a substantially rectangular plate-shaped member. The first support unit 710 is connected to the plate-shaped second support unit 720 by a pair of connection units 730. The pair of connection units 730 is fixed to the first support unit 710 by screws (not illustrated) penetrating through screw holes 715. The pair of connection units 730 is fixed to the second support unit 720 by screws (not illustrated) penetrating through screw holes 716.

Figure 17:
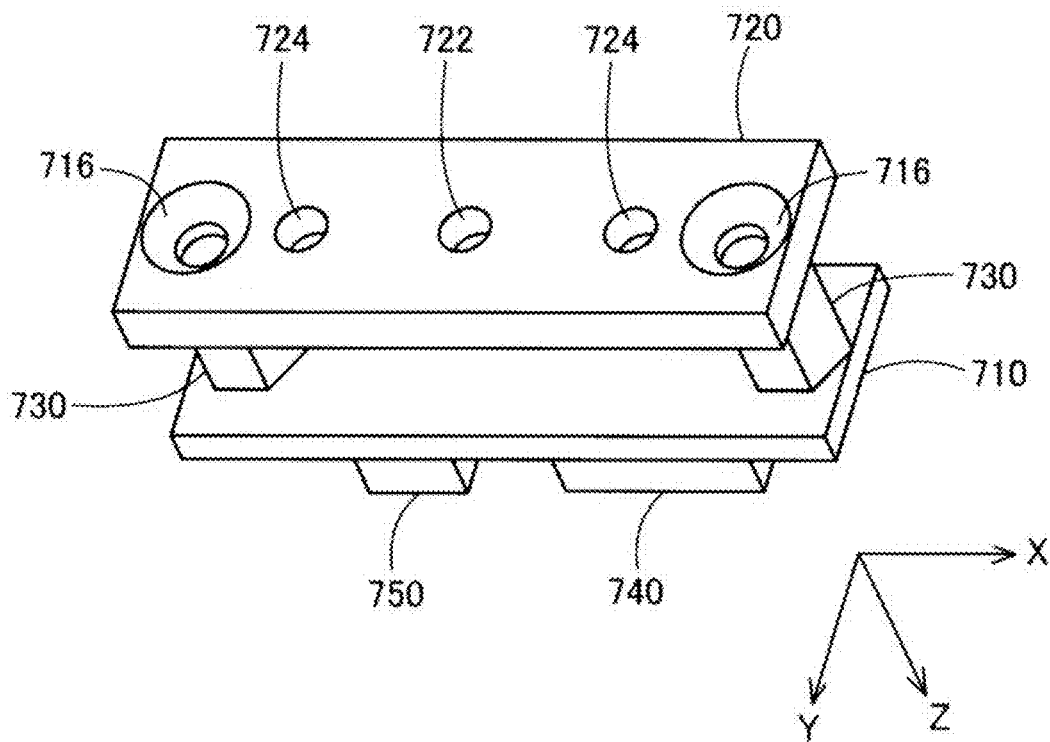
FIG. 17 is a perspective view illustrating the vibration measurement device.

FIG. 17 is a perspective view illustrating the vibration measurement device 700. The X, Y, and Z axes illustrated in FIG. 17 correspond to the X, Y, and Z axes illustrated in FIG. 16. The second support unit 720 is a substantially rectangular plate-shaped member. The second support unit 720 includes three connection holes 724, 722, and 724 at positions between holes 714 and 716 to which the pair of connection units 730 are connected. Female screws are formed in inner surfaces of the connection holes 724, 722, and 724.

Figure 18:
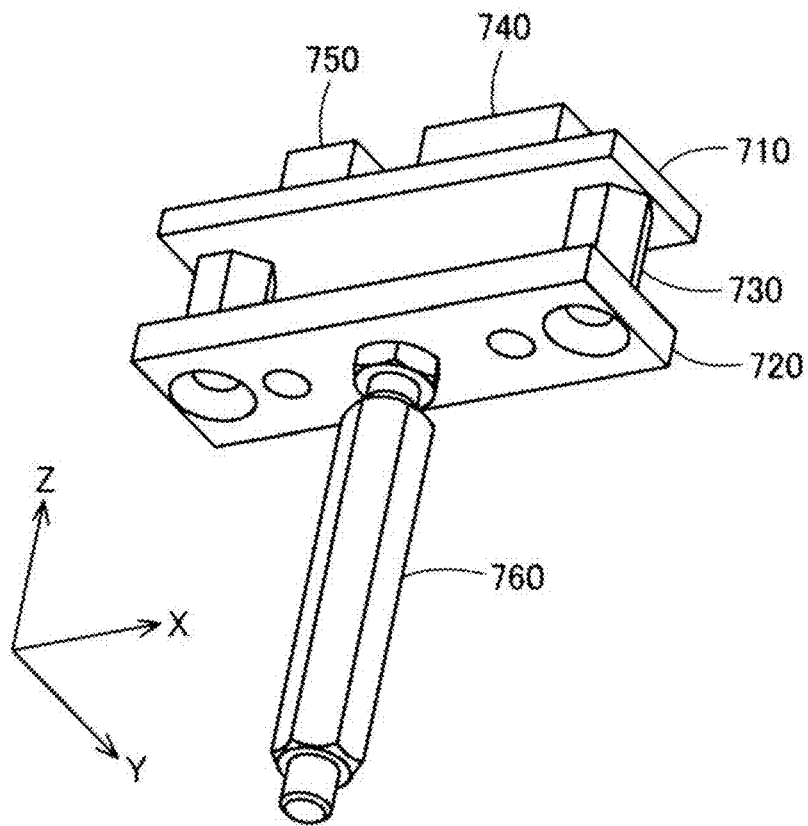
FIG. 18 is a perspective view illustrating the vibration measurement device including a first mounting unit.

FIG. 18 is a perspective view illustrating the vibration measurement device 700 including a first mounting unit 760. The first mounting unit 760 is a bar-shaped member in which male screws are formed at both ends. The first mounting unit 760 is screwed to be fixed to the middle hole 722 (see FIGS. 16 and 17) of the second support unit 720. When a hole in which a female screw corresponding to a measurement target of the robot 100 or the like is formed is formed, the vibration measurement device 700 is installed in the measurement target by the first mounting unit 760.

Figure 19:
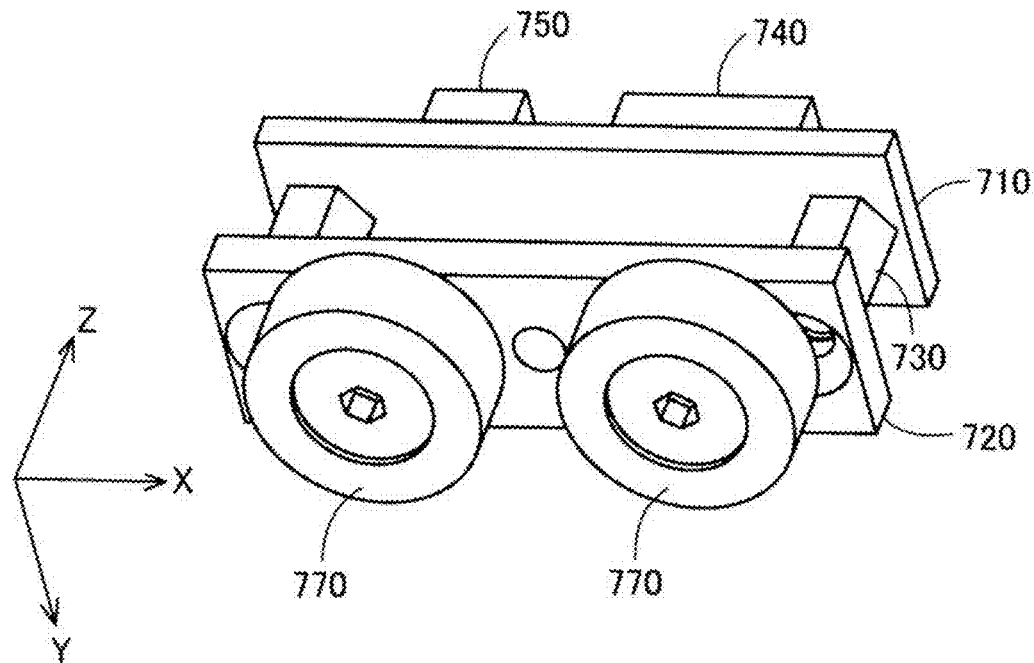
FIG. 19 is a perspective view illustrating the vibration measurement device including second mounting units.

FIG. 19 is a perspective view illustrating the vibration measurement device 700 including second mounting units 770, 770. The second mounting units 770 are cylindrical magnets. The second mounting units 770 are screwed to be fixed to the holes 724, 724 of the second support unit 720 (see FIGS. 16 and 17). When a portion of which vibration is desired to be measured in the measurement target of the robot 100 or the like is formed of a magnetic substance, the vibration measurement device 700 is installed in the measurement target by the second mounting unit 770.

Figure 20:
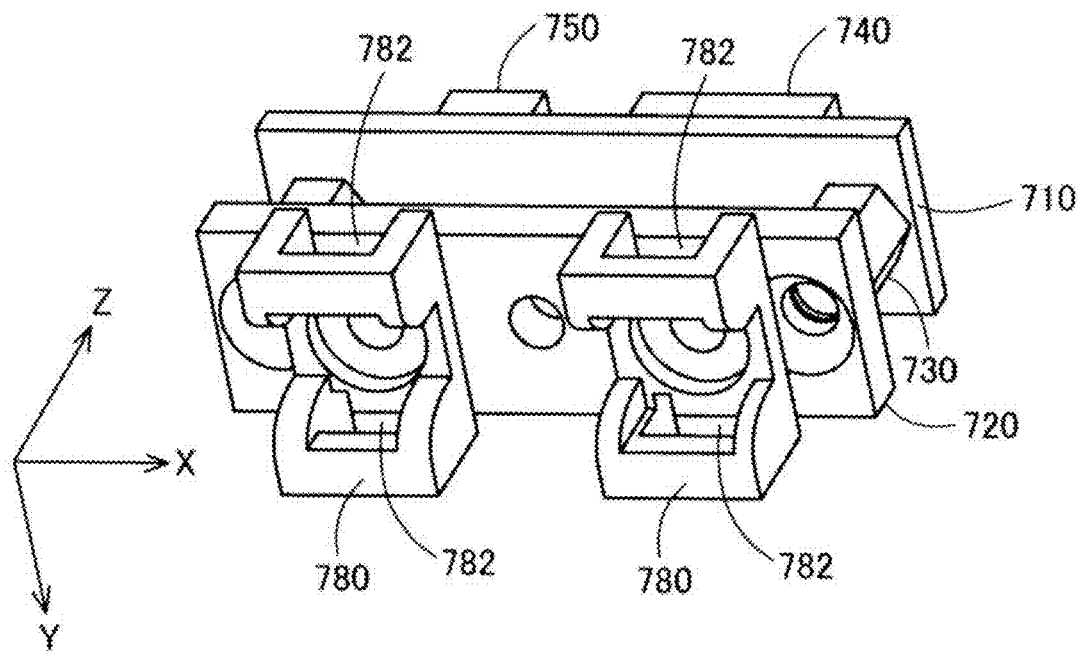
FIG. 20 is a perspective view illustrating the vibration measurement device including third mounting units.

FIG. 20 is a perspective view illustrating the vibration measurement device 700 including third mounting units 780, 780. The third mounting units 780, 780 are fixing tools that each include a pair of through holes 782, 782 through which a clamping band passes. The third mounting units 780, 780 are screwed to be fixed to holes 724, 724 of the second support unit 720 (see FIGS. 16 and 17). The vibration measurement device 700 is fixed to the measurement target by the clamping band by passing the clamping band through the through holes 782, 782 included in each of the third mounting units 780, 780.

Figure 21:
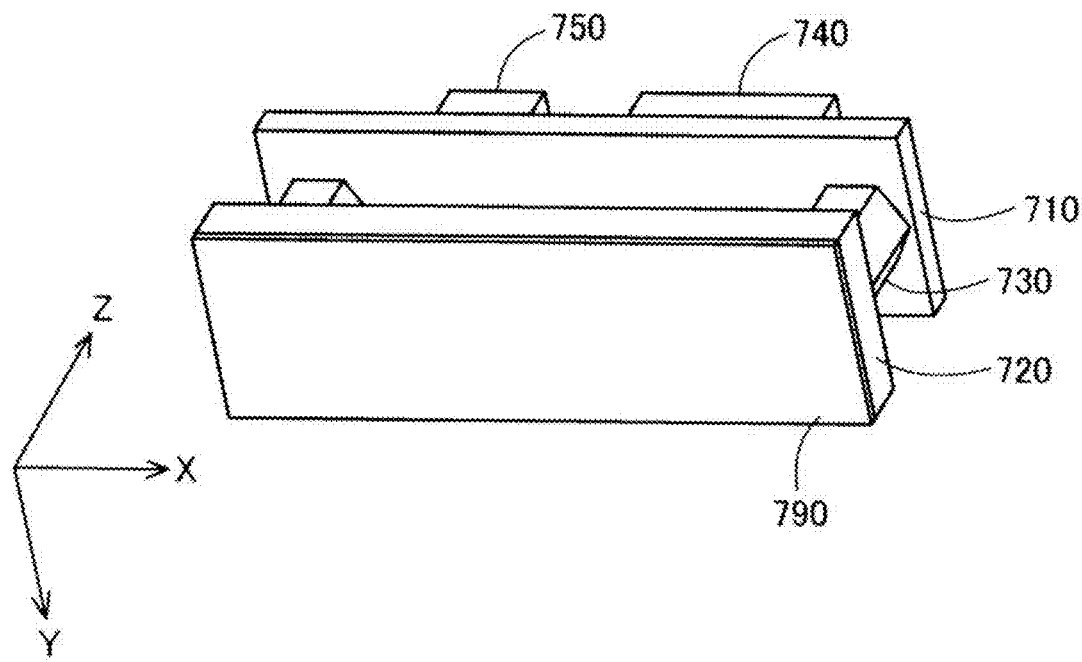
FIG. 21 is a perspective view illustrating the vibration measurement device including a fourth mounting unit.

FIG. 21 is a perspective view illustrating the vibration measurement device 700 including a fourth mounting unit 790. The fourth mounting unit 790 is an adhesive layer configured with an adhesive member. The fourth mounting unit 790 is fixed to the second support unit 720 by adhesive property of the adhesive member. The vibration measurement device 700 is installed in the measurement target by the adhesive property of the fourth mounting unit 790.

The second support unit 720 can be selectively installed in one of the first mounting unit 760 to the fourth mounting unit 790. In such a configuration, the vibration measurement device 700 is installed in any of various types of measurement targets. As a result, when the robot or a portion different from the end effector installed in the robot and vibrated by the robot has an influence on control of the robot, the vibration measurement device 700 can be installed in any portion. As a result, it is possible to reduce an adverse influence on the control of the robot due to vibration of the portion different from the robot.

In the example of FIG. 15, the vibration measurement device 700 is installed at the distal end of the arm 110 of the robot 100. The vibration measurement device 700 is installed at the distal end of the arm 110 of the robot 100 by selecting an appropriate mounting unit from the first mounting unit 760 to the fourth mounting unit 790 with mutually different mounting schemes.

As a result, the setting device 600 can determine the target vibration frequency based on information regarding vibration of the distal end of the arm 110 of the robot 100 obtained from the vibration measurement device 700 and can output a torque control signal in which the vibration of the distal end of the arm 110 of the robot 100 rarely occurs to the robot control device 300 (see reference numeral 340 of FIG. 2). As a result, even when a sensor capable of measuring acceleration or an angular velocity is not installed in a portion in which vibration is problematic in the robot, it is possible to generate a torque control signal in which vibration of the robot rarely occurs.

For example, relative vibration can sufficiently be converged in a portion formed from a proximal portion of the robot to the end effector of the robot after an operation of the robot 100 ends. However, when a frame supporting the entire robot is vibrated due to an operation of the robot, an appropriate mounting unit can be selected from the first mounting unit 760 to the fourth mounting unit 790 and the vibration measurement device 700 can be installed in the frame F100b (see FIG. 10) supporting the robot.

As a result, the setting device 600 can determine the target vibration frequency based on information regarding the vibration of the frame F100b obtained from the vibration measurement device 700 and can output a torque control signal in which the vibration of the frame F100b rarely occurs to the robot control device 300 (see reference numeral 340 of FIG. 2). As a result, it is possible to reduce the vibration of the robot supported by the frame.

For example, vibration of the robot is sufficiently converged after an operation of the robot ends. However, when a camera capturing an image of the robot is vibrated due to an operation of the robot, it is determined that the vibration of the robot is not sufficiently converged, and start of a subsequent operation is late, countermeasures can be taken as follows. That is, an appropriate mounting unit can be selected from the first mounting unit 760 to the fourth mounting unit 790 and the vibration measurement device 700 can be installed in the camera 400b (see FIG. 10) or the post F400 (see FIG. 1) supporting the camera 400.

As a result, the setting device 600 can determine the target vibration frequency based on information regarding the vibration of the camera obtained from the vibration measurement device 700 and can output a torque control signal in which the vibration of the camera rarely occurs to the robot control device 300 (see reference numeral 340 of FIG. 2). As a result, it is possible to reduce an adverse influence on control of the robot due to the vibration of the camera and/or an adverse influence on control based on an image captured by, for example, the work piece W01.

For example, vibration of the robot is sufficiently converged after an operation of the robot ends. However, when a location at which the work piece is put by the robot, a location at which the moving work piece moved is put by the robot, or a location (for example, the support 560b in the example of FIG. 10) at which a work is executed on the work piece by the robot is vibrated due to an operation of the robot, it is determined that the vibration is not sufficiently converged, and start of a subsequent operation is late, countermeasures can be taken as follow. That is, an appropriate mounting unit can be selected from the first mounting unit 760 to the fourth mounting unit 790 and the vibration measurement device 700 can be installed at the location (see P706 of FIG. 10).

As a result, the setting device 600 can determine the target vibration frequency based on information of the vibration of the location (for example, the support 560b) obtained from the vibration measurement device 700 and can output a torque control signal in which the vibration of the location rarely occurs to the robot control device 300 (see reference numeral 340 of FIG. 2). As a result, it is possible to prevent a situation in which a standby time until start of the operation during the work becomes longer due to the vibration of the location in the operation of the robot.

In this way, when a portion different from the robot and vibrated by the robot has an influence on control of the robot, the following advantages can be obtained by mounting the vibration measurement device 700 on such a portion and causing the setting device 600 to execute the setting. That is, the robot control device 300 can generate a torque control signal in which vibration of a portion different from the robot rarely occurs and outputs the torque control signal to the robot. As a result, it is possible to reduce an adverse influence on the control of the robot due to the vibration of the portion different from the robot.

On the other hand, as described with reference to FIGS. 4 to 8, the robot control device 300 can switch the frequency component eliminated through the vibration reduction process and generate the torque control signal. The robot control device 300 can switch the above-described plurality of vibration reduction processes of generating the torque control signal in which vibration of the different portion rarely occurs and execute the vibration reduction processes in order.

For example, the robot control device 300 can switch a torque control signal in which vibration of a portion different from the robot rarely occurs and a torque control signal in which vibration of the robot rarely occurs and output the torque control signal to the robot. The robot control device 300 can also switch a torque control signal in which vibration of a first portion different from the robot rarely occurs, a torque control signal in which vibration of a second portion different from the robot rarely occurs, and a torque control signal in which vibration of the robot rarely occurs and output the torque control signal to the robot.

The filter processing unit 340 (see FIG. 2) of the robot control device 300 can generate a torque control signal from which a plurality of frequency components are eliminated, as described with reference to FIG. 3. Therefore, the robot control device 300 can output a torque control signal in which either vibration of a portion different from the robot and vibration of the robot rarely occurs to the robot. Further, the robot control device 300 may also be configured to be able to output a torque control signal in which any of vibration of the first portion different from the robot, vibration of the second portion different from the robot, and vibration of the robot rarely occurs to the robot.

The aspect in which the IMU capable of measuring acceleration and an angular velocity in the three axis directions is adopted as the vibration measurement device 700 in the measurement and setting of the target vibration frequency has been described above. However, for example, an acceleration sensor capable of measuring acceleration around three axis that are perpendicular to each other can be adopted as the vibration measurement device installed in a measurement target at the time of measuring a target vibration frequency. A plurality of acceleration sensors each capable of measuring acceleration in one axis direction can also be installed in a measurement target so that the axes of the acceleration sensors are perpendicular to each other and can measure acceleration around two axes that are perpendicular to each other or three axes that are perpendicular to each other. By adopting the mounting unit which can be replaced with respect to an output unit for the acceleration sensor, as described with reference to FIGS. 18 and 21, the acceleration sensors can be installed in various measurement targets.

(2) Measuring and Setting Target Vibration Frequency Using IMU

Figure 22:
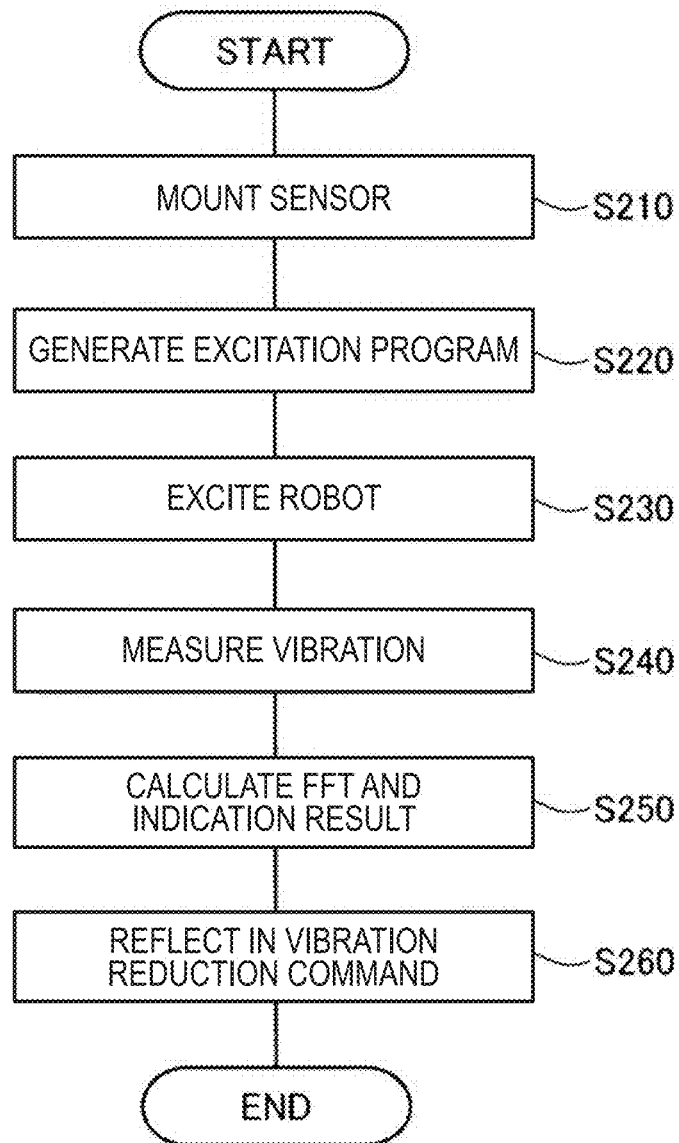
FIG. 22 is a flowchart illustrating a setting procedure of the vibration reduction function.

FIG. 22 is a flowchart illustrating a setting procedure of the vibration reduction function. In step S210, the vibration measurement device 700 is installed in a measurement target. The method of installing the vibration measurement device 700 in the measurement target has been described in the foregoing (1) with reference to FIGS. 1, 10, and 15 to 21.

In step S220 of FIG. 22, an excitation program is generated. In the embodiment, the robot is vibrated by driving the servo motor of the robot and causing the robot to execute an operation determined in advance (hereinafter also referred to as a "specific operation") instead of applying an impact on the robot with a hammer. Then, residual vibration of the robot after end of the specific operation is measured. In step S220, a program causing the robot to execute the specific operation (in the present specification, also referred to as an "excitation program") is generated.

Figure 23:
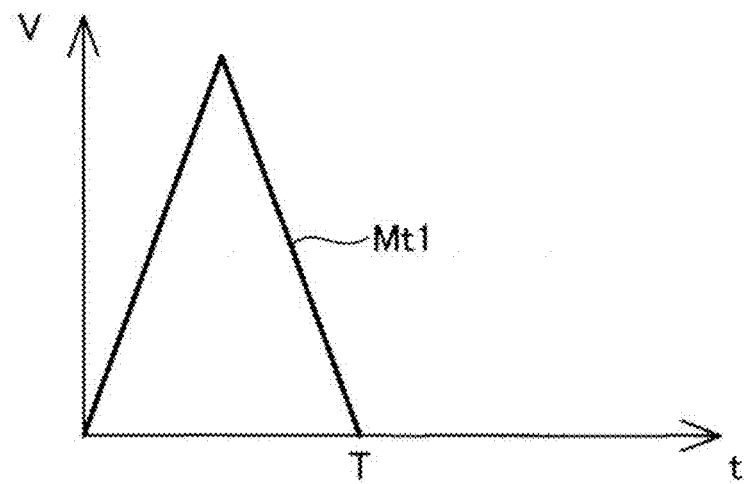
FIG. 23 is a graph illustrating an example of a specific operation instructed from a certain servo motor of the robot.

FIG. 23 is a graph illustrating an example of a specific operation instructed from a certain servo motor of the robot. In the graph of FIG. 23, the horizontal axis represents a time t and the vertical axis represents an operation speed V of the servo motor of a certain joint. In a specific operation Mt1, the operation speed V of the servo motor linearly increases from 0 and subsequently linearly decreases to return to 0. A time from start to end of the specific operation Mt1 is T.

Figure 24:
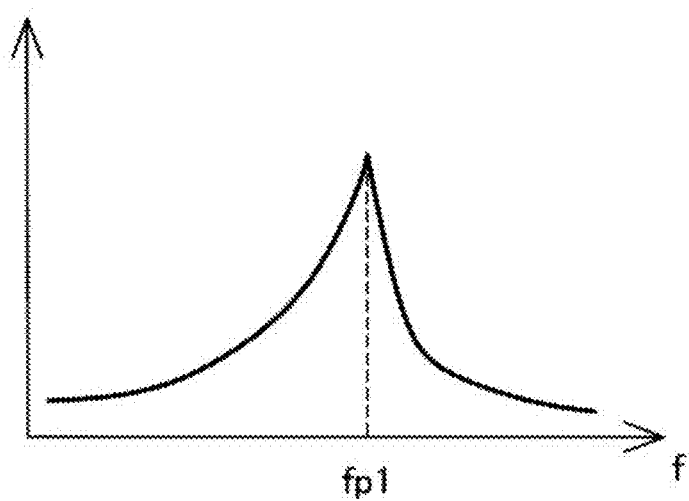
FIG. 24 is a diagram illustrating a result obtained by executing fast Fourier transform on a speed waveform of a specific operation.

FIG. 24 is a diagram illustrating a result obtained by executing fast Fourier transform on a speed waveform of a specific operation Mt1. In FIG. 24, the horizontal axis represents a frequency and the vertical axis represents an effective value of power with each frequency. It can be understood that the specific operation Mt1 has the largest power at frequency fp1 and the power decreases farther from the frequency.

Figure 25:
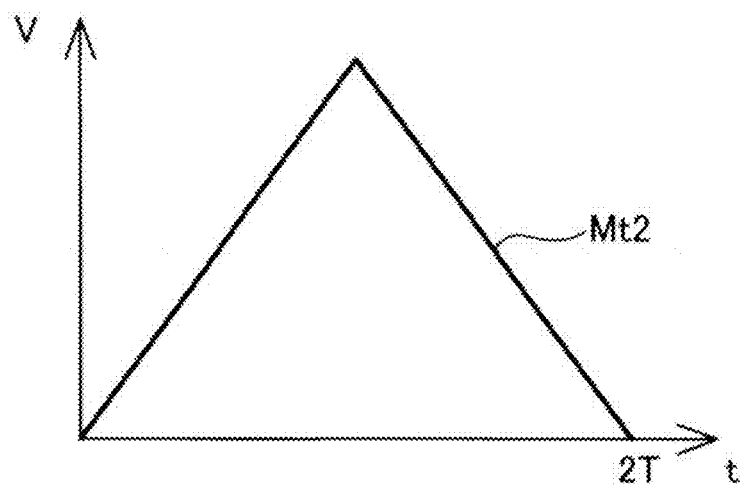
FIG. 25 is a graph illustrating an example of a specific operation instructed from a certain servo motor of the robot.

FIG. 25 is a graph illustrating an example of a specific operation Mt2 instructed from a certain servo motor of the robot. In the graph of FIG. 25, the horizontal axis represents a time t and the vertical axis represents an operation speed V of the servo motor of a certain joint. In a specific operation Mt2, the operation speed V of the servo motor linearly increases from 0 and linearly decreases to return to 0. The maximum speed is the same as that of Mt1. Here, a time from start to end of the specific operation Mt2 is 2T.

Figure 26:
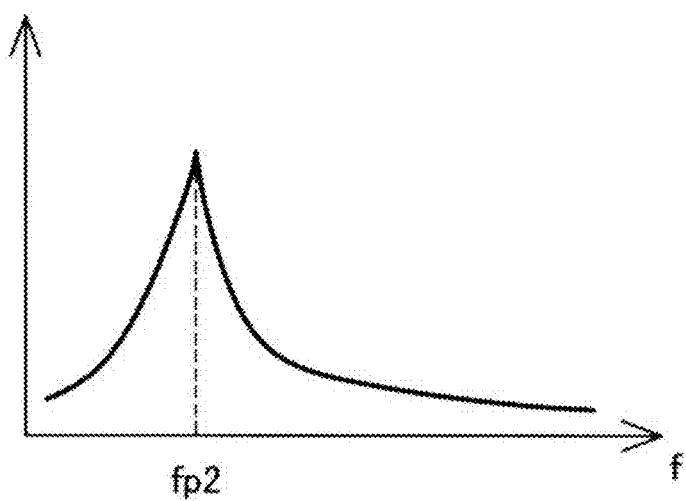
FIG. 26 is a diagram illustrating a result obtained by executing fast Fourier transform on a speed waveform of the specific operation.

FIG. 26 is a diagram illustrating a result obtained by executing fast Fourier transform on a speed waveform of the specific operation Mt2. In FIG. 26, the horizontal axis represents a frequency and the vertical axis represents an effective value of power with each frequency. It can be understood that the specific operation Mt2 has the largest power at a frequency fp2 (<fp1) and the power decreases farther from the frequency.

As understood from FIGS. 23 to 26, power of each frequency component differs in accordance with a waveform of a speed change of the specific operation. In the specific operation in which acceleration is large and a high-frequency component is large (see FIGS. 23 and 24), residual vibration of a frequency in a broader range can be generated than in the specific operation (see FIGS. 25 and 26) in which acceleration is small and a high-frequency component is small. As a result, it is possible to determine a target vibration frequency more accurately. On the other hand, since force applied to the robot is small in the specific operation in which acceleration is small (see FIGS. 25 and 26), there is a small influence on hardware of the robot. In step S220 of FIG. 22, the program is generated according to an item (accuracy of measurement or the small influence on the hardware) weighted in measurement of the residual vibration. In step S220, the program can also be generated so that a plurality of specific operations are executed.

Here, to facilitate the technical understanding, the operations with a triangular speed change are indicated (see FIGS. 23 and 25). However, a motion of the robot in the specific operation can be created according to the structure of the robot and an attitude of the robot when vibration desired to be reduced is generated. For example, when residual vibration generated when the arm takes a predetermined attitude is desired to be reduced, an operation in which the arm takes the attitude at the time of ending the operation can be set as the specific operation. When residual vibration generated in an operation of lifting a target and moving the target to another location is desired to be reduced, an operation of executing the operation of lifting the target and moving the target to the other location by a predetermined movement distance and at a predetermined movement speed can be set as the specific operation.

By preparing a plurality of specific operations in advance according to a frequency or a direction of expected natural vibration and/or an attitude of the robot at which vibration is desired to be reduced (see FIGS. 23 and 25), it is possible to cause the robot to execute a specific operation capable of detecting a target vibration frequency of target vibration accurately and easily.

The above-described plurality of mutually different and typical operations can be prepared in advance as a plurality of commands. The plurality of different operations can also be stored in advance as a plurality of combinations of commands and the parameters in the RAM 630 of the setting device 600.

As the plurality of different operations which are specific operations, a plurality of mutually different operations in which an attitude of the robot at the time of ending an operation differs can be exemplified. In such an aspect, it is possible to detect the target vibration frequency of target vibration accurately and easily by preparing the plurality of specific operations in advance according to an attitude of the robot in which the vibration at the attitude is preferably reduced. As the plurality of mutually different operations, a plurality of operations in which a movement speed of the arm until end of the operation differs can be exemplified. The plurality of operations in which the movement speed of the arm until the end of the operation differs include a plurality of different operations in which the movement speed of the arm until the end of the operation differs even when the attitude of the arm at the time of ending the operation is the same.

For example, by designating a parameter of a command in the program, it is possible to designate a joint of the arm of the robot driven in the specific operation. In such an aspect, it is possible to detect the target vibration frequency of the target vibration accurately and easily by preparing the specific operation in advance according to the joint of the robot in which the vibration of the joint is preferably reduced.

In step S230 of FIG. 22, the setting device 600 receives an instruction to execute the program generated in S220 from the user via the key 604, the track point 606, and the touch display 602 displaying a user interface image and causes the robot control device 300 to execute the program generated in step S220. As a result, the robot executes the specific operation according to the program. A functional unit of the setting device 600 receiving the instruction to execute the program from the user is illustrated as the reception unit 611 in FIG. 15. The reception unit 611 is realized by the CPU 610 of the setting device 600.

In the robot control device 300, the control signal generation unit 310 (see FIG. 2) receives a command indicating the instruction to execute the specific operation from the setting device 600 and outputs the command and a position control signal according to a parameter appended to the command. When an intention to drive a specific joint is designated according to a combination of the command the parameter, the control signal generation unit 310 outputs the position control signal so that only the joint is driven.

The position control unit 320, the speed control unit 330, the filter processing unit 340, the torque control unit 350, and the servo amplifier 360 cause the servo motor 410 to drive the robot 100 (see FIG. 2). In step S230, the filter processing unit 340 outputs the torque control signal received from the speed control unit 330 without change to the torque control unit 350 without executing the process of eliminating a specific frequency component.

In step S240 of FIG. 22, the residual vibration after the end of the specific operation is measured. More specifically, a measurement result of the vibration obtained by executing the specific operation and measured by the vibration measurement device 700 installed in the robot or the like is received from the vibration measurement device 700 by the setting device 600. The received measurement result of the vibration is stored as a data file in the RAM 630 of the setting device 600. A functional unit of the setting device 600 receiving and storing the measurement result of the vibration is illustrated as the "measurement result reception unit 613" in FIG. 15. The measurement result reception unit 613 is realized by the CPU 610 of the setting device 600.

In such an aspect, it is possible to understand the target vibration frequency of the robot based on the measurement result of the vibration obtained by executing the operation of the robot and obtained from the vibration measurement device 700 without adding an impact on the robot with a hammer or the like from the outside.

The setting device 600 can measure the residual vibration using the end of the command to instruct the specific operation received from the robot control device 300 as a trigger. More specifically, the robot control device 300 notifies the setting device 600 that the position control signal instructing the end of the operation of the robot 100 is sent from the control signal generation unit 310, and then the setting device 600 can determine a start time of a time section in which the vibration is measured or a start time of a time section which is set as a processing target to obtain the target vibration frequency in the time section in which the vibration is measured. For example, a timing at which the position control signal instructing the end of the operation of the robot 100 is received and a predetermined time has passed can be set as the start time of the time section which is set as the processing target.

When such a process is executed, the user can understand the target vibration frequency at which there is a high possibility of a control target being vibrated most in a target state without designating the start time of the measurement.

In step S250 of FIG. 22, the measurement result of the vibration obtained by executing the specific operation is processed in the setting device 600 and a processing result is displayed on the display 602.

Figure 27:
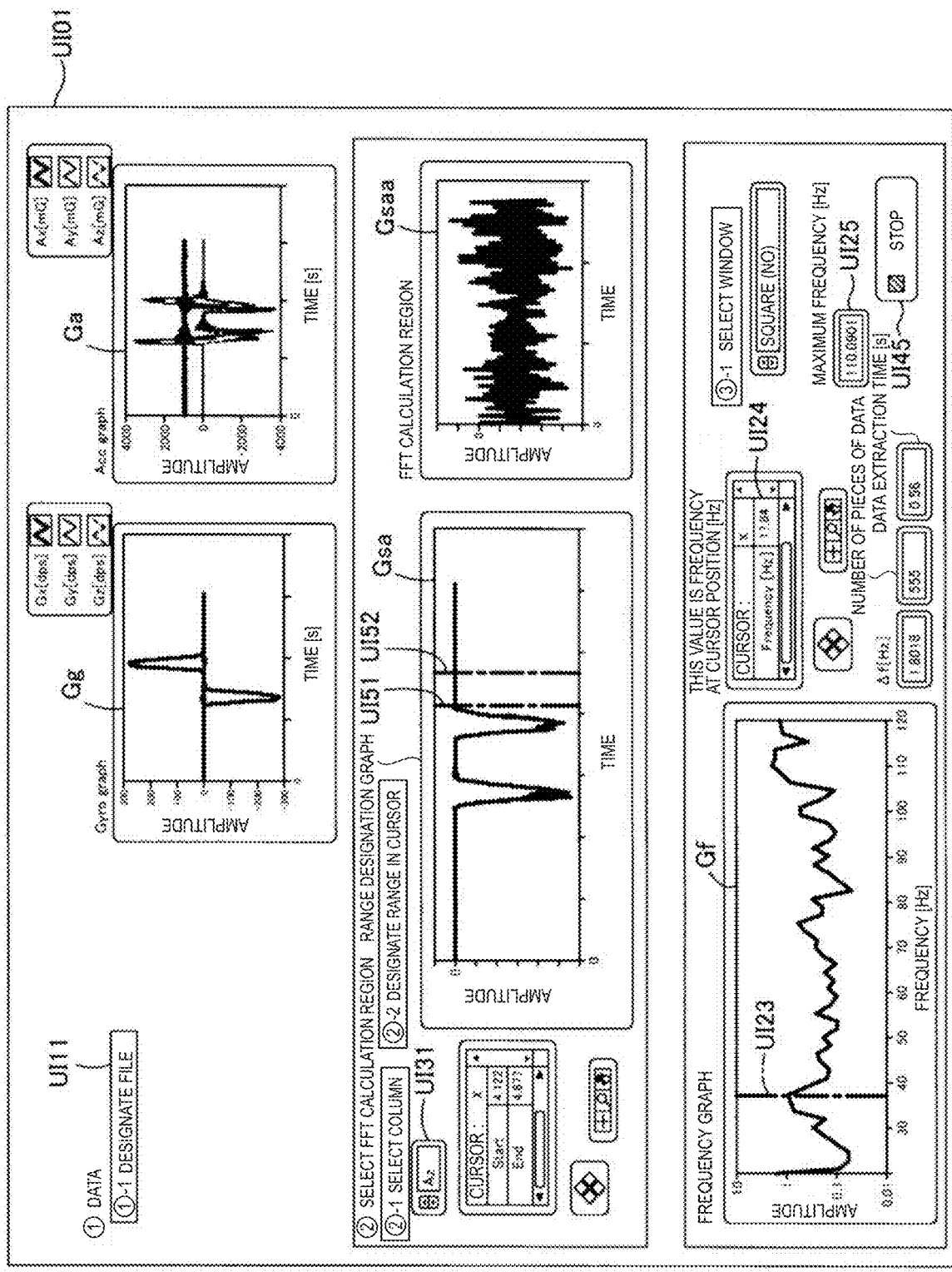
FIG. 27 is a diagram illustrating an output displayed on a display in a step.

FIG. 27 is a diagram illustrating an example of an output displayed on a display 602 in step S250. The indication of FIG. 27 is a user interface UI01 that has not only a function of outputting the processing result but also a function of receiving an input for designating processing content. The user interface UI01 includes an input window UI11, an angular velocity graph Gg, an acceleration graph Ga, an input window UI31, a processing target graph Gsa, a start time instruction UI51, an end time instruction UI52, an expanded graph Gsaa, a frequency graph Gf, a frequency designation UI 23, a frequency indication UI24, a maximum frequency indication UI25, and a stop switch UI45.

The input window UI11 is an input window for designating a data file to be processed among data files of measurement results of vibration stored in the RAM 630 of the setting device 600. Information regarding the data file designated herein is processed and each indication of the user interface UI01 is executed based on the result. In such an aspect, the user can easily understand the target vibration frequency of a control target using data of vibration measured in advance.

The stop switch UI45 is a switch for forcibly ending a process executed through the user interface UI01.

Figure 28:
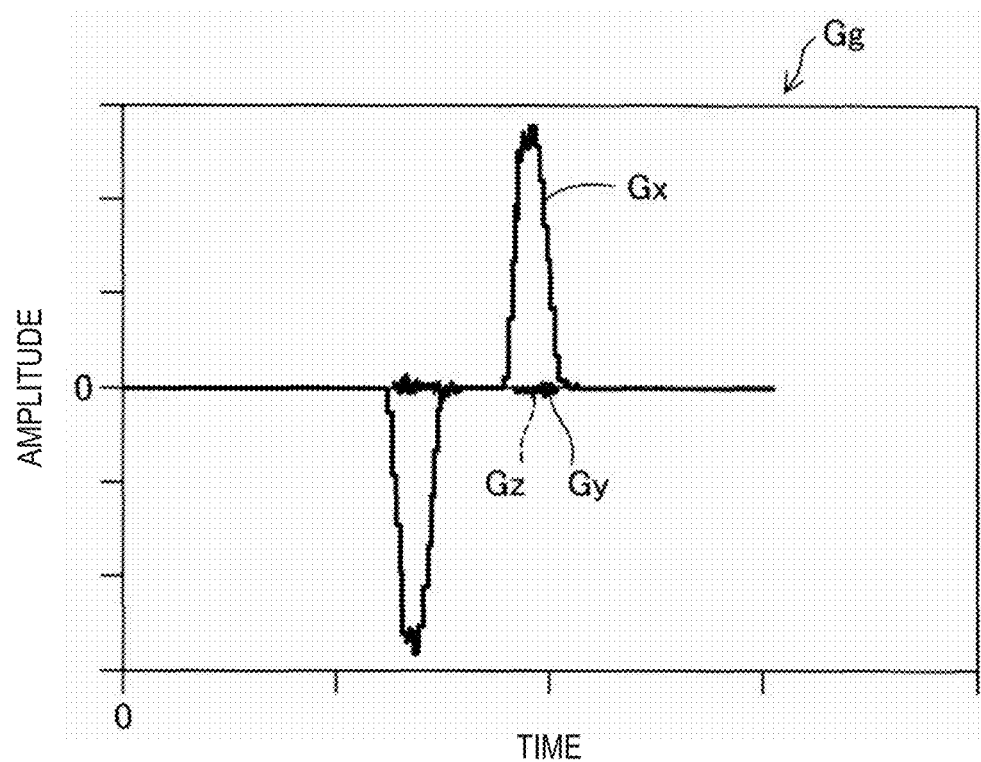
FIG. 28 is a diagram illustrating an angular velocity graph.

FIG. 28 is a diagram illustrating the angular velocity graph Gg (also see FIG. 27). In FIG. 28, the horizontal axis represents a time and the vertical time represents an angular velocity. In the angular velocity graph Gg, a temporal change of an angular velocity measured about the X, Y, and Z axes in each rotation is shown based on information received from the vibration measurement device 700. An angular velocity measured about the X axis is indicated as a graph Gx. An angular velocity measured about the Y axis is indicated as a graph Gy. An angular velocity measured about the Z axis is indicated as a graph Gz.

In the angular velocity graph Gg of FIG. 28, the angular velocity Gx measured about the X axis first considerably oscillates in the negative direction and then return to 0. Thereafter, the angular velocity Gx considerably oscillates in the positive direction and then returns to 0. The angular velocity Gy measured about the Y axis and the angular velocity Gz measured about the Z axis are rarely changed.

That is, in step S230 of FIG. 22, it can be understood that reciprocation of the rotational motion about the X axis is executed as the specific operation.

Figure 29:
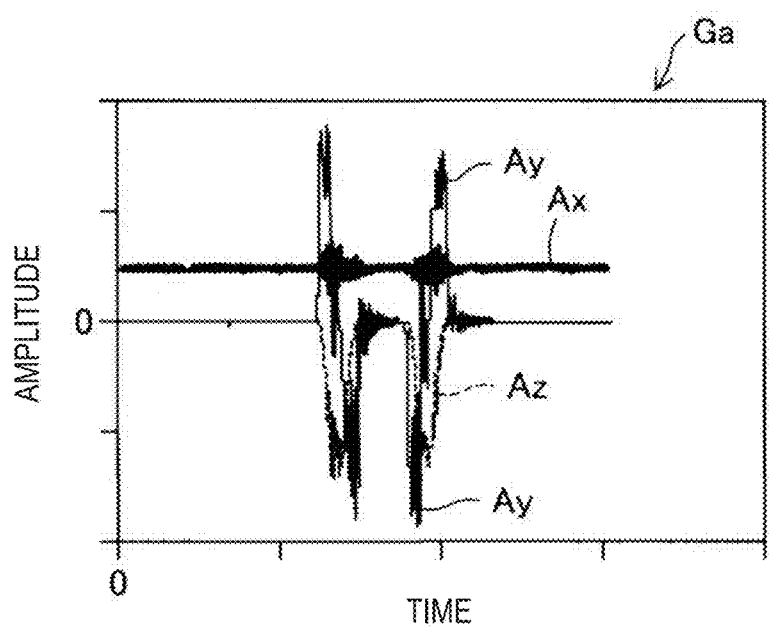
FIG. 29 is a diagram illustrating an acceleration graph.

FIG. 29 is a diagram illustrating the acceleration graph Ga (also see FIG. 27). In FIG. 29, the horizontal axis represents a time and the vertical axis represents acceleration. The acceleration graph Ga shows a temporal change of the acceleration in the X, Y, and Z axis directions based on information received from the vibration measurement device 700. Acceleration in the X axis direction is indicated as a graph Ax. Acceleration in the Y axis direction is indicated as a graph Ay. Acceleration in the Z axis direction is indicated as a graph Az.

Figure 30:
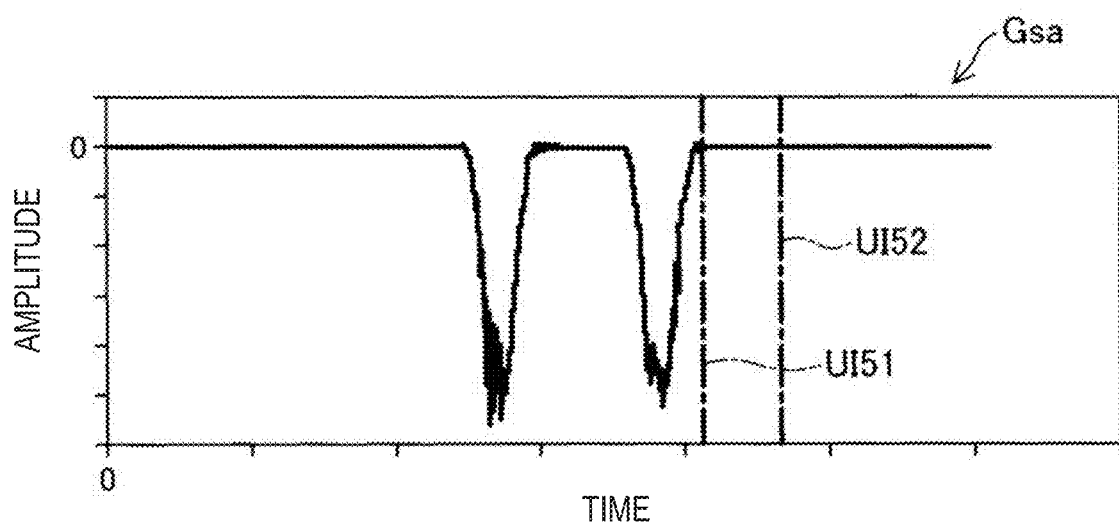
FIG. 30 is a diagram illustrating a processing target graph.

FIG. 30 is a diagram illustrating a processing target graph Gsa (also see FIG. 27). In FIG. 30, the horizontal axis represents a time and the vertical axis represents a change amount. The processing target graph Gsa shows a target selected between an angular velocity measured about the X, Y, and Z axes in each rotation and acceleration measured about the X, Y, and Z axis directions. The selection of the target is input to the input window UI31 (see FIG. 27). Here, the acceleration Az in the Z axis direction is assumed to be selected. As a result, an indication of the processing target graph Gsa is similar to the graph Az of the acceleration graph Ga.

In the processing target graph Gsa, a start time instruction UI51 and an end time instruction UI52 are shown. The start time instruction UI51 is a user interface for designating a start time of a processing target part in a measurement result shown in the processing target graph Gsa. The end time instruction UI52 is a user interface for designating an end time of a processing target portion in the measurement result shown in the processing target graph Gsa. The start time instruction UI51 and the end time instruction UI52 can each be dragged on the touch display 602 to be operated in the right and left directions.

In such an aspect, the user can designate a time section to be considered except for a portion with much noise in the process of obtaining the target vibration frequency in vibration data and apply a process of obtaining the target vibration frequency. The start time instruction UI51 is preferably set at a timing at which a clear change which can be recognized by the user in the measurement result shown in the processing target graph Gsa ends. There is a high possibility that a portion in which the clear change which can be recognized by the user in the measurement result shown in the processing target graph Gsa is a portion in which a motion of a specific operation is shown.

As default, the start time instruction UI51 is a timing at which a position control signal instructing the end of the specific operation is output from the control signal generation unit 310 as default (see FIG. 2). As default, the end time instruction UI52 is a timing at which a time (for example, 0.5 seconds) determined in advance has passed from the start time instruction UI51 as default.

In such an aspect, the processing target time section can include a time section in which a control signal for driving a control target is not output. As a result, a parameter indicating a target vibration frequency calculated based on the vibration data including a portion equivalent to the residual vibration can be displayed. Therefore, the user can understand that the target vibration frequency at which there is a high possibility of a control target being vibrated most in a state in which the control target is to be stopped via the user interface UI01.

The start time instruction UI51 can also be set as a timing at which the predetermined time T51 (for example, 0.1 seconds) has passed from a timing at which the position control signal instructing the end of the specific operation is output from the control signal generation unit 310 (see FIG. 2). The end time instruction UI52 is a timing at which a time T52 (T52>T51 and, for example, T52=0.5 seconds) determined in advance has passed from the start time instruction UI51.

In such an aspect, the processing target time section can be set so that all of the processing target time sections are time sections in which the control signal for driving the control target is not output. As a result, a parameter indicating the target vibration frequency calculated based on the vibration data indicating the residual vibration can be displayed in the user interface UI01. Therefore, the user can understand the target vibration frequency at which there is a high possibility of a control target being vibrated most in a state in which the control target is to be stopped.

Figure 31:
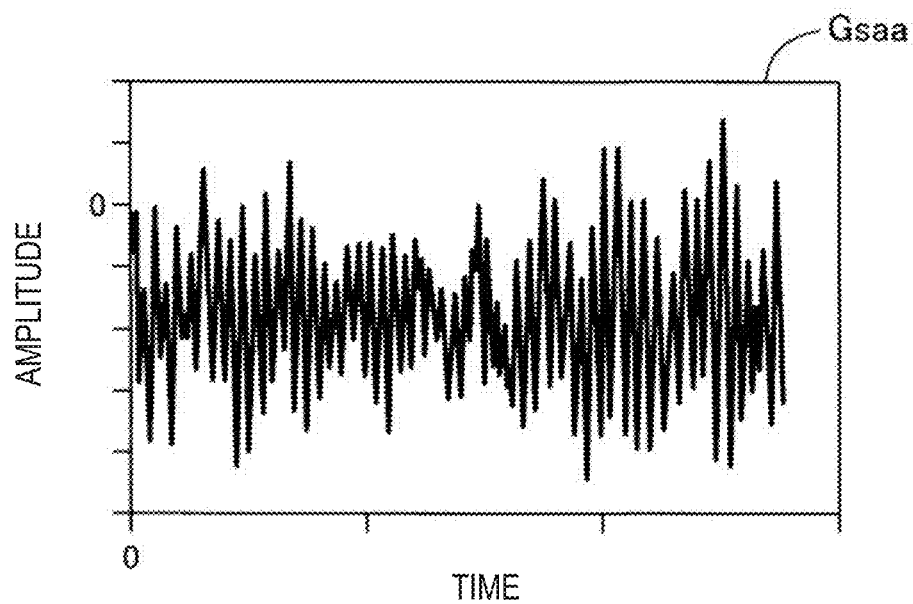
FIG. 31 is a diagram illustrating an expanded graph.

FIG. 31 is a diagram illustrating an expanded graph Gsaa (see FIG. 27). In FIG. 31, the horizontal axis represents a time and the vertical axis represents a change amount. The expanded graph Gsaa is a graph formed by expanding a portion corresponding to a time section partitioned by the start time instruction UI51 and the end time instruction UI52 in the processing target graph Gsa in the vertical axis direction.

Figure 32:
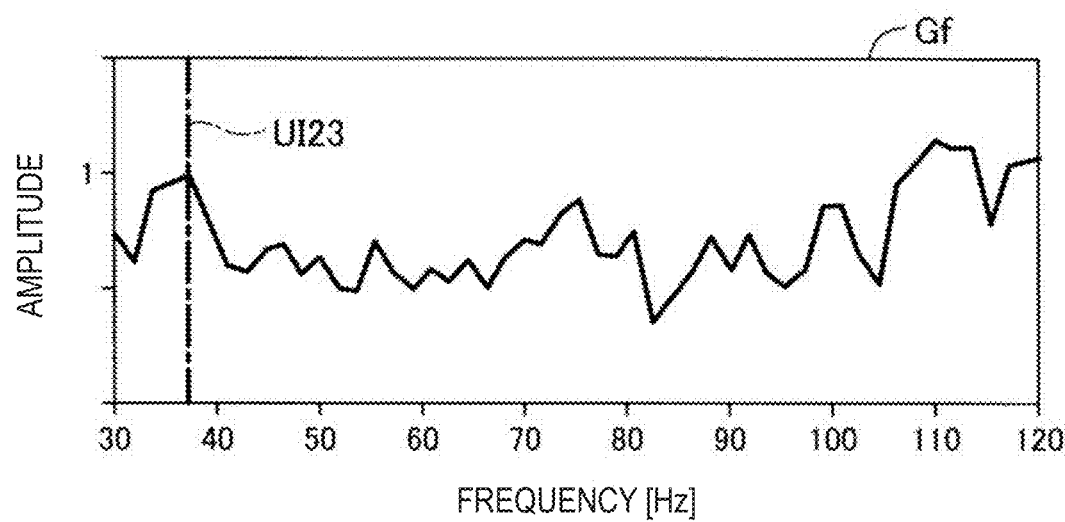
FIG. 32 is a diagram illustrating a frequency graph.

FIG. 32 is a diagram illustrating a frequency graph Gf (see FIG. 27). In FIG. 32, the horizontal axis represents a frequency and the vertical axis represents intensity of each frequency. The frequency graph Gf is a graph that shows a result obtained by executing fast Fourier transform in the expanded graph Gsaa. A frequency designation UI23 is shown in the frequency graph Gf. In the frequency graph Gf, the frequency designation UI23 is a user interface for designating a frequency in the frequency graph Gf. The frequency designation UI23 can be dragged on the touch display 602 to be operated in the right and left directions. The frequency designation UI23 is automatically located at a position of peak (local maximum value) in the frequency graph Gf which is the closest to a position designated on the touch display 602. The frequency indicated by the frequency designation UI23 is displayed with a numerical value in the frequency indication UI24 (see FIG. 27).

In the maximum frequency indication UI25 illustrated in FIG. 27, a frequency with maximum power is automatically shown in the frequency graph Gf. Here, 110.0901 Hz is shown (also see a right portion of the frequency graph Gf). There is a high possibility that the frequency shown in the maximum frequency indication UI25 is a vibration frequency at which a measurement target resonates. Therefore, in such an aspect, the user can understand that the target vibration frequency at which there is a high possibility of the control target being vibrated most.

A functional unit of the setting device 600 that instructs the robot control device 300 to execute an operation, processes information obtained from the vibration measurement device 700, and generates data to display the frequency graph Gf, the maximum frequency indication UI25, or the like in the user interface UI01 is illustrated as a "processing unit 612" in FIG. 15. The processing unit 612 is realized by the CPU 610 of the setting device 600.

When the user confirms that maximum frequency indication UI25 and the frequency graph Gf and subsequently determines that the frequency indication in the maximum frequency indication UI25 is a frequency to be reduced (the target vibration frequency of the measurement target), the following process is executed. That is, in step S260 of FIG. 22, the frequency is input as a frequency component to be eliminated to the robot control device 300 via the key 604, the track point 606, and the touch display 602 displaying a user interface image. The robot control device 300 stores the frequency as the parameter Param1 of the vibration reduction function of a predetermined number in the RAM 301 or the ROM 302 (see FIG. 3).

When it is determined that the frequency displayed in the maximum frequency indication UI25 is not the frequency to be reduced as the result obtained by confirming the maximum frequency indication UI25 and the frequency graph Gf, the user operates the touch display 602 on which the user interface image is displayed and moves the frequency designation UI23 near another frequency in the frequency graph Gf considered to be the target vibration frequency of the measurement target. Then, the frequency designation UI23 is automatically located at the position of peak nearby and the frequency is displayed in the frequency indication UI24. The user can input the frequency as the frequency component to be eliminated to the robot control device 300 via the touch display 602 or the like of the setting device 600 in step S260 of FIG. 22.

In such an aspect, the user can easily understand information regarding the target vibration frequency of the robot via an input and output device of the setting device 600. A functional unit of the setting device 600 executing the indications described with reference to FIGS. 27 and 31 on the display 602 is a "display control unit 615" (see FIG. 15).

Figure 33:
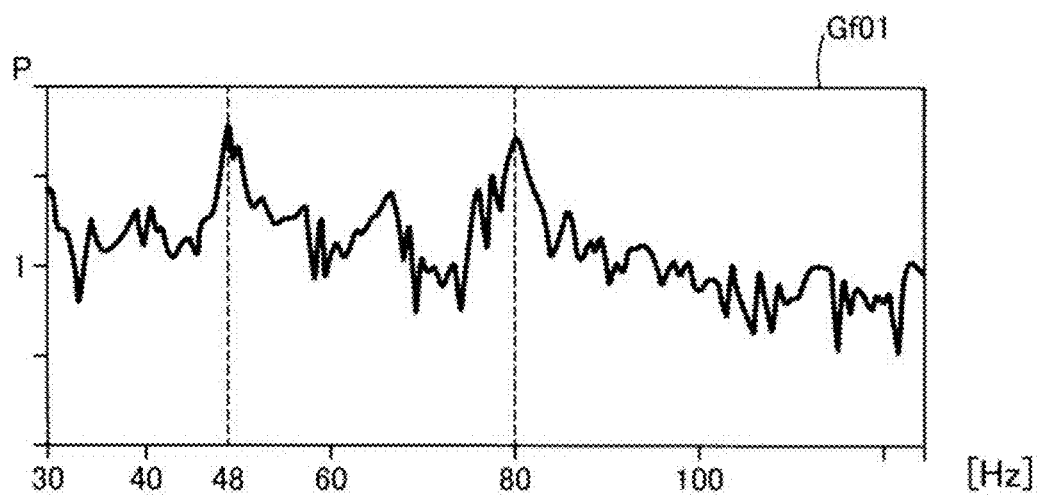
FIG. 33 is a diagram illustrating another example of the frequency graph.

FIG. 33 is a diagram illustrating another example Gf01 of the frequency graph Gf (see FIGS. 27 and 32). More specifically, FIG. 33 illustrates the frequency graph Gf01 when the vibration measurement device 700 is installed in the end effector 200b (see FIG. 10). An installation position of the vibration measurement device 700 corresponding to FIG. 33 is indicated by P701 in FIG. 10. In this case, it can be understood that the target vibration frequency is shown as 30 Hz, 48 Hz, or 80 Hz.

Figure 34:
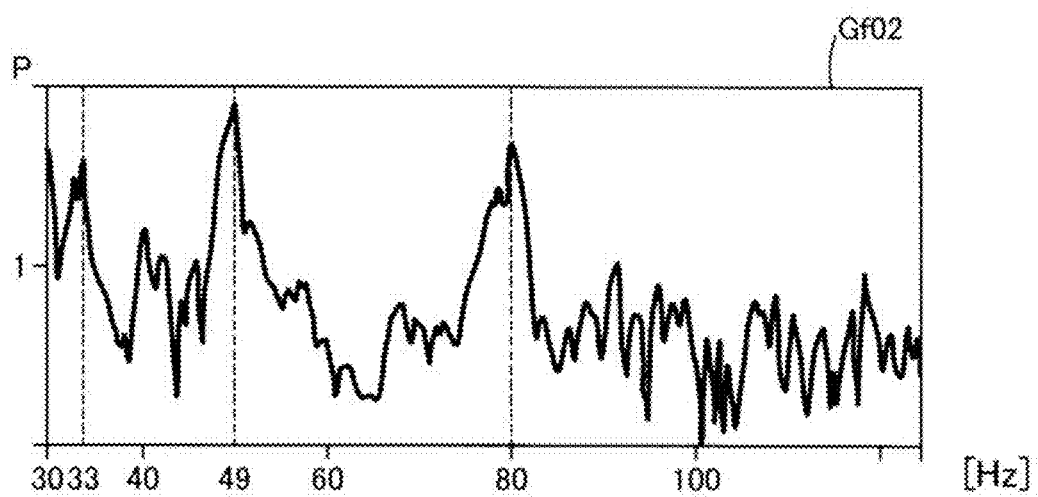
FIG. 34 is a diagram illustrating still another example of the frequency graph.

FIG. 34 is a diagram illustrating still another example Gf02 of the frequency graph Gf (see FIGS. 27 and 32). More specifically, FIG. 34 illustrates the frequency graph Gf02 when the vibration measurement device 700 is installed in the arm 110b of the robot 100b. An installation position of the vibration measurement device 700 corresponding to FIG. 34 is indicated by P702 in FIG. 10. In this case, it can be understood that the target vibration frequency is shown as 30 Hz, 33 Hz, 49 Hz, or 80 Hz.

Figure 35:
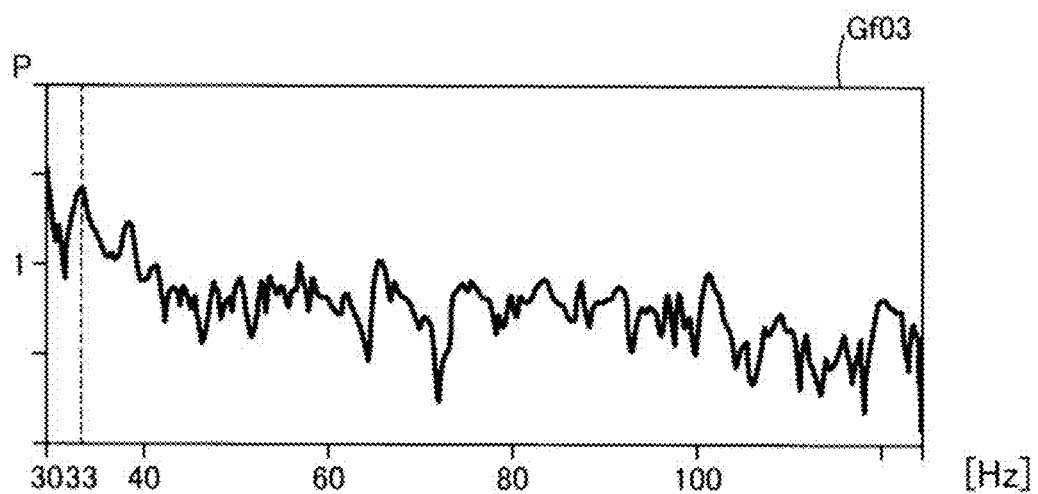
FIG. 35 is a diagram illustrating still another example of the frequency graph.

FIG. 35 is a diagram illustrating still another example Gf03 of the frequency graph Gf (see FIGS. 27 and 32). More specifically, FIG. 35 illustrates the frequency graph Gf03 when the vibration measurement device 700 is installed in the frame F100b of the robot 100b. An installation position of the vibration measurement device 700 corresponding to FIG. 35 is indicated by P703 in FIG. 10. In this case, it can be understood that the target vibration frequency is shown as 30 Hz or 33 Hz.

Figure 36:
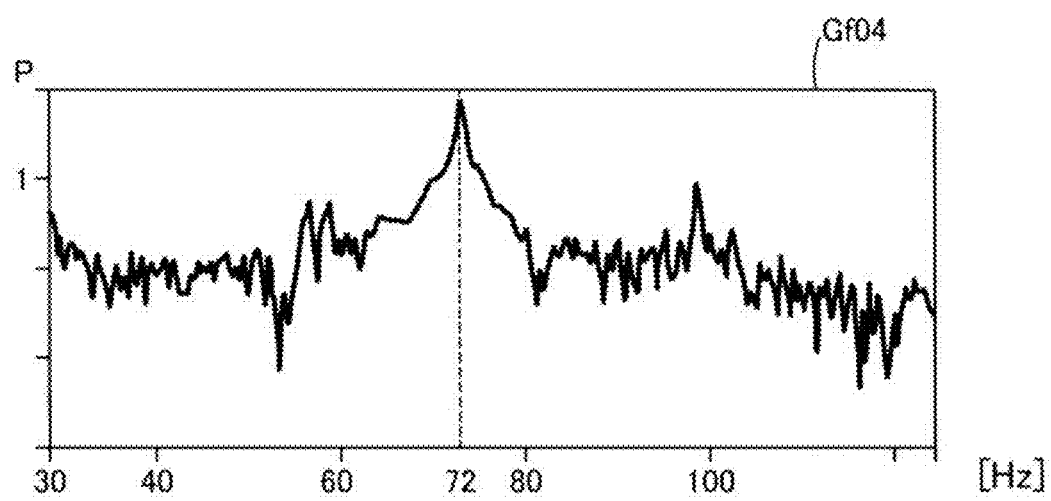
FIG. 36 is a diagram illustrating still another example of the frequency graph.

FIG. 36 is a diagram illustrating still another example Gf04 of the frequency graph Gf (see FIGS. 27 and 32). More specifically, FIG. 36 illustrates the frequency graph Gf01 when the vibration measurement device 700 is installed in the post F400b in which the camera 400b is installed. An installation position of the vibration measurement device 700 corresponding to FIG. 33 is indicated by P704 in FIG. 10. In this case, it can be understood that the target vibration frequency is shown as 30 Hz or 72 Hz.

In the examples of FIGS. 33 to 36, the frequency graphs Gf01 to Gf04 show the frequency regions equal to or greater than 30 Hz. However, the frequency graph Gf may show a region equal to or less than 30 Hz. That is, the frequency region suggested by the frequency graph Gf can be set according to measured vibration.

As understood from the frequency graphs Gf01 to Gf04 of FIGS. 33 to 36, the vibration frequency of the vibration differs depending on a portion included in the robot system. Therefore, in a case in which a portion different from the robot and vibrated by the robot has an influence on control of the robot, the influence of the portion may not be reduced even when the torque control signal in which a component of the target vibration frequency of the robot is reduced. As in the embodiment, by preparing the vibration measurement device 700 serving as a measurement unit that measures vibration and installing the vibration measurement device 700 not only in the robot but also in a portion which is a portion other than the robot and has an influence on control of the robot, it is possible to obtain the following advantages. That is, in a case in which a portion different from the robot and vibrated by the robot has an influence on control of the robot, the torque control signal can be altered so that vibration of the portion is reduced and the torque control signal can be output. As a result, it is possible to reduce an adverse influence of vibration of a portion different from the robot on the control of the robot.

When one or more acceleration sensors capable of measuring acceleration around three axes perpendicular to each other are adopted as the vibration measurement devices instead of the IMU, the angular velocity around the three axes can be obtained using measured values of the acceleration around the three axes and distances between the center of the rotation of a measurement target and the acceleration sensors. When the acceleration sensor capable of measuring the acceleration around the three axes perpendicular to each other is adopted as the vibration measurement devices, the processing unit 612 of the setting device 600 displays the angular velocity graph Gg of the user interface UI01 by executing the process (see FIGS. 15 and 27). When the IMU is adopted as the vibration measurement device, measured values of the acceleration in three axis directions perpendicular to each other and measured values of angular velocities around the three axis directions perpendicular to each other are obtained from the IMU and the processing unit 612 of the setting device 600 displays the acceleration graph Ga and the angular velocity graph Gg of the user interface UI01.

Figure 37A:
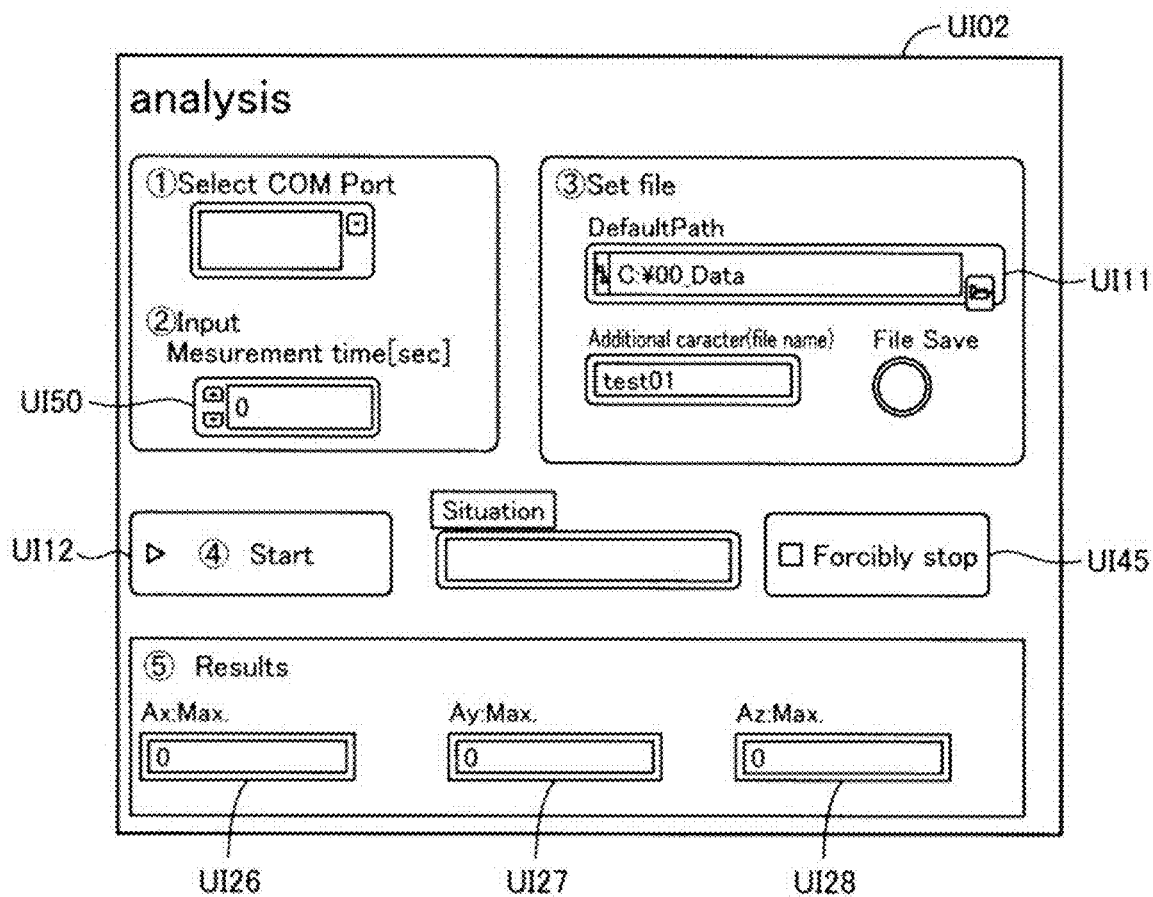
FIG. 37A is a diagram illustrating another user interface for an input for designation of processing content and an output of a processing result.

(3) Measuring and Setting Target Vibration Frequency Using Triaxial Acceleration Sensor FIG. 37A is a diagram illustrating another user interface UI02 for an input for designation of processing content and an output of a processing result. The user interface UI02 is a user interface appropriately adopted when an acceleration sensor capable of measuring acceleration around three axes perpendicular to each other is adopted as the vibration measurement device. Here, the user interface UI02 can be applied even when the IMU is adopted as the vibration measurement device.

The user interface UI02 includes an input window UI11 and a stop switch UI45. The user interface UI02 further includes a measurement start button UI12, a measurement time designation window UI50, and maximum frequency indication UI26 to UI28.

However, the user interface UI02 does not include the angular velocity graph Gg, the acceleration graph Ga, the input window UI31, the processing target graph Gsa, the start time instruction UI51, the end time instruction UI52, the expanded graph Gsaa, the frequency graph Gf, the frequency designation UI23, and the frequency indication UI24. In such a configuration, the user can understand a frequency at which there is a high possibility of the residual vibration being reduced without being misled about many pieces of information and without executing a complicated operation (see UI26 to UI28).

Functions of the input window UI11 and the stop switch UI45 are the same as the functions of the input window UI11 and the stop switch UI45 of the user interface UI01.

The measurement start button UI12 is a switch for causing the setting device 600 and the robot control device 300 to execute the processes of steps S230 and S240 of FIG. 22. In this case, a program prepared in advance and stored in the ROM 640 of the setting device 600 is used as a program causing the robot to execute a specific operation. As the program prepared in advance, various programs with a condition (for example, a direction of an operation or an attitude of the robot) for operating the robot is different can be prepared.

The measurement time designation window UI50 is an input window for designating a length of a time section in which vibration is measured.

The maximum frequency indication UI26 to UI28 displays parameters corresponding to the frequency with the maximum power at each acceleration in the X, Y, and Z axis directions in the residual vibration after the specific operation. The user interface UI02 does not include the input window UI31 (see FIG. 27). Therefore, in the user interface UI02, frequencies with the maximum power of acceleration in the X, Y, and Z axis directions are displayed as default. At this time, the frequencies in the X, Y, and Z axis directions are shown in the descending order of power, that is, the descending order of amplitude. When such a process is executed, the user can easily understand in which direction the control target considerably vibrates along with the target vibration frequency of the vibration in the direction.

Figure 37B:
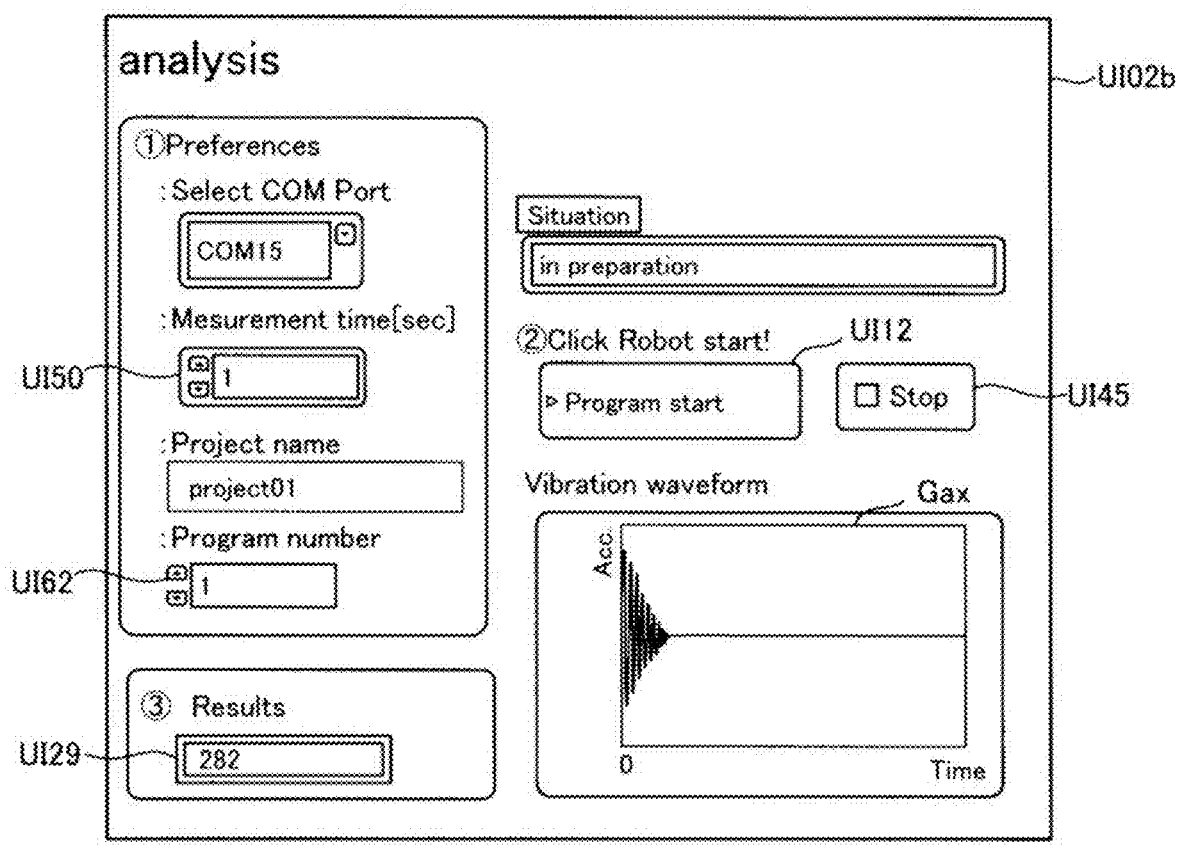
FIG. 37B is a diagram illustrating still another user interface for an input for designation of processing content and an output of a processing result.

FIG. 37B is a diagram illustrating still another user interface UI02b for an input for designation of processing content and an output of a processing result. As in the user interface UI02, the user interface UI02b is a user interface appropriately adopted when an acceleration sensor capable of measuring acceleration around three axes perpendicular to each other is adopted as the vibration measurement device. Here, the user interface UI02b can be applied even when the IMU is adopted as the vibration measurement device.

The user interface UI02b includes a measurement start button UI12, a measurement time start designation window UI50, and a stop switch UI45. The user interface UI02b further includes a program number designation window UI62, a maximum frequency indication UI29, and a maximum acceleration graph Gax.

However, the user interface UI02b does not include the angular velocity graph Gg, the acceleration graph Ga, the input window UI31, the processing target graph Gsa, the start time instruction UI51, the end time instruction UI52, the expanded graph Gsaa, the frequency graph Gf, the frequency designation UI23, the frequency indication UI24, the input window UI11, and the maximum frequency indication UI26 to UI28. In such a configuration, the user can understand a frequency at which there is a high possibility of the residual vibration being reduced without being misled about many pieces of information and without operating a complicated operation (see UI29).

A function of the stop switch UI45 is the same as the function of the stop switch UI45 of the user interfaces UI01 and UI02. A function of the measurement time designation window UI50 is the same as the function of the measurement time designation window UI150 of the user interface UI02.

The measurement start button UI12 is a switch for causing the setting device 600 and the robot control device 300 to execute the processes of steps S230 and S240 of FIG. 22. As a program causing the robot to execute a specific operation, a program for which a corresponding number is input via the program number designation window U162 is used among the programs prepared in advance and stored in the ROM 640 of the setting device 600. As the programs prepared in advance, various programs with a condition (for example, a direction of an operation or an attitude of the robot) for operating the robot is different can be prepared.

The maximum frequency indication U129 shows a parameter corresponding to one frequency with the maximum power among frequencies of each acceleration in the X, Y, and Z axis directions in the residual vibration after the specific operation. When such a process is executed, the user can easily understand the frequency with the maximum power in the residual vibration, that is, the frequency of the vibration to be reduced without considering in which direction the control target considerably vibrates.

The maximum acceleration graph Gax shows a temporal change of acceleration of an axis to which the vibration frequency with the maximum power belongs among the acceleration in the X, Y, and Z axis directions based on acceleration information of the three axes received from the acceleration sensor. When the vibration reduction process is executed to measure the acceleration, the amplitude of the acceleration displayed in the maximum acceleration graph Gax is reduced further than when the acceleration is measured without executing the vibration reduction process. The user can intuitively understand a difference between results of the case in which the vibration reduction process is not executed and the case in which the vibration reduction process is executed through the indication of the maximum acceleration graph Gax.

The user interfaces UI01, UI02, and UI02b in FIGS. 27, 37A, and 37B are displayed via the indication on the touch display 602 on which the robot is operated by the robot instruction device 600 functioning as the setting device. That is, a screen for operating the robot and a screen for setting the vibration reduction function is switched and indicated on the touch display 602. The screens can be switched through the user interface of each screen. Then, each instruction is input through the indication of the touch display 602 of the robot instruction device 600.

In such an aspect, the user can call the indication functioning as an operation unit through the indication for an accustomed operation for the robot (see the user interfaces UI01, UI02, and UI02b of FIGS. 27, 37A, and 37B) and measure the target vibration frequency of a target.

In the present specification, the part P703 of the frame F100b and the part P704 of the post F400b in FIG. 10 are also referred to as "portions vibrated by the robot". The vibration measurement device 700 (see Fig. P703) installed in the frame F100b and the vibration measurement device 700 (see Fig. P704) installed in the post F400b are also referred to as "first detector". A torque control signal which is generated by the filter processing unit 340 and in which a process of the vibration reduction function is set based on an output from the vibration measurement device 700 is also referred to as a "second control signal". The filter processing unit 340 in FIG. 2 is also referred to as a "control signal alternation unit".

In the present specification, the vibration measurement device 700 (see Fig. P702 in FIG. 10) installed at the distal end of the arm 110b of the robot 100b in FIG. 10 and the vibration measurement device 700 installed in the arm 110 of the robot 100 in FIG. 15 are also referred to as "second detector". A process of the vibration reduction function is set based on an output from the vibration measurement device 700 and a torque control signal generated by the filter processing unit 340 is also referred to as a "third control signal".

The support 560*b* function as "one or more locations among a location in which the work piece which is a work target of the foregoing robot is put by the robot, a location in which the work piece to be moved by the robot is put before the work piece is moved, and a location in which the robot executes a work on the work piece".

The vibration measurement device 700 (see P703) installed in the frame F100*b*, the vibration measurement device 700 (see P704) installed in the post F400*b*, and the robot control device 300 and the setting device 600 (the robot instruction device 600) are also referred to as a "control system". The measurement unit 740 and the output unit 750 are also referred to as an "output unit". The first mounting units 760 to the fourth mounting unit 790 are also referred to a "mounting unit".

(4) Measuring and Setting Plurality of Target Vibration Frequencies

Figure 38:
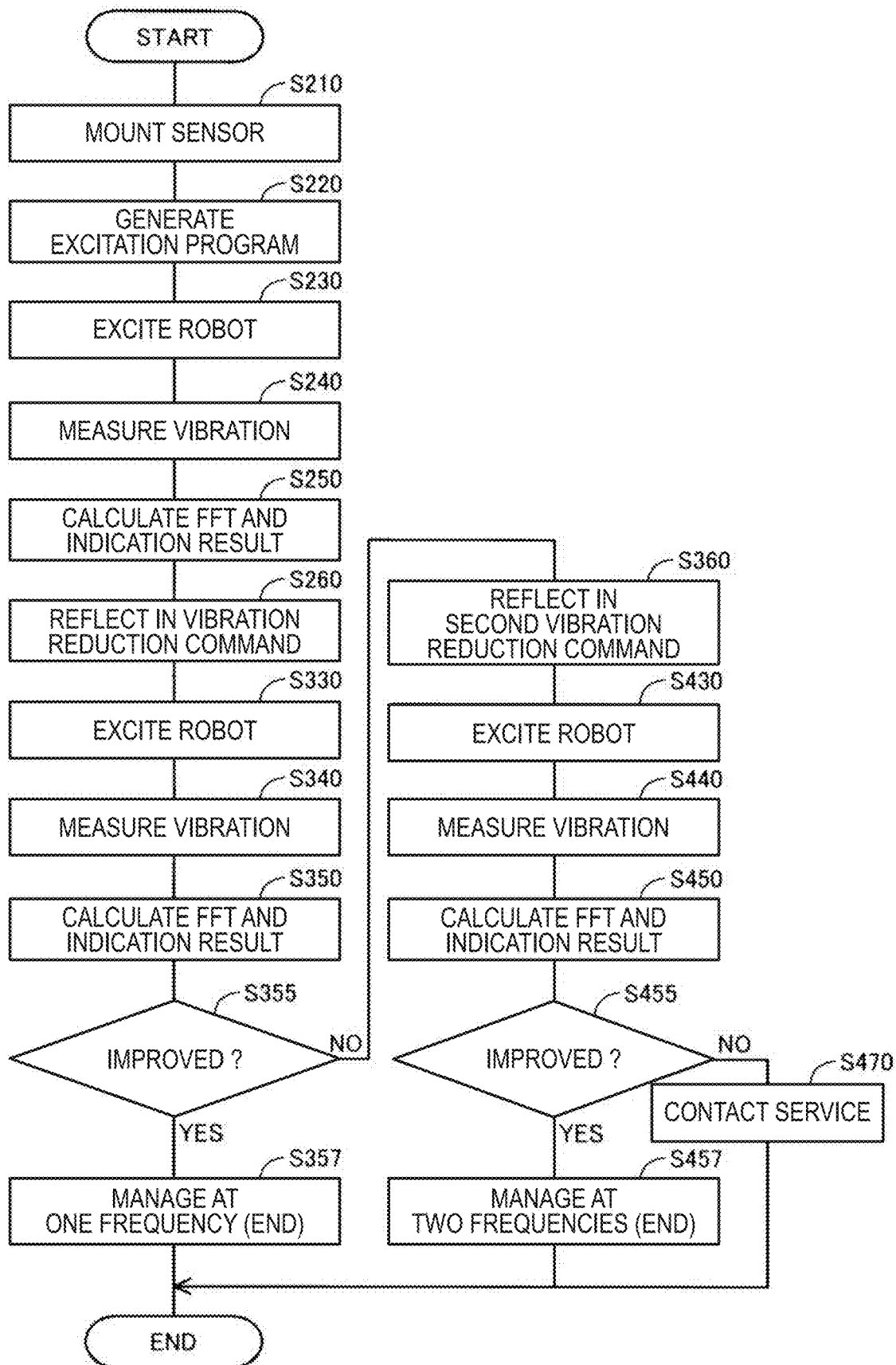
FIG. 38 is a flowchart illustrating another example of a setting procedure of the vibration reduction function.

FIG. 38 is a flowchart illustrating another example of a setting procedure of the vibration reduction function. Since processes of steps S210 to S260 of FIG. 38 are the same as the processes of steps S210 to S260 illustrated in FIG. 22, the processes of steps S210 to S260 will not be described. Through the processes until step S260, a first frequency to be reduced from the torque control signal is set (see F11, F21, and F31 of FIG. 3).

In step S330, as in step S230, the program generated in step S220 is executed in the robot control device 300 and the robot executes a specific operation according to the program. More specifically, the control signal generation unit 310 (see FIG. 2) receives a command indicating an instruction to execute the specific operation and outputs a position control signal according to the command and a parameter appended to the command.

The position control unit 320, the speed control unit 330, the filter processing unit 340, the torque control unit 350, and the servo amplifier 360 drive the servo motor 410 of the robot 100 according to the position control signal (see FIG. 2). Here, in step S330, the filter processing unit 340 executes the process of eliminating the specific frequency component set in step S260, alters the torque control signal received from the speed control unit 330, and output the torque control signal to the torque control unit 350.

In step S340, the residual vibration after the end of the specific operation is measured through the same process as step S240. In step S350, the measurement result of the vibration obtained by executing the specific operation of S330 is processed in the setting device 600 through the same process as step S250 and a processing result is displayed on the display 602 (see FIG. 27).

Figure 39:
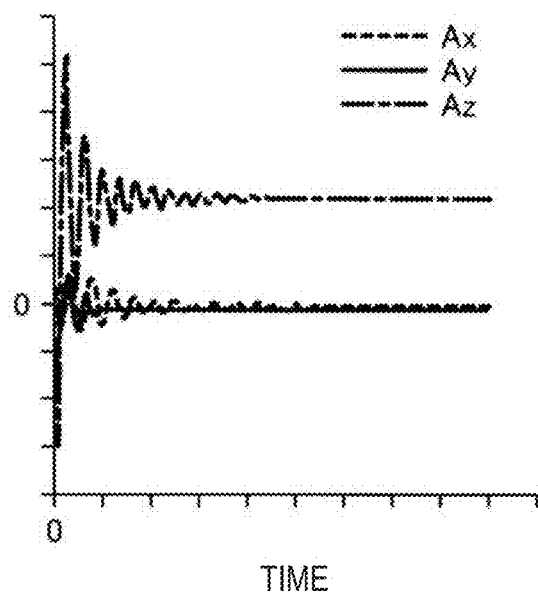
FIG. 39 is a graph equivalent to the expanded graph displayed in a step of FIG. 38.

FIG. 39 is a graph equivalent to the expanded graph Gsaa (see FIGS. 27 and 31) displayed in the step S250 of FIG. 38. Here, to facilitate the technical understanding, the accelerations Ax, Ay, and Az of all the X, Y, and Z axes are illustrated here.

Figure 40:
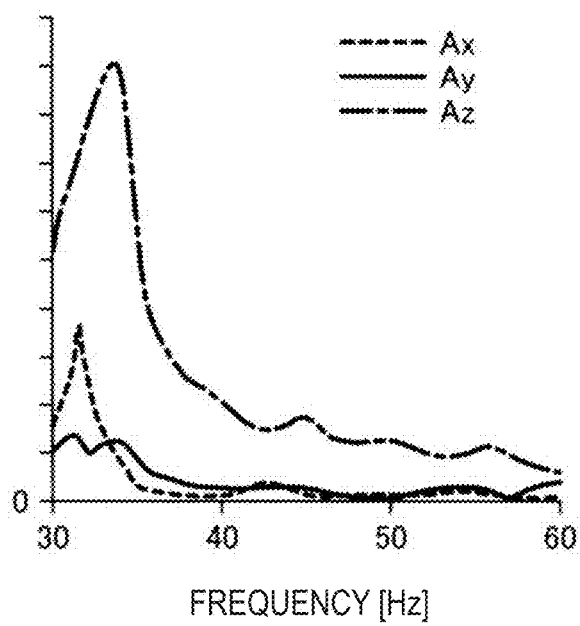
FIG. 40 is a graph equivalent to the frequency graph displayed in the step of FIG. 38.

FIG. 40 is a graph equivalent to the frequency graph Gf (see FIGS. 27 and 32) displayed in step S250 of FIG. 38. Here, to facilitate the technical understanding, results of fast Fourier transform on the accelerations Ax, Ay, and Az of all the X, Y, and Z axes are illustrated here.

Figure 41:
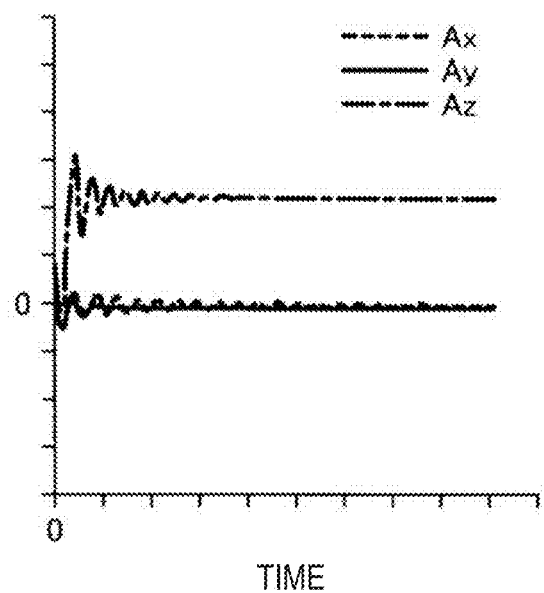
FIG. 41 is a graph equivalent to the expanded graph displayed in a step of FIG. 38.

FIG. 41 is a graph equivalent to the expanded graph Gsaa (see FIGS. 27 and 31) displayed in step S350 of FIG. 38. Here, to facilitate the technical understanding, the accelerations Ax, Ay, and Az of all the X, Y, and Z axes are illustrated here.

Figure 42:
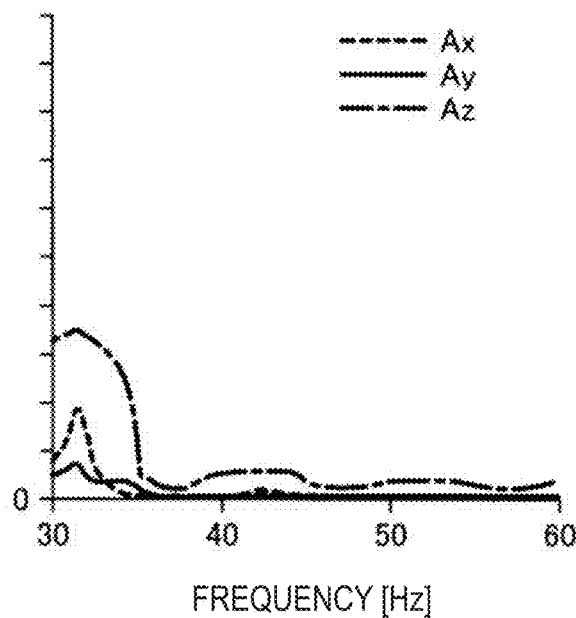
FIG. 42 is a graph equivalent to the frequency graph displayed in the step of FIG. 38.

FIG. 42 is a graph equivalent to the frequency graph Gf (see FIGS. 27 and 32) displayed in step S350 of FIG. 38. Here, to facilitate the technical understanding, results of fast Fourier transform on the accelerations Ax, Ay, and Az of all the X, Y, and Z axes are illustrated here.

As understood when FIG. 39 is compared with FIG. 41 and FIG. 40 is compared with FIG. 42, the largest vibration near 34 Hz of the acceleration Az (indicated by a one-dot chain line) in the Z axis direction is reduced through the setting of step S260 of FIG. 38 (in particular, see FIGS. 40 and 42).

In step S355 of FIG. 38, the user confirms the expanded graph Gsaa, the frequency graph Gf, and the maximum frequency indication UI25 of the user interface UI01 (see FIG. 27) and determines whether the residual vibration is sufficiently reduced. When the residual vibration is sufficiently reduced, the robot is managed in step S357 according to the setting of the parameter Param1 executed in step S260.

Conversely, when the residual vibration is not sufficiently reduced in step S355, the process proceeds to step S360. In step S360, the user confirms the expanded graph Gsaa, the frequency graph Gf, and the maximum frequency indication UI25 of the user interface UI01 (see FIGS. 27, 41, and 42) and specifies the frequency with the maximum power in the remaining vibration. Then, the user additionally inputs the frequency as a frequency component to be eliminated to the robot control device 300 via the touch display 602, the key 604, and the track point 606 of the setting device 600. The robot control device 300 stores the frequency as the parameter Param2 of the vibration reduction function of the predetermined number (see F32 of FIG. 3).

In step S430, as in steps S230 and S330, the program generated in step S220 is executed in the robot control device 300 and the robot executes the specific operation according to the program. Here, in step S430, the filter processing unit 340 executes the process of eliminating two frequency components set insteps S260 and S360, alters the torque control signal received from the speed control unit 330, and outputs the torque control signal to the torque control unit 350.

In step S440, the residual vibration after the end of the specific operation is measured through the same processes as steps S240 and S340. In step S450, the measurement result of the vibration obtained by executing the specific operation of S430 is processed in the setting device 600 through the same processes as steps S250 and S350 and a processing result is displayed on the display 602 (see FIG. 27).

Figure 43:
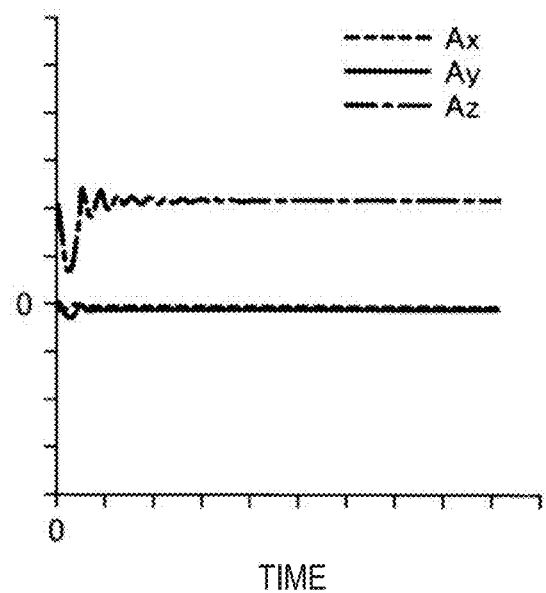
FIG. 43 is a graph equivalent to the expanded graph displayed in a step of FIG. 38.

FIG. 43 is a graph equivalent to the expanded graph Gsaa (see FIGS. 27 and 31) displayed in step S450 of FIG. 38. Here, to facilitate the technical understanding, the accelerations Ax, Ay, and Az of all the X, Y, and Z axes are illustrated here.

Figure 44:
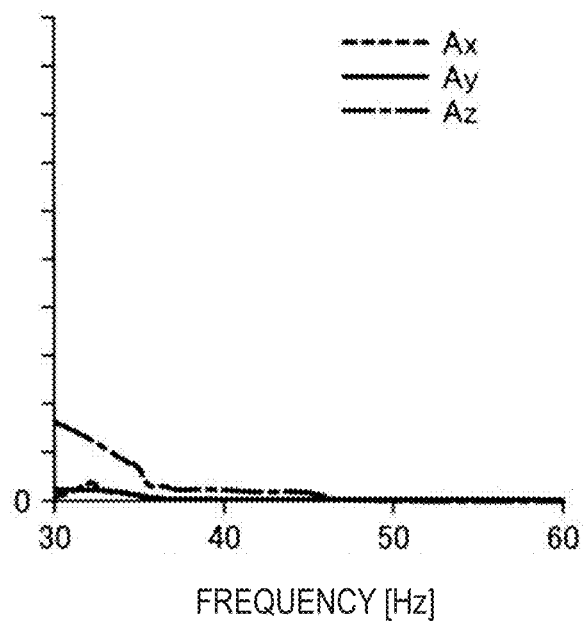
FIG. 44 is a graph equivalent to the frequency graph displayed in the step of FIG. 38.

FIG. 44 is a graph equivalent to the frequency graph Gf (see FIGS. 27 and 32) displayed in step S450 of FIG. 38. Here, to facilitate the technical understanding, results of fast Fourier transform on the accelerations Ax, Ay, and Az of all the X, Y, and Z axes are illustrated here.

As understood when FIG. 41 is compared with FIG. 43 and FIG. 42 is compared with FIG. 44, the largest vibration near 31 Hz of the acceleration Az (indicated by a one-dot chain line) in the Z axis direction is reduced through the setting of step S360 of FIG. 38 (in particular, see FIGS. 42 and 44).

In step S455, the user confirms the expanded graph Gsaa, the frequency graph Gf, and the maximum frequency indication UI25 of the user interface UI01 (see FIG. 27) and determines whether the residual vibration is sufficiently reduced. When the residual vibration is sufficiently reduced, the robot is managed in step S457 according to the setting of the parameters Param1 and Param2 executed in steps S260 and S360.

In such an aspect, the user can compare the vibration before and after the setting based on the user interface UI01 on the touch display 602, and then can execute additional frequency setting as necessary. That is, the user compares the vibration occurring in the specific operation in step S230 with the vibration occurring in step S330 in the operation according to the torque control signal obtained by reducing the target vibration frequency component from the torque control signal instructing the specific operation, and then can execute additional frequency setting as necessary.

Conversely, when the residual vibration is not sufficiently reduced in step S455, the process proceeds to step S470. In step S470, the user contacts a maintenance service provider.

(5) Measuring and Setting Target Vibration Frequency Using Force Sensor

The aspects in which the vibration measurement device is installed in each unit including the robot and the vibration reduction function is set have been described above. However, when the robot includes a force sensor (see reference numeral 190 of FIG. 1 and reference numeral 190b of FIG. 10), vibration can also be measured using the force sensor included in the robot instead of the vibration measurement device.

The force sensor 190 can measure forces Fx, Fy, and Fz in the three axes directions of the X, Y, and Z axes and torques Tx, Ty, and Tz around the X, Y, and Z axes acted on the end effector 200. Here, an aspect in which vibration occurring in a specific operation is measured and the vibration reduction function is set using the forces Fx, Fy, and Fz in the three axes directions of the X, Y, and Z axes and the torques Tx, Ty, and Tz around the X, Y, and Z axes obtained by the force sensor 190 instead of the acceleration in the X, Y, and Z axis directions and the angular velocities about the X, Y, and Z axis directions in each rotation output by the vibration measurement device 700 will be described. In such an aspect, the target vibration frequency can be measured effectively utilizing the force sensor installed in the robot as a control target.

Figure 45:
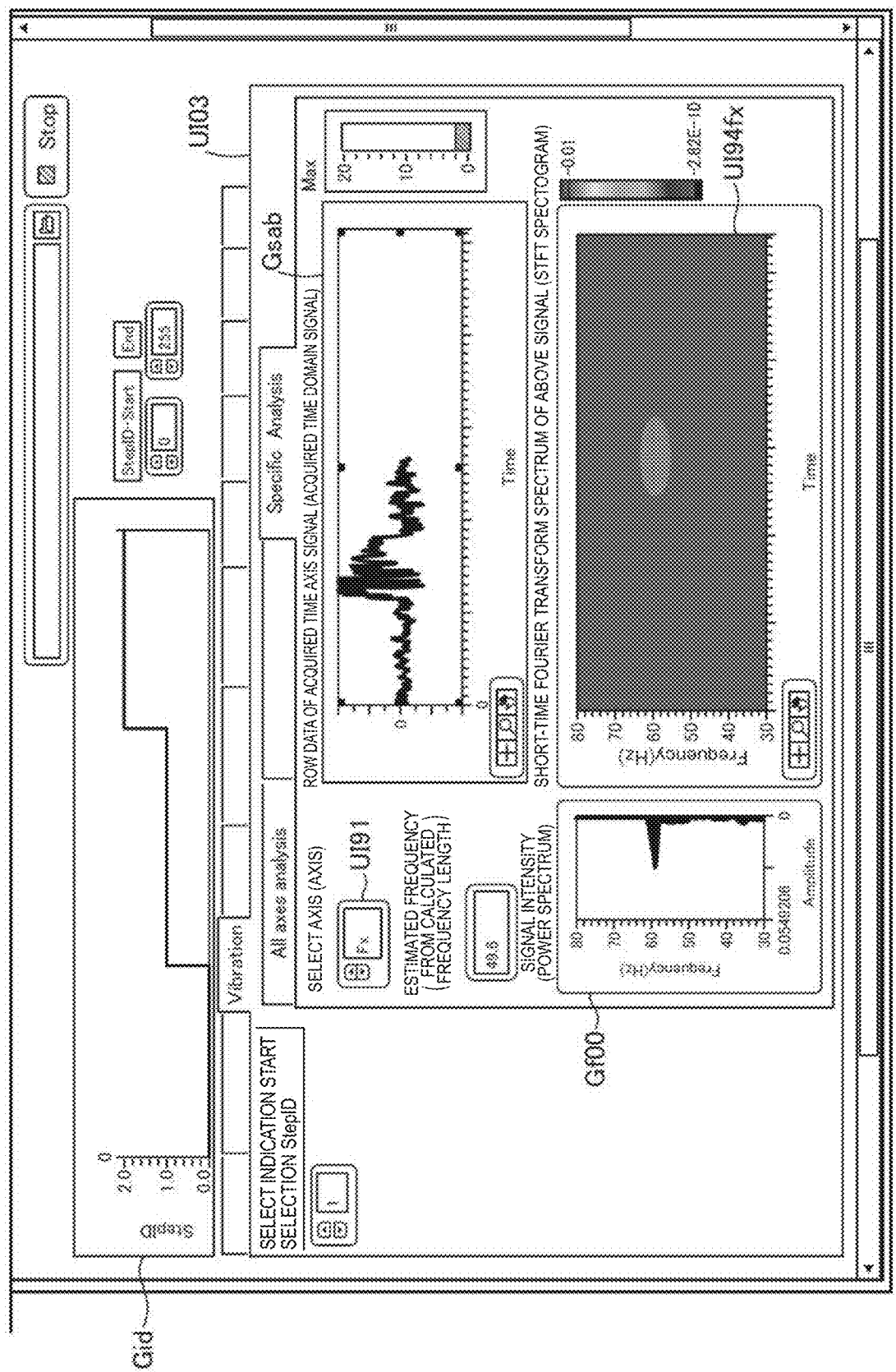
FIG. 45 is a diagram illustrating a graph and still another user interface for an input for designation of processing content and an output of a processing result.

FIG. 45 is a diagram illustrating a graph Gid and still another user interface UI03 for an input for designation of processing content and an output of a processing result. The user interface UI03 includes an input window UI91, an expanded graph Gsab, a frequency graph Gf00, and a spectrum indication UI94fx.

The input window UI91 is a user interface for selecting any of the forces Fx, Fy, and Fz in the three axes directions of the X, Y, and Z axes and the torques Tx, Ty, and Tz around the X, Y, and Z axes. Here, the force Fx in the X axis direction is selected. The input window UI91 is equivalent to the input window UI31 in the user interface UI01 of FIG. 27.

The expanded graph Gsab is a graph that expands and shows the residual vibration of the measurement result selected in the input window UI91. The expanded graph Gsab is equivalent to the expanded graph Gsaa in the user interface UI01 of FIG. 27. The residual vibration of the force Fx in the X axis direction after the specific operation is illustrated in FIG. 45.

The spectrum indication UI94fx shows a result obtained by executing short-time Fourier transform on the temporal change (the temporal change of the force Fx in the X axis direction) of a measured value selected in the input window UI31. In the spectrum indication UI94fx, the horizontal axis represents a time and the vertical axis represents a frequency. The magnitude of the power of each frequency for each time indicates a change in color. In such an aspect, the user can understand an aspect in which the power of the frequency component is changed over time. In the example of FIG. 45, it can be understood that there is a peak of the power near 60 Hz at a time near the middle of a time section shown in the spectrum indication UI94fx. In FIG. 45, to facilitate the technical understanding, the change in color in the spectrum indication UI94fx is changed in two stages.

The frequency graph Gf00 shows a result obtained by summing results (frequency distribution) shown in the spectrum indication UI94fx in the time axis direction. In the frequency graph Gf00, the vertical axis represents a frequency and the horizontal axis represents intensity. The frequency graph Gf00 in FIG. 45 corresponds to the frequency graph Gf in FIG. 27.

The graph Gid is a graph that displays an indication corresponding to a step of a recent command by which execution is completed in the time section of a vibration measurement target among command executed in the robot. As a result, currently, the user can understand which command is in progress in a process. In such an aspect, the user can understand the target vibration frequency while confirming a command to instruct a specific operation of generating the residual vibration when the specific operation is executed for measurement with a plurality of commands. In the example of FIG. 45, a command of a command ID2.0 is a recent command by which execution is completed.

Figure 46:
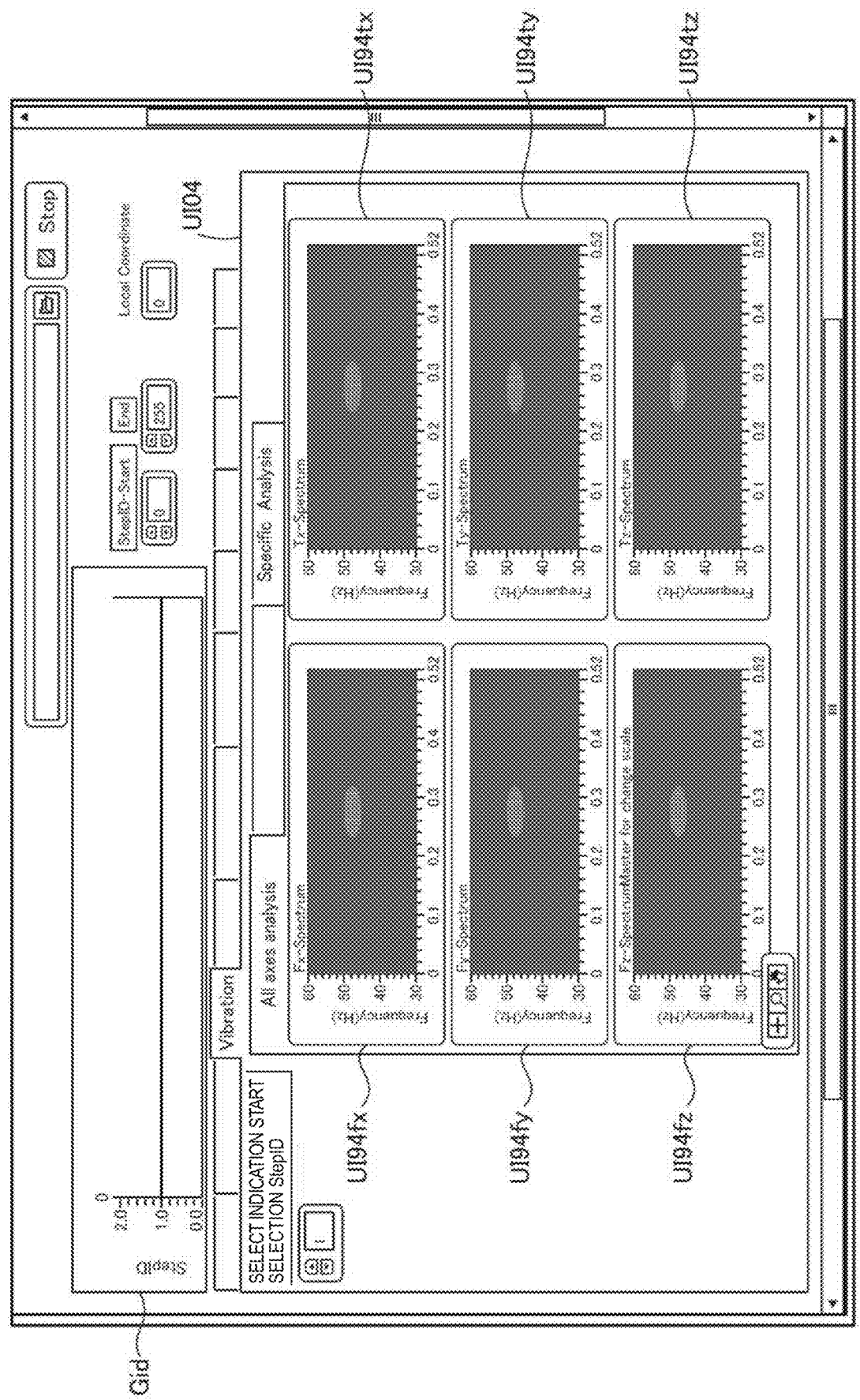
FIG. 46 is a diagram illustrating the graph and still another user interface for an input for designation of processing content and an output of a processing result.

FIG. 46 is a diagram illustrating the graph Gid and still another user interface UI04 for an input for designation of processing content and an output of a processing result. The function of the graph Gid is the same as the function of the graph Gid illustrated in FIG. 45.

The user interface UI04 of FIG. 46 includes spectrum indication UI94fx, UI94fy, UI94fz, UI94tx, UI94ty, and UI94tz. However, the user interface UI04 does not include the input window UI91, the expanded graph Gsab, and the frequency graph Gf00.

The spectrum indication UI94fx indicates a result obtained by executing the short-time Fourier transform on the temporal change of the force Fx in the X axis direction. Content of the spectrum indication UI94fx is the same as that of the function of the spectrum indication UI94fx illustrated in FIG. 45. The spectrum indication UI94fy shows a result obtained by executing the short-time Fourier transform on the temporal change of the force Fy in the Y axis direction. The spectrum indication UI94fz shows a result obtained by executing the short-time Fourier transform on the temporal change of the force Fz in the Z axis direction.

The spectrum indication UI94tx shows a result obtained by executing the short-time Fourier transform on the temporal change of the torque Tx in the X axis direction. The spectrum indication UI94ty shows a result obtained by executing the short-time Fourier transform on the temporal change of the torque Ty in the Y axis direction. The spectrum indication UI94tz shows a result obtained by executing the short-time Fourier transform on the temporal change of the torque Tz in the Z axis direction.

That is, the user interface UI04 can display an indication of power of each frequency component with regard to vibration of forces or torques in a plurality of mutually different directions. In such an aspect, the user can understand an aspect in which the power of the frequency component is changed over time in the plurality of different directions.

In the examples of FIGS. 45 and 46, the spectrum indication UI94*fx* to UI94*fz* and UI94*tx* to UI94*tz* indicate frequency regions equal to or greater than 30 Hz. However, the spectrum indication UI94*fx* to UI94*fz* and UI94*tx* to UI94*tz* may indicate regions equal to or less than 30 Hz. That is, the frequency regions suggested by the spectrum indication UI94*fx* to UI94*fz* and UI94*tx* to UI94*tz* can be set according to the measured vibration.

In the present specification, the control signal generation unit 310 is also referred to as a "reception unit". The position control unit 320, the speed control unit 330, the filter processing unit 340, the torque control unit 350, and the servo amplifier 360 are also referred to as an "execution unit". The servo motor 410 is also referred to as a "driving unit". The vibration measurement device 700 and the force sensors 190 and 190*b* are also referred to as a "measurement unit". The measurement result reception unit 613 serving as a functional unit of the setting device 600 is also referred to as a "measurement result reception unit". The robot control device 300 and the setting device 600 (the robot instruction device 600) function as a "control device".

A plurality of combinations of the commands instructing a plurality of mutually different operations and parameters of the commands function as "an instruction to execute operations as a plurality of mutually different types of specific operations". A combination of a command to designate the joint of the arm of the robot to be driven and a parameter functions as "an instruction to execute the specific operation including the designation of one or more joints among the plurality of joints".

In the present specification, the reception unit 611 of the setting device 600 is also referred to as a "reception unit". The instruction to execute the program in step S230 of FIG. 22 is also referred to as a "first instruction". The touch display 602, the key 604, and the track point 606 also function as an "operation unit". The frequency graph Gf and the maximum frequency indication UI25 function as "information regarding a target vibration frequency of a control target". The display 602 of the setting device 600 is also referred to as a "display unit". The display control unit 615 of the setting device 600 is also referred to as a "display control unit". A time section designated with the start time instruction UI51 and the end time instruction UI52 is also referred to as a "time section indicating vibration of a control target" or a "certain time section".

Designation of a data file input to the input window UI11 is also referred to as a "second instruction". The vibration measurement device 700 is also referred to as a "measurement unit". The user interface UI01 in step S250 is also referred to as an "indication based on the vibration data". The user interface UI01 in step S350 functions as an "indication based on the vibration data indicating vibration of the control target operated based on the second control signal obtained by reducing the specific frequency component from the first control signal instructing an operation which is a cause of the vibration of the control target in the time section".

The frequency displayed in the maximum frequency indication UI25 functions as "a parameter indicating at least one of the target vibration frequencies". The designation of the position of the start time instruction UI51 functions as "an instruction to designate a start time of the time section".

An input of the designation of a target in the input windows UI31 and UI91 functions as "axis designation for designation of a direction of vibration of the displayed target vibration frequency". The processing target graph Gsa, the expanded graph Gsaa, the frequency graph Gf, the frequency indication UI24, and the maximum frequency indication UI25 are also referred to as "information regarding the target vibration frequency of the vibration of the designated direction".

The UI04 including the spectrum indication UI94*fx*, UI94*fy*, UI94*fz*, UI94*tx*, UI94*ty*, UI94*tz* is also referred to as a "spectrum indication unit". The X, Y, and Z axes function as a "plurality of mutually different directions". The graph Gid functions as an "indication corresponding to step of a recent command".

(6) Installing Vibration Measurement Device in Another Robot System

In the foregoing embodiment, the vibration measurement device is installed in the robots 100 and 100*b* which are vibration reduction targets, the cameras 400 and 400*b* included in the robot system including the robots, and the frame F100*b* or the post F400*b* in which the robots and the cameras (see P701 to P706 of FIG. 10). However, the vibration measurement device can be installed in the robot which is a vibration reduction target or a location other than the constituent elements of the robot system including the robot.

Figure 47:
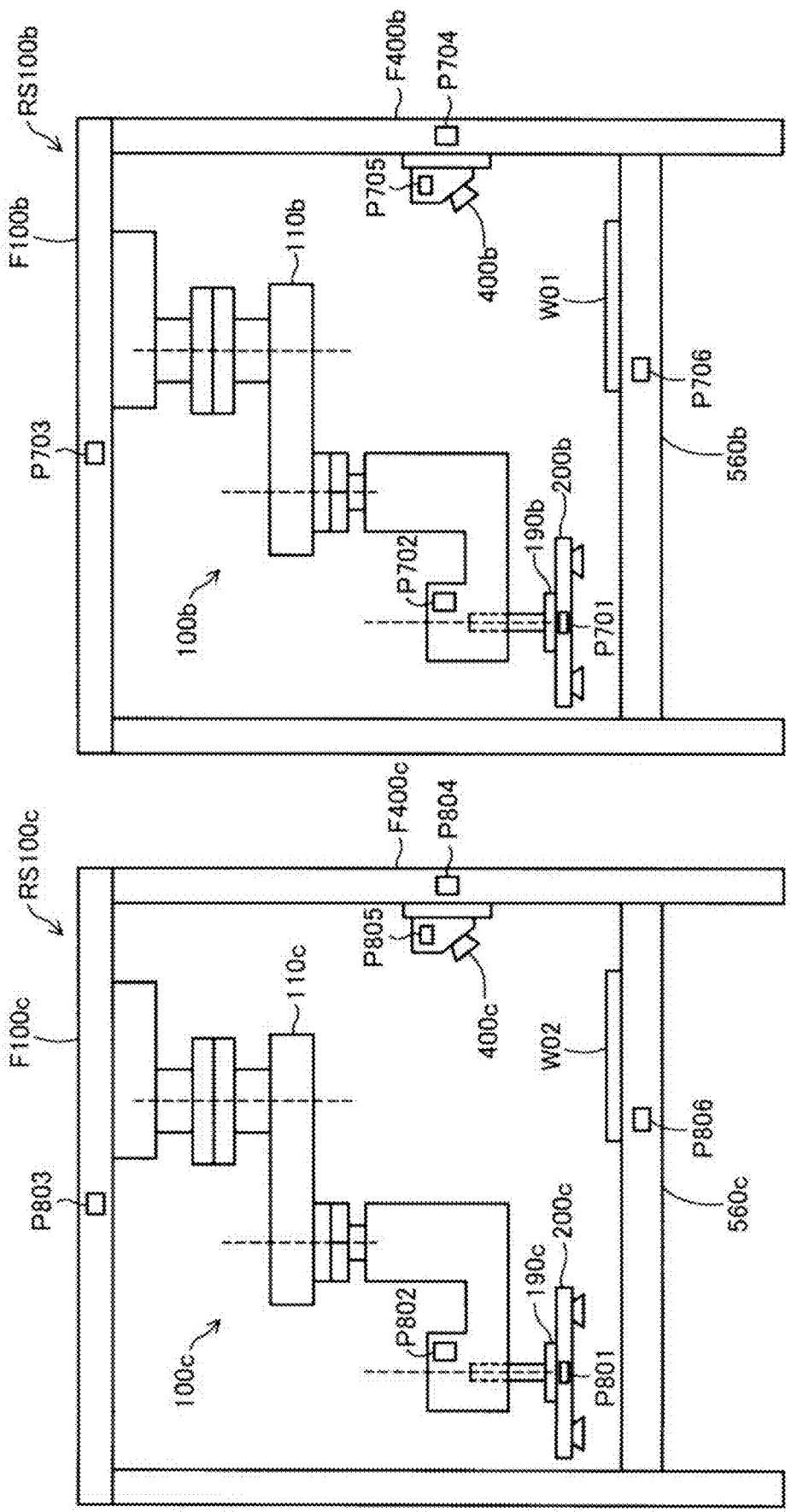
FIG. 47 is a diagram illustrating two robot systems disposed side by side.

FIG. 47 is a diagram illustrating two robot systems RS100*b* and RS100*c* disposed side by side. The two robot systems RS100*b* and RS100*c* may be robots that are responsible for upstream and downstream production processes of manufacturing the same product or may be robots included in different production lines that manufacture other products.

The configurations of the robot 100*b* and the frame F100*b* included in the robot system RS100*b* have already been described (see FIG. 10). The configurations of the robot 100*c* and the frame F100*c* included in the robot system RS100*c* are the same as the configurations of the robot 100*b* and the frame F100*b*. For each constituent element of the robot system RS100*c* corresponding to each constituent element of the robot system RS100*b*, reference numeral c is given and used instead of reference numeral b among the reference numerals of the constituent elements of the robot system RS100*b*.

The end effector 200*c* of the robot system RS100*c* can be vibrated due to a motion of the robot 100*b* of the nearby robot system RS100*b*. A camera 400*c* and a support 560*c* of the robot system RS100*c* can also be vibrated due to a motion of the robot 100*b* of the nearby robot system RS100*b*. As a result, precision of a motion of the robot 100*c* may deteriorate due to the robot 100*b* of the nearby robot system RS100*b* and a subsequent operation start timing may also be late. Therefore, in the embodiment to be described here, a frequency component to be eliminated is determined so that the constituent elements of the robot system RS100*c* are not vibrated in the setting of the vibration reduction function in FIG. 22 in the robot system RS100*b* which is a target.

In step S210 of FIG. 22, the vibration measurement device is installed in a measurement target. For example, the vibration measurement device 700 is installed in the frame F100*c* of the robot system RS100*c* (see P803 of FIG. 47). Then, the processes of steps S220 and the subsequent steps are executed on the robot system RS100*b*. As a result, a target frequency at which a torque control signal in which the frame F100*c* is rarely vibrated can be generated can be set by the filter setting unit 345 (see FIG. 2) of the robot control device of the robot system RS100b.

In step S210 of FIG. 22, for example, the vibration measurement device 700 can also be installed in a post F400c in which the camera 400c is installed in the robot system RS100c with regard to the robot system RS100b (see P804 of FIG. 47). Then, the processes of step S220 and the subsequent steps are executed. As a result, a target frequency at which a torque control signal in which the camera 400c installed in the post F400c is rarely vibrated can be generated can be set by the filter setting unit 345 (see FIG. 2) of the robot control device of the robot system RS100b.

Similarly, in step S210 of FIG. 22, for example, the vibration measurement device 700 can also be installed in the support 560c of the robot system RS100c (see P804 of FIG. 47). The support 560c is a structure on which the work piece W02 which is a processing target of the robot system RS100c can be loaded. Then, the processes of step S220 and the subsequent steps are executed on the robot system RS100b. As a result, a target frequency at which a torque control signal in which the support 560c and the work piece W02 on the support 560c are rarely vibrated can be generated can be set by the filter setting unit 345 (see FIG. 2) of the robot control device of the robot system RS100b.

Similarly, the vibration measurement device can also be installed in the camera 400c (see P805 of FIG. 47), the end effector 200c (see P801 of FIG. 47), and the arm 110c (see P802 of FIG. 47) included in the robot system RS100c. As a result, a target frequency at which a torque control signal in which these portions in the vibration measurement device is installed are rarely vibrated can be generated can be set by the filter setting unit 345 (see FIG. 2) of the robot control device of the robot system RS100b.

In the present specification, the portions P801 to P806 of the robot system RS100c in FIG. 47 are also referred to as "portions vibrated by the robot". The vibration measurement device 700 installed in the portions is also referred to as a "first detector". A torque control signal which is generated by the filter processing unit 340 and in which a process of the vibration reduction function is set based on an output from the vibration measurement device 700 is also referred to as a "second control signal".

D. Modification Examples

D1. Modification Example 1

(1) In the foregoing embodiment, there are the plurality of third control signals output between the earlier and later control signals (see FIGS. 6 and 8). However, only one third control signal may be output between an output of the earlier control signal and an output of the later control signal.

(2) In the foregoing embodiment, there are the plurality of second control signals generated by reducing different frequency components (see numbers 1 to 15 of FIG. 3). However, an aspect in which only one second control signal in which the frequency component is reduced can be generated and applied can also be set.

(3) In the foregoing embodiment, the third control signal can be obtained as a weighted mean of the earlier and later control signals. However, the third control signal can be determined also considering a component other than the earlier and later control signals.

(4) In the foregoing embodiment, when both a deviation before and after the control signal switching at the position of the distal end of the arm 110 of the robot 100 and a deviation before and after the control signal switching at the speed of the distal end of the arm 110 of the robot 100 are less than the threshold, the control signal is switched (see FIG. 9). However, the switching of the control signal may be set as a condition that the deviation in the rotational position and the deviation in the speed of the motor driving the robot are equal to or less than the predetermined thresholds. When the condition that the deviation in the position is less than the threshold, the control signal may also be switched regardless of the deviation in the speed.

(5) In the foregoing embodiment, the filter processing unit 340 serving as the second control signal generation unit eliminates the frequency component using the band-elimination filter. However, it is also possible to realize an aspect in which the second control signal generation unit generates the second control signal from the first control signal using a notch filter or a bandpass filter. When the second control signal is generated from the first control signal, the aspect in which the specific frequency component is reduced can also be adopted in addition to the aspect in which the specific frequency component is eliminated.

(6) In the foregoing embodiment, the vibration reduction function is executed on the torque control signal. However, the vibration reduction function can be applied to a control signal or the amount of a current of the acceleration and can also be applied to the speed control signal or the position control signal. In the vibration reduction function, the target control signal is subjected to Fourier transform, a specific frequency component in the control signal is reduced, and inverse transform is executed to generate a new control signal. Therefore, the vibration reduction function can be applied to various parameters that have a relation transformed by calculus and proportion based on the torque control signal exemplified above.

(7) In the multiaxial robot, a frequency different for each axis can be set as a frequency which is to be reduced from the control signal (see reference numerals 340 and 345 of FIG. 2). In such an aspect, the filter processing unit 340 receives a control signal with one or more frequencies which are to be eliminated from the filter setting unit 345 with regard to each of the plurality of joints. Then, the filter processing unit 340 executes a process of eliminating one or more frequency components according to the control signal from the filter setting unit 345 on the torque control signal output with regard to each of the plurality of joints by the speed control unit 330, generates a new torque control signal, and outputs the new torque control signal. When the earlier torque control signal is converted into the later torque control signal with regard to each of the plurality of joints, the filter processing unit 340 may generate a value of the third torque control signal by a weighted mean of the values of two torque control signals and output the value of the third torque control signal. In such an aspect, when the frequency to be reduced in accordance with the joint (axis) differs, vibration of each axis can be effectively reduced.

In the foregoing aspect, the frequency component to be reduced from the control signal may be matched in two or more axes. In the present specification, what a frequency component to be reduced with regard to a certain joint (axis) can be set without being limited to a frequency to be reduced with regard to another joint (axis) is referred to as what a frequency to be reduced for each joint (axis) is "independent". Even in the aspect in which the frequency component to be reduced with regard to each joint (axis) can be set independently, the same frequency component can be set accidentally or intentionally with regard to the plurality of joints.

On the other hand, the vibration reduction process can also be executed at the same frequency with regard to each axis of a multiaxial robot (see reference numerals 340 and 345 of FIG. 2). In the multiaxial robot, when each axis is controlled in a cooperation manner and a control signal with a specific frequency component is provided or a control signal with no specific frequency component is provided for each axis, an unexpected torque change or a position aberration of a path occurs in some cases. For this reason, by executing the vibration reduction process at the same frequency with regard to each axis of the multiaxial robot, it is possible to reduce a possibility of such a situation occurring.

Further, an axis not subjected to the vibration reduction process and an axis subjected to the vibration reduction process can be set with regard to each axis of the multiaxial robot (see reference numerals 340 and 345 of FIG. 2). In such an aspect, the filter processing unit 340 receives designation of some one or more of the joints to be subjected to the vibration reduction process among the plurality of joints. The filter processing unit 340 may receive designation of some one or more joints to be subjected to the vibration reduction process in an aspect in which designation of some one or more joints not subjected to the vibration reduction process among the plurality of joints is received. The filter processing unit 340 executes the vibration reduction process on some one or more joints to be subjected to the vibration reduction process and does not execute the vibration reduction process on the other joints.

In such an aspect, the vibration reduction process can be executed on the axes (for example, the axes close to the proximal portion supporting the robot, such as X11 and X12 of FIG. 1) in which an influence of vibration on the entire robot is high to reduce the vibration in the entire robot. Conversely, the vibration reduction process is not executed on the axis (for example, the axis near the distal end of the arm, such as X15 of FIG. 1) in which the influence of vibration on the entire robot is low, and thus precision of a work by the end effector, such as an operation of grasping the work piece can be improved.

(8) The present disclosure is not limited to the measurement of the vibration frequency of the vibration desired to be reduced in the robot and can be applied when a vibration frequency of vibration desired to be reduced is measured in any of various machines of which a physical state is changed through automatic control.

D2. Modification Example 2

(1) In the foregoing embodiment, when the first condition including non-input of the instruction indicating execution of the reduction in the frequency component is satisfied, the first control signal in which the frequency component is not reduced is output by the filter processing unit 340. The first condition can further include another condition such as a condition that predetermined setting is executed or a condition that the predetermined setting is not executed as an inferior weighted condition.

As the inferior weighted condition, for example, (a) a condition that an instruction not indicating the reduction in the frequency component is input can be exemplified. As the inferior weighted condition, (b) a condition that a password determined in advance is input (c) a condition that an ID determined in advance and a password corresponding to the ID are input, and (d) a condition that the instruction of (a) is input via hardware (see reference numeral 600 of FIG. 1) as a setting device determined in advance can further be exemplified in addition to (a). These inferior conditions may also be combined.

The instruction indicating non-execution of the reduction in the frequency component may be an explicit instruction or an implicit instruction. As the implicit instruction, for example, there is an instruction which is not recognized as being compatible with an instruction selectively executed as "an instruction indicating execution of the reduction in the frequency component", that is, "an instruction indicating execution of the reduction in the frequency component". As the instruction, for example, "an instruction to operate in a mode in which the accurate position control is executed" can be exemplified.

When the constituent element (the functional unit such as a CPU) determining whether it is satisfied that "the instruction indicating the reduction in the frequency component is not input" may determine that it is satisfied that "the instruction indicating execution of the reduction in the frequency component is not input" when a time of a length determined in advance and the explicit or implicit instruction indicating execution of the reduction in the frequency component is not input. On the other hand, the temporal restriction may not be provided. That is, when the explicit or implicit instruction indicating execution of the reduction in the frequency component is input, it may be first determined that it is not satisfied that "the instruction indicating execution of the reduction in the frequency component is not input". In other cases, it may be determined that it is satisfied that "the instruction indicating execution of the reduction in the frequency component is not input".

(2) In the foregoing embodiment, when the second condition including input of the instruction indicating execution of the reduction in the frequency component is satisfied, the second control signal is output by the filter processing unit 340. The second condition can further include another condition such as a condition that predetermined setting is executed or the predetermined setting is not executed as an inferior weighted condition.

As the inferior weighted condition, for example, (b) a condition that a password determined in advance is input (c) a condition that an ID determined in advance and a password corresponding to the ID are input, and (d) a condition that the instruction indicating execution of the reduction in the frequency component is input via hardware (see reference numeral 600 of FIG. 1) as a setting device determined in advance can be exemplified. These inferior conditions may also be combined.

The instruction indicating execution of the reduction in the frequency component may be an explicit instruction or an implicit instruction. As the implicit instruction, for example, there is an instruction which is not recognized as being compatible with an instruction selectively executed as "an instruction indicating non-execution of the reduction in the frequency component", that is, "an instruction indicating non-execution of the reduction in the frequency component. As the instruction, for example, "an instruction to operate in a mode in which high-speed running is executed" or "an instruction to operate in a mode in which quiet running is executed can be exemplified."

(3) In the foregoing embodiment, when the vibration reduction process is executed, the indication Dvr illustrated in FIG. 13 is displayed on the display 602. However, when the second control signal in which the predetermined frequency component is reduced is output from the control signal switching unit, the indication displayed on the display unit may be realized in another aspect. For example, a lamp can also be included as a display unit and the lamp can blink when the second control signal in which the predetermined frequency component is reduced is output. No indication can be displayed even when the second control signal in which the predetermined frequency component is reduced is output.

(4) In the foregoing embodiment, the filter processing unit 340 outputs the first control signal in which the frequency component is not reduced when the third condition including satisfaction of both the input of the instruction indicating execution of the reduction in the frequency component and satisfaction of the inferior condition determined in advance, as illustrated in FIG. 11 is satisfied (see FIGS. 11 and 12). However, the third condition can further include another condition such as a condition that predetermined setting is executed and the predetermined setting is not executed as an inferior weighted condition.

In the foregoing embodiment, when the continuous path control (CP control) is executed, the vibration reduction process is not executed (see the left column and the seventh row of FIG. 11). However, even when the continuous path control is executed, the vibration reduction process may be executed.

(5) In the foregoing embodiment, the force sensor 190 can measure the forces Fx, Fy, and Fz in the three axes directions of the X, Y, and Z axes and the torques Tx, Ty, and Tz around the X, Y, and Z axes acted on the end effector 200. However, the force detection unit may detect only force of one axis or may detect only torque of one axis. The force detection unit may be able to detect forces or torques of two axes. The force detection unit may be able to detect any combination of forces of three or less axes and torques of three or less axes.

(6) The present disclosure is not limited to the control of the robot and can be applied to any of various machines that execute automatic control.

D3. Modification Example 3

(1) In the present specification, the description of "the measurement unit installed in the robot" include a measurement unit embedded as a part of the configuration of the robot in advance and a measurement unit installed in the robot at the time of measurement.

(2) In the foregoing embodiment, the setting device 600 and the robot control device 300 can also receive an instruction indicating execution of one specific operation and can also receive an instruction indicating continuous execution of a plurality of specific operations. Then, the setting device 600 and the robot control device 300 can receive the instruction indicating execution of one specific operation at a different timing. Then, the specific operations instructed at the different timings may be the same specific operation or may be different types of specific operations. That is, the reception unit 611 serving as a reception unit can receive the instruction indicating a plurality of kinds of specific operations, and may receive the instruction continuously or may receive the instruction at an individual timing one by one. Further, the reception unit (see the reception unit 611 of FIG. 15) and the execution unit (see the position control unit 320, the speed control unit 330, the filter processing unit 340, the torque control unit 350, and the servo amplifier 360 of FIG. 2) may be configured to receive and execute only one specific operation.

(3) The plurality of operations which are the specific operations a plurality of operations in an attitude of the robot at the time of ending the operation is the same and operations (for example, a path or a speed of the operation) until the robot takes the attitude at the time of ending the operation are different.

(4) The specific operation may be specified in accordance with a method of designating a position or a motion of the distal end of the arm without designating the joint.

(5) The present disclosure is not limited to the measurement of the vibration frequency of the vibration desired to be reduced in the robot and can also be applied to a case in which a frequency of vibration desired to be reduced is measured in any of various machines of which a physical state is changed through automatic control.

D4. Modification Example 4

(1) In the foregoing embodiment, the frequency graph Gf, the maximum frequency indication UI25 and UI29, the spectrum indication UI94*fx* to UI94*fz* and UI94*tx* to UI94*tz*, and the like are displayed as "information regarding a target vibration frequency" on the display 602. In this way, the "information regarding the target vibration frequency" may be a target vibration frequency or may be any parameter with which the target vibration frequency can be uniquely specified. The "information regarding a target vibration frequency" may be a graph showing vibration including the target vibration frequency.

The "vibration" may be vibration of force or torque added to the joint of the robot which is a control target, may be vibration of acceleration of a constituent portion of a measurement target, may be vibration of a speed, or may be vibration of a position.

(2) In the foregoing embodiment, the spectrum is displayed based on measured values of the force sensors 190 and 190*b*. However, the spectrum may be displayed based on a measured value of acceleration or an angular velocity. Based on the measured value of the force sensor, a frequency with the maximum power is automatically shown as a numerical value in the frequency graph Gf. That is, the user interfaces U01 to U04 can be displayed based on a measured value of acceleration or an angular velocity or can also be displayed based on a measured value of force or torque.

(3) In the foregoing embodiment, the robot instruction device 600 also functions as a setting device. However, a device that sets the vibration reduction function may be a dedicated device. A device that sets the vibration reduction function may be realized by installing application software to execute setting of the vibration reduction function in a general personal computer or a smartphone.

(4) In the foregoing embodiment, the user interface U01 is a user interface for designating a data file and executing a process of setting the vibration reduction function. However, the setting of the vibration reduction function may be executed by operating the robot to generate data from the operation without taking data measured in advance and generated and executing the process.

In a part of the foregoing embodiment, the information regarding the target vibration frequency of the control target is displayed on the display unit by giving an instruction to execute the program in step S230 of FIG. 22 as the first instruction (see step S250 of FIG. 22). However, the first instruction serving as an opportunity to display the information regarding the target vibration frequency of the control target may be an instruction to process the measurement result of the vibration or may be an instruction to display the information regarding the target vibration frequency of the control target (see step S250 of FIG. 22). At this time, the process for the measurement result of the vibration may be executed based on the data of the specific operation (see step S230 of FIG. 22) executed immediately before or may be executed based on data generated based on a specific operation executed previously (see UI11 of FIG. 27). That is, the first instruction may be an instruction given by the user assuming that the information regarding the target vibration frequency of the control target is displayed on the display unit.

(5) In the foregoing embodiment, the measurement result of the residual vibration by the specific operation before the specific frequency component is eliminated is displayed in step S250 of FIG. 38. Thereafter, the measurement result of the residual vibration by the specific operation in which the specific frequency component is eliminated is displayed in steps S350 and S450. However, the indication based on the vibration data of the operation with the second control signal from which the specific frequency component is reduced can be realized without realizing the indication based on the vibration data of the operation with the first control signal from which the specific frequency component is not reduced.

(6) In the foregoing embodiment, the start time instruction UI51 of the time section which is the processing target set as the timing at which the position control signal instructing the end of the specific operation is output from the control signal generation unit 310 as default. That is, the data in which the measurement result of the vibration is recorded includes data of vibration of the control target (data in which is not considered at the time of determining the target vibration frequency) at an earlier time than "a time section of the vibration data with which the target vibration frequency of the control target is determined based on the data". However, instead of this aspect, the measurement can also be started from a start timing of "the time section of the vibration data with which the target vibration frequency of the control target is determined based on the data". A certain time section which is the time section indicating the vibration of the control target may be set automatically or may be set by the user.

(7) In the foregoing embodiment, the time section of the data which is the origin for determining the target vibration frequency of the control target is a time section in which the control signal for driving the control target is not output. However, the time section in which information which is the origin for determining the target vibration frequency of the control target is prepared can also include a time section in which a control signal for uniformly moving the control target is output.

In such an aspect, a parameter indicating the target vibration frequency calculated based on vibration data of the time section in which the uniform movement is executed can be displayed. Therefore, the user can understand the target vibration frequency at which there is a high possibility of the control target being vibrated most in the state in which the uniform movement has to be executed without vibration. The "uniform movement" includes uniform linear movement and uniform rotational movement. In the present specification, "uniform velocity" means that a change in velocity is within 5%.

(8) In the foregoing embodiment, the start time instruction UI51 of a processing target time section is a timing at which the position control signal instructing the end of the specific operation is output from the control signal generation unit 310 as default. However, the user designates the start time without receiving suggestion of the start time from a device.

When an instruction indicating the execution of the setting of the vibration reduction function is input, a parameter indicating one target vibration frequency determined based on the vibration data can also be displayed on the display unit by the display control unit without receiving an instruction to designate a part of the vibration data or an instruction to acquire a part of the designated vibration data.

For example, when the vibration is measured by executing only one specific operation, the indication (see Gid of FIGS. 45 and 46) corresponding to a step of a recent command is not displayed.

(9) The present disclosure is not limited to the measurement of the vibration frequency of the vibration desired to be reduced in the robot and can be applied to a case in which the vibration frequency of the vibration desired to be reduced is measured in any of various machines of which a physical state is changed through automatic control.

D5. Modification Example 5

(1) In the foregoing embodiment, the vibration measurement device 700 is installed in the post F400b in which the camera 400b is installed to measure vibration of the camera 400b (see P704 of FIG. 10 and FIG. 36). However, when the vibration of an imaging unit is measured, the first detector may be installed in the imaging unit capable of capturing an image (see P705 of FIG. 10).

The imaging unit may be a camera that captures a still image or may be a camera that captures a moving image. That is, an image captured by the camera may be a still image or may be a moving image.

(2) In the foregoing embodiment, the vibration measurement device 700 is installed in both the control target robot and a structure other than the control target robot. Then, the vibration reduction process is executed based on measurement results of both the robot and the structure. However, the filter processing unit 340 serving as a control signal alternation unit may not reduce the frequency component based on the second detector installed in the control target robot.

(3) In the foregoing embodiment, the vibration measurement device 700 is mounted on the arm 110b of the robot (see P702 of FIG. 10). However, the second detector can be installed on a proximal portion of the arm of the robot which is not displaced by driving of the servo motor.

(4) In the foregoing embodiment, the vibration measurement device 700 includes the first mounting unit 760 to the fourth mounting unit 790 which can each be mounted on or detached from the second support unit 720 and can be exchanged (see FIGS. 18 to 21). However, the detector may not include the exchangeable mounting units and the output unit can be installed in a measurement target portion.

The detector does not include the notation (see reference numeral 745 of FIG. 16) indicating three directions which are directions of vibration measured on the outer surface.

In the foregoing embodiment, the output terminal included in the output unit 750 of the vibration measurement device 700 is wire-connected to the setting device 600. However, the vibration measurement device can be wirelessly connected to the setting device.

(5) In the foregoing embodiment, the reduction of the vibration of the 6-axis or 4-axis robot has been described. However, the technology disclosed in the present specification is not limited to the 6-axis or 4-axis multiaxial robot and can be applied to any of various machines of which a physical state is changed through control, such as a printer and a projector. For example, by applying the technology disclosed in the present specification to an operation of a printing head or a transport operation of a printing medium, it is also possible to reduce a change (vibration) in a relative position of the head to the printing medium.

(6) The present disclosure is not limited to the robot and an image sensor used to control the robot and can be applied to any of various machines of which a physical state is changed through automatic control and a structure other than the machines having an influence on the automatic control.

The present disclosure is not limited to the above-described embodiments, examples, and modification examples and can be realized with various configurations within the scope of the present disclosure without departing from the gist of the present disclosure. For example, technical features in embodiments, examples, and modification examples corresponding to the technical features in the aspects described in SUMMARY can be appropriately exchanged or combined to resolve some or all of the above-described problems or achieve some or all of the above-described advantages. The technical features can be appropriately omitted unless the technical features are essential in the present specification.

The entire disclosure of Japanese Patent Application No. 2017-069890, filed Mar. 31, 2017 is expressly incorporated by reference herein.

What is claimed is:

1. A control device comprising:
a processor that is configured to execute computer-executable instructions so as to control a robot, and the processor is configured to receive an instruction to execute a specific operation which is an operation determined in advance, the specific operation including at least two movements that are separate and distinct; and
an amplifier that causes a motor of a robot to execute the specific operation when the processor receives the instruction to execute the specific operation; wherein
the processor is configured to receive a measurement result of vibration measured by a measurement device installed in the robot from the measurement device in the execution of the specific operation,
the processor is configured to determine at least one frequency component to be filtered from a torque control signal for a first of the at least two movements and for a second of the at least two movements for the specific operation from the measurement results of vibration,
the processor is configured to determine an intermediate torque control signal based on the at least one frequency component to be filtered from the torque control signal for the first of the at least two movements and the at least one frequency components to be filtered from the torque control signal for the second of the at least two movements, and
the processor is configured to execute the torque control signal for the first of the at least two movements with the at least one frequency component filtered out, the intermediate torque control signal, and the torque control signal for the second of the at least two movements with the at least one frequency component filtered out in that order.

2. The control device according to claim 1,
wherein the processor is configured to receive an instruction to execute a plurality of different types of the specific operations, and
wherein the amplifier causes the motor of the robot to execute the specific operation designated by the instruction input to the processor.

3. The control device according to claim 2,
wherein the amplifier causes the motor of the robot to execute, as the specific operations, a plurality of specific operations in which attitudes of the robot are different at the time of ending of the specific operations.

4. The control device according to claim 3,
wherein the robot includes a plurality of the motors and a plurality of joints respectively driven by the plurality of motors,
wherein the processor configured to receive the instruction to execute the specific operation including designation of one or more joints among the plurality of joints, and
wherein the amplifier causes the motor corresponding to the designated joint to execute an operation of driving the designated joint in the specific operation.

5. The control device according to claim 2,
wherein the robot includes a plurality of the motors and a plurality of joints respectively driven by the plurality of motors,
wherein the processor configured to receive the instruction to execute the specific operation including designation of one or more joints among the plurality of joints, and
wherein the amplifier causes the motor corresponding to the designated joint to execute an operation of driving the designated joint in the specific operation.

6. The control device of claim 1, wherein the processor is configured to add a ration of weight to the first torque control signal when determining the intermediate torque control signal.

7. The control device of claim 1, wherein the at least one frequency component filtered from the torque control signal for the first of the at least two movements is different from the at least one frequency component filtered from the torque control signal for the second of the at least two movements.

8. The control device of claim 7, wherein the at least one frequency component filtered from the torque control signal for the first of the at least two movements and the at least one frequency component filtered from the torque control signal for the second of the at least two movements are both filtered from the intermediate torque control signal.

9. A robot system comprising:
a robot; and
the control device that comprises a processor that is configured to execute computer-executable instructions so as to control the robot and the processor is configured to receive an instruction to execute a specific operation which is an operation determined in advance, the specific operation including at least two movements that are separate and distinct, and comprises an amplifier that causes a motor of the robot to execute the specific operation when the processor receives the instruction to execute the specific operation; wherein
the processor is configured to receive a measurement result of vibration measured by a measurement device installed in the robot from the measurement device in the execution of the specific operation,
the processor is configured to determine at least one frequency component to be filtered from a torque control signal for a first of the at least two movements and for a second of the at least two movements for the specific operation from the measurement results of vibration,
the processor is configured to determine an intermediate torque control signal based on the at least one frequency component to be filtered from the torque control signal for the first of the at least two movements and the at least one frequency components to be filtered from the torque control signal for the second of the at least two movements, and the processor is configured to execute the torque control signal for the first of the at least two movements with the at least one frequency component filtered out, the intermediate torque control signal, and the torque control signal for the second of the at least two movements with the at least one frequency component filtered out in that order.

10. The robot system according to claim 9,
wherein the processor is configured to receive an instruction to execute a plurality of different types of the specific operations, and
wherein the amplifier causes the motor of the robot to execute the specific operation designated by the instruction input to the processor.

11. The robot system according to claim 10,
wherein the amplifier causes the motor of the robot to execute, as the specific operations, a plurality of specific operations in which attitudes of the robot are different at the time of ending of the specific operations.

12. The robot system according to claim 11,
wherein the robot includes a plurality of the motors and a plurality of joints respectively driven by the plurality of motors,
wherein the processor configured to receive the instruction to execute the specific operation including designation of one or more joints among the plurality of joints, and
wherein the amplifier causes the motor corresponding to the designated joint to execute an operation of driving the designated joint in the specific operation.

13. The robot system according to claim 10,
wherein the robot includes a plurality of the motors and a plurality of joints respectively driven by the plurality of motors,
wherein the processor configured to receive the instruction to execute the specific operation including designation of one or more joints among the plurality of joints, and
wherein the amplifier causes the motor corresponding to the designated joint to execute an operation of driving the designated joint in the specific operation.

* * * * *